(12) United States Patent
Stahl et al.

(10) Patent No.: US 12,271,521 B2
(45) Date of Patent: Apr. 8, 2025

(54) CONTROLLING A USER SELECTION QUEUE

(71) Applicant: Apple Inc., Cupertino, CA (US)

(72) Inventors: Geoffrey Grant Stahl, San Jose, CA (US); Norman Nuo Wang, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/367,214

(22) Filed: Sep. 12, 2023

(65) Prior Publication Data
US 2023/0418374 A1  Dec. 28, 2023

Related U.S. Application Data

(63) Continuation of application No. 16/862,473, filed on Apr. 29, 2020, now Pat. No. 11,809,618.

(60) Provisional application No. 62/855,920, filed on Jun. 1, 2019.

(51) Int. Cl.
| | |
|---|---|
| G06T 7/73 | (2017.01) |
| G06F 3/01 | (2006.01) |
| G06F 3/04815 | (2022.01) |
| G06F 3/16 | (2006.01) |
| G06F 16/954 | (2019.01) |
| G06T 19/00 | (2011.01) |

(52) U.S. Cl.
CPC .......... *G06F 3/013* (2013.01); *G06F 3/04815* (2013.01); *G06F 3/167* (2013.01); *G06F 16/954* (2019.01); *G06T 7/74* (2017.01); *G06T 19/006* (2013.01)

(58) Field of Classification Search
None
See application file for complete search history.

(56) References Cited

U.S. PATENT DOCUMENTS

| | | | | |
|---|---|---|---|---|
| 9,268,454 | B2* | 2/2016 | Hamilton | G06F 16/958 |
| 10,109,003 | B1* | 10/2018 | Jenkins | G06Q 30/0633 |
| 2006/0117365 | A1* | 6/2006 | Ueda | H04N 21/8586 |

(Continued)

OTHER PUBLICATIONS

Office Action for corresponding Chinese Application No. 202010470149.1 dated Jun. 14, 2024, 14 pages. Translation of search report provided.

(Continued)

*Primary Examiner* — Yanna Wu
(74) *Attorney, Agent, or Firm* — Fernando & Partners, LLP

(57) ABSTRACT

Various implementations disclosed herein include devices, systems, and methods for compositing an affordance in association with a CGR object representing a physical article. In various implementations, a device includes a display, a non-transitory memory, and one or more processors coupled with the display and the non-transitory memory. In some implementations, a method includes displaying a computer-generated reality (CGR) object in a CGR environment. In some implementations, the CGR object represents a physical article. In some implementations, the method includes compositing an affordance in association with the CGR object. In some implementations, the method includes detecting an input directed to the affordance. In some implementations, the method includes, in response to detecting the input, adding an identifier identifying the physical article to a user selection queue.

22 Claims, 56 Drawing Sheets

(56) References Cited

U.S. PATENT DOCUMENTS

| | | |
|---|---|---|
| 2013/0085894 A1 | 4/2013 | Chan et al. |
| 2016/0026253 A1 | 1/2016 | Bradski et al. |
| 2016/0125504 A1* | 5/2016 | Narayanan ......... G06Q 30/0633 705/26.8 |
| 2017/0046024 A1 | 2/2017 | Dascola et al. |
| 2017/0357420 A1 | 12/2017 | Dye et al. |
| 2019/0087519 A1 | 3/2019 | Mercury et al. |
| 2019/0391715 A1 | 12/2019 | Joyce et al. |
| 2020/0059603 A1* | 2/2020 | Van De Sluis ...... H04N 23/698 |
| 2020/0341236 A1 | 10/2020 | Nystrom |

OTHER PUBLICATIONS

Yang Song et al., "Augmented Reality System Designed based on BRISK Feature Extraction," Software Engineer, vol. 18, No. 4, Apr. 2015, pp. 9-11 (Includes English Translation of Abstract).

Robert J. Hall, "An Improved Geocast for Mobile Ad Hoc Networks," IEEE Transactions on Mobile Computing, vol. 10, No. 2, Feb. 2011, pp. 254-266.

* cited by examiner

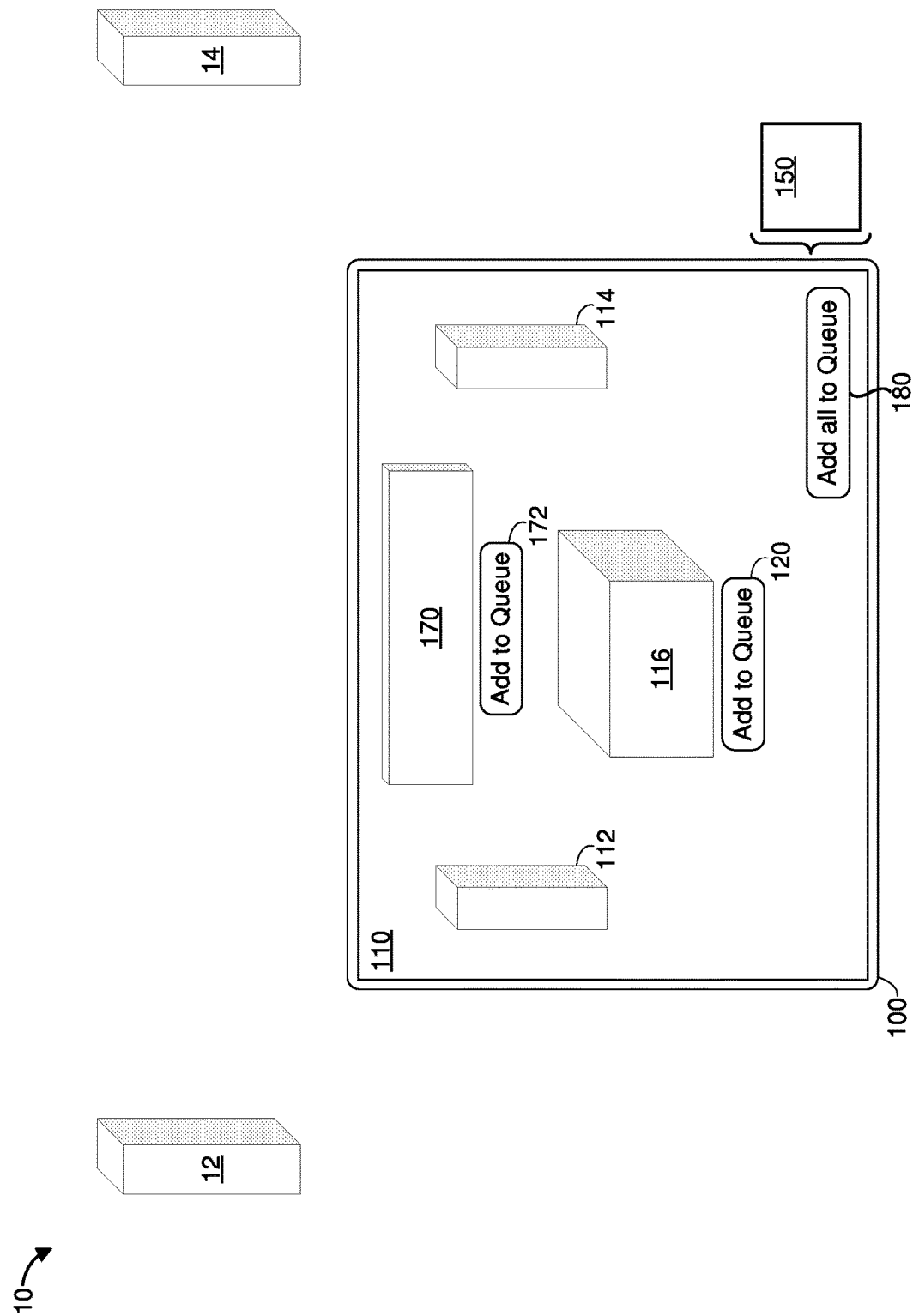

CONTROLLING A USER SELECTION QUEUE

CROSS-REFERENCE TO RELATED APPLICATION

This application is a continuation of U.S. patent application Ser. No. 16/862,473, filed on Apr. 29, 2020, which claims the benefit of U.S. Provisional Patent App. No. 62/855,920, filed on Jun. 1, 2019, which are incorporated by reference in their entirety.

TECHNICAL FIELD

The present disclosure generally relates to controlling a user selection queue.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. However, most previously available devices that present CGR environments are ineffective at controlling user selection queues.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1L are diagrams of an example operating environment for controlling a user selection queue in accordance with some implementations.

Figure 1A:
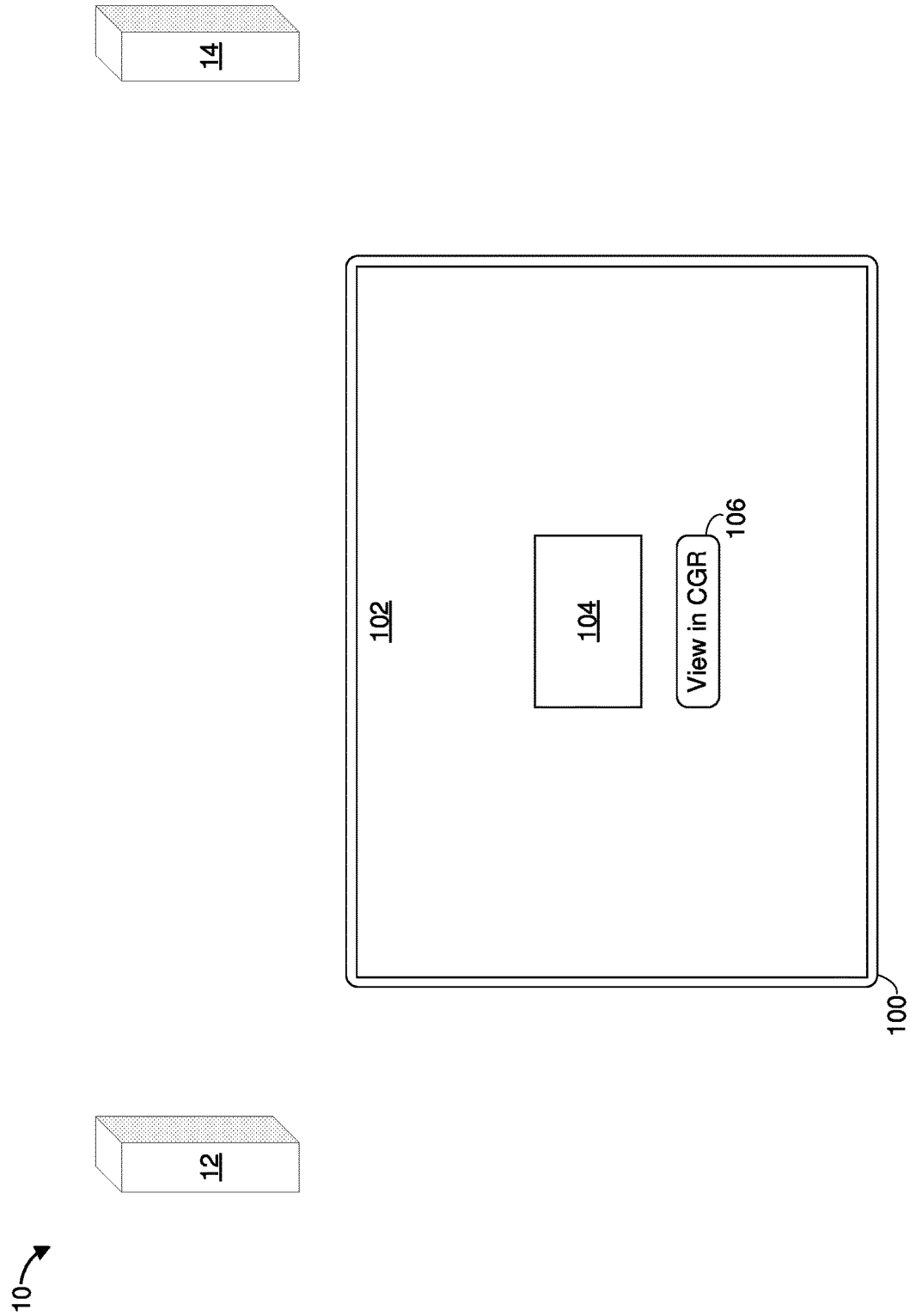

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for compositing an affordance in association with a CGR object representing a physical article. In various implementations, a device includes a display, a non-transitory memory and one or more processors coupled with the display and the non-transitory memory. In some implementations, a method includes displaying a computer-generated reality (CGR) object in a CGR environment. In some implementations, the CGR object represents a physical article. In some implementations, the method includes compositing an affordance in association with the CGR object. In some implementations, the method includes detecting an input directed to the affordance. In some implementations, the method includes, in response to detecting the input, adding an identifier identifying the physical article to a user selection queue.

Various implementations disclosed herein include devices, systems, and methods for displaying a CGR object representing a wearable physical article in accordance with a deformation model of the wearable physical article. In various implementations, a device includes a display, a non-transitory memory and one or more processors coupled with the display and the non-transitory memory. In some implementations, a method includes obtaining a computer-generated reality (CGR) representation of a person. In some implementations, at least a portion of the CGR representation is proportional to a corresponding portion of the person. In some implementations, the method includes obtaining a CGR object that represents a wearable physical article. In some implementations, the CGR object is associated with a deformation model characterizing one or more material characteristics of the wearable physical article. In some implementations, the method includes displaying the CGR object in association with the CGR representation of the person. In some implementations, the CGR object interfaces with the CGR representation of the person in accordance with the deformation model.

Various implementations disclosed herein include devices, systems, and methods for adding identifiers of physical articles to source-specific user selection queues. In various implementations, a device includes a display, a non-transitory memory and one or more processors coupled with the display and the non-transitory memory. In some implementations, a method includes displaying a plurality of computer-generated reality (CGR) objects representing respective physical articles from a plurality of sources including a first source and a second source. In some implementations, the method includes detecting an input selecting a first CGR object of the plurality of CGR objects and a second CGR object of the plurality of CGR objects. In some implementations, the first CGR object represents a first physical article from the first source and the second CGR object represents a second physical article from the second source. In some implementations, the method includes adding an identifier of the first physical article to a first user selection queue that is associated with the first source. In some implementations, the method includes adding an identifier of the second physical article to a second user selection queue that is associated with the second source.

Various implementations disclosed herein include devices, systems, and methods for masking physical articles occluding a physical surface. In various implementations, a device includes a display, an environmental sensor, a non-transitory memory and one or more processors coupled with the display, the environmental sensor and the non-transitory memory. In some implementations, a method includes detecting a physical surface in a physical environment surrounding the device. In some implementations, the method includes detecting one or more physical articles occluding respective portions of the physical surface. In some implementations, the method includes compositing a masking element in order to mask the one or more physical articles that are located on the physical surface.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some CGR devices allow a user to view CGR representations of physical articles. However, if a user wants to add the physical article to a user selection queue, then the user has to navigate back to a webpage corresponding to the physical article in order to populate the user selection queue with an identifier of the physical article. This detracts from the user experience and requires too many user inputs which unnecessarily drains the battery of the device. The present disclosure provides methods, systems, and/or devices for displaying a CGR object representing a physical article, and compositing an affordance along with the CGR object. When the affordance is activated, the physical article is added to a user selection queue. The affordance reduces the need for unnecessary user inputs that correspond to the user navigating back to a web page for the physical article in order to add the physical article to the user selection queue.

FIG. 1A is a block diagram of an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes a first floor lamp 12, a second floor lamp 14, and an electronic device 100. In some implementations, the electronic device 100 is held by a person (not shown). In some implementations, the electronic device 100 includes a smartphone, a tablet, a laptop, or the like.

Figure 1B:
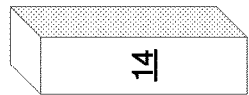
Figure 1B:
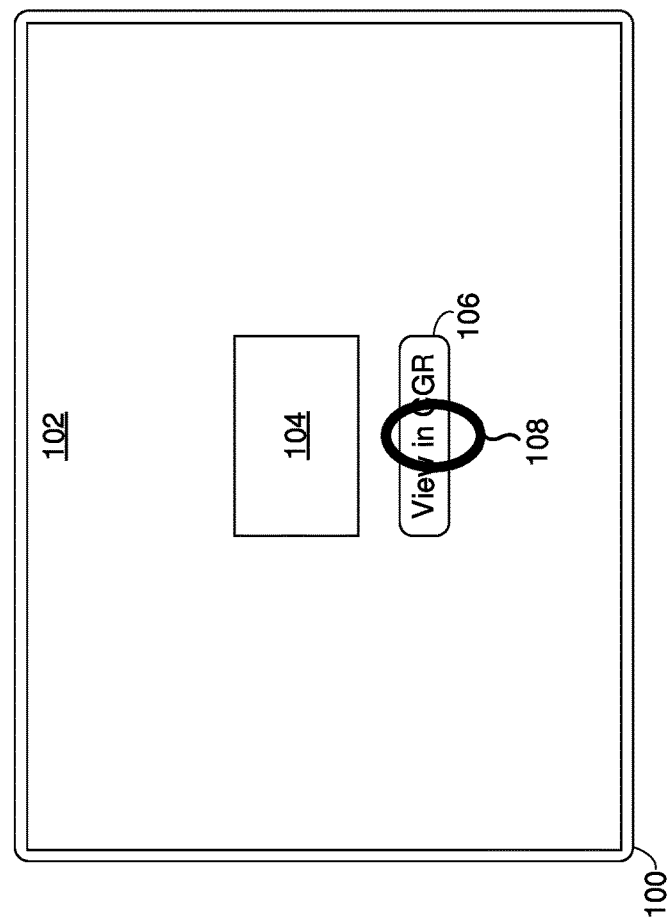
Figure 1B:
Figure 1B:
Figure 1C:
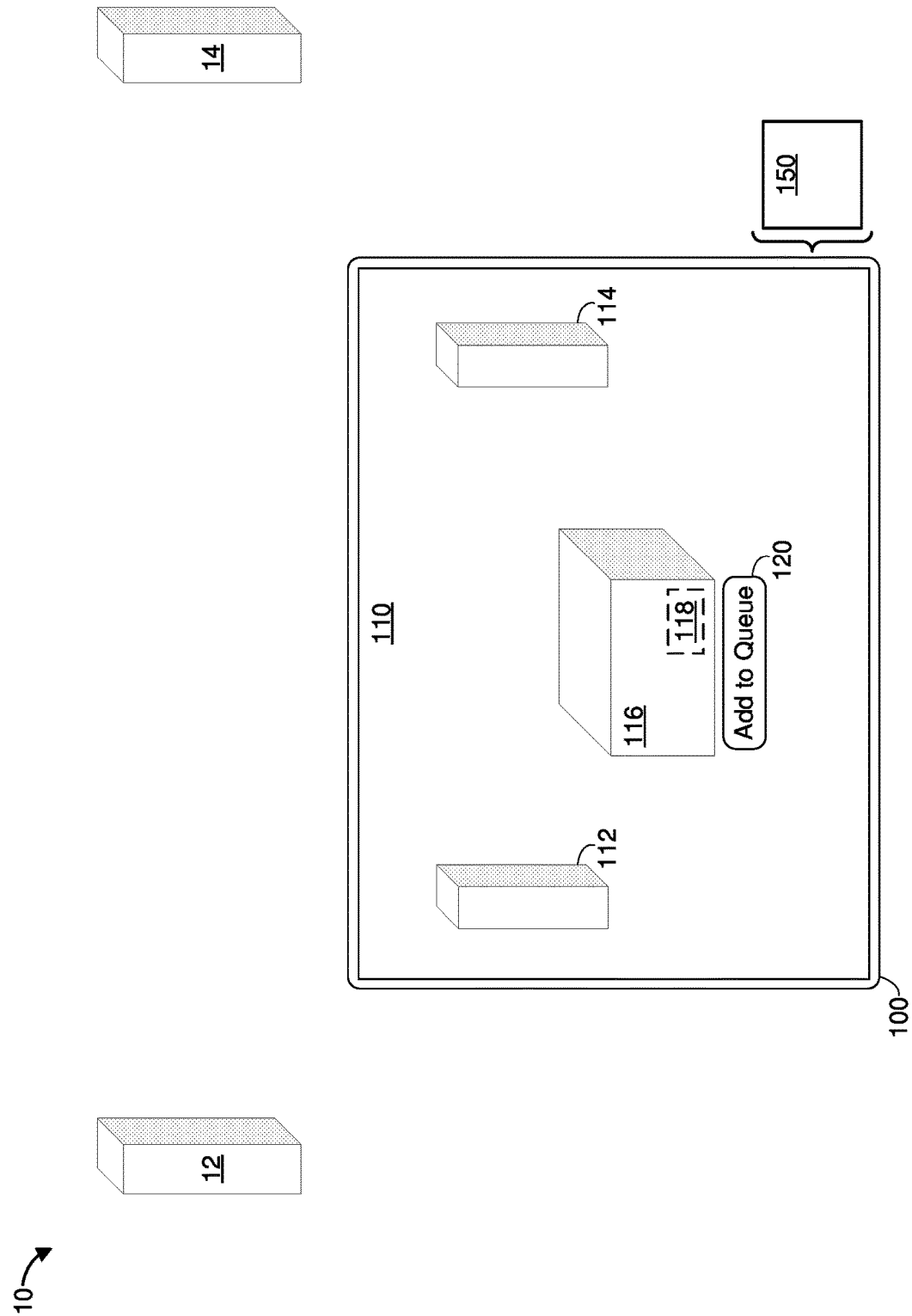

In the example of FIG. 1A, the electronic device 100 displays a web page 102 corresponding to a couch. The web page 102 includes a two-dimensional (2D) representation 104 of the couch (e.g., an image of the couch). The web page 102 also includes an affordance 106 to view a CGR representation of the couch. Referring to FIG. 1B, the electronic device 100 detects a user input 108 activating the affordance 106 (e.g., a contact at a location corresponding to the affordance 106, for example, a tap or a press). As shown in FIG. 1C, in response to detecting the user input 108, the electronic device 100 presents a CGR environment 110.

In the example of FIG. 1C, the CGR environment 110 includes a first CGR floor lamp 112, a second CGR floor lamp 114 and a CGR couch 116. The first CGR floor lamp 112 is a CGR representation of the first floor lamp 12 in the physical environment 10. The second CGR floor lamp 114 is a CGR representation of the second floor lamp 14 in the physical environment 10. The CGR couch 116 is a CGR representation of the couch represented by the 2D representation 104 on the web page 102 shown in FIGS. 1A-1B. In some implementations, the couch is associated with an identifier (ID) 118 that identifies the couch. In some implementations, the ID 118 includes a set of one or more alphanumeric characters (e.g., a serial number, an item number, a barcode number, a name, a title, a description, etc.). In some implementations, the ID 118 includes a machine-readable representation of data (e.g., an optical machine-readable representation of data such as a barcode or a QR code). In some implementations, the electronic device 100 does not display the ID 118 in the CGR environment 110. In some implementations, the CGR environment 110 is a pass-through (e.g., a video pass-through or an optical pass-through) of the physical environment 10.

As shown in FIG. 1C, in some implementations, the electronic device 100 composites an affordance 120 in association with the CGR couch 116. The electronic device 100 adds (e.g., writes) the ID 118 of the couch to a user selection queue 150 in response to an activation of the affordance 120. In some implementations, the electronic device 100 displays the affordance 120 adjacent to the CGR couch 116. For example, as shown in FIG. 1C, the electronic device 100 displays the affordance 120 below the CGR couch 116. However, in some implementations, the electronic device 100 displays the affordance 120 at another location. For example, in some implementations, the electronic device 100 overlays the affordance 120 onto the CGR couch 116. In the example of FIG. 1C, the affordance 120 is visible. However, in some implementations, the affordance 120 is invisible. For example, in some implementations, the CGR couch 116 serves as the affordance 120. In such implementations, the electronic device 100 adds an ID of the couch to the user selection queue in response to detecting a selection of the CGR couch 116.

Figure 1D:
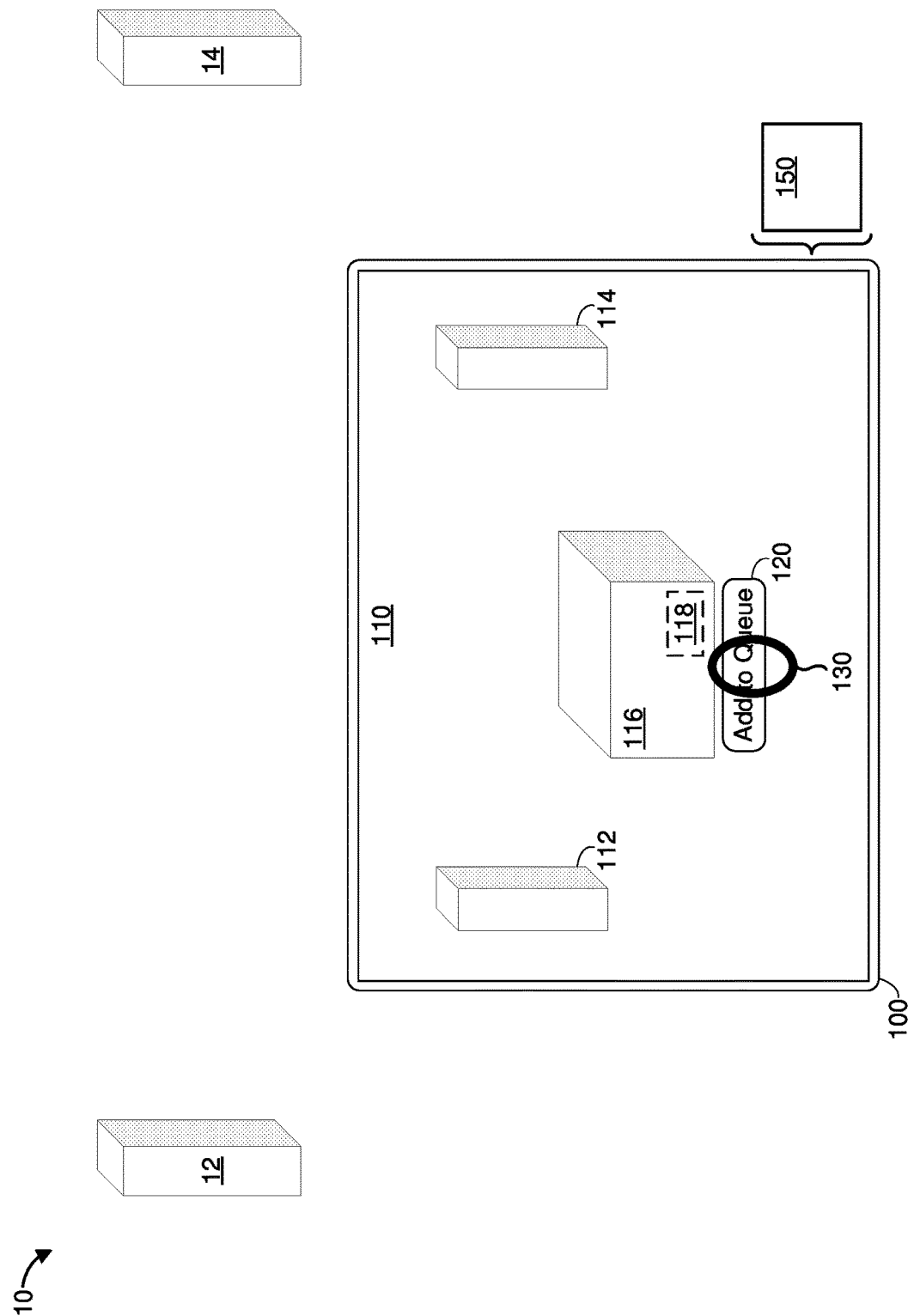
Figure 1E:
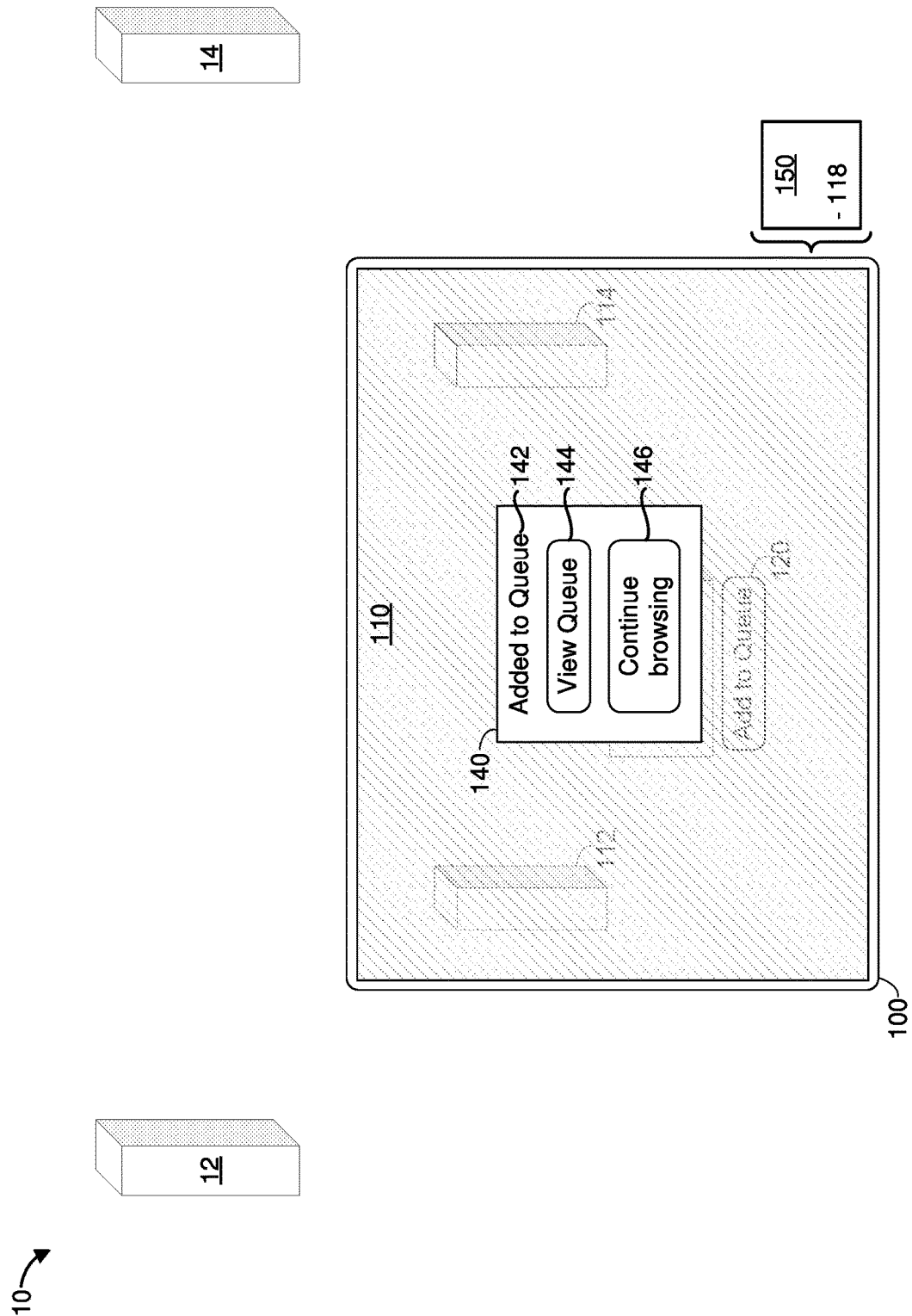

Referring to FIG. 1D, the electronic device 100 detects a user input 130 directed to the affordance 120. In the example of FIG. 1D, the user input 130 includes a contact at a location corresponding to the affordance 120 (e.g., a tap or a press). In some implementations, the electronic device 100 detects a gaze input directed to the affordance 120. In some implementations, the electronic device 100 detects a verbal input directed to the affordance 120. In some implementations, the electronic device 100 detects a three-dimensional (3D) gesture that corresponds to a selection of the affordance 120. For example, the electronic device 100 utilizes hand tracking to detect that a person controlling the electronic device 100 has performed the 3D gesture. In some implementations, the electronic device 100 obtains an input, from a controller (not shown), that corresponds to a selection of the affordance 120. For example, the electronic device 100 detects an activation of a controller button that corresponds to the affordance 120. As shown in FIG. 1E, in response to detecting the user input 130, the electronic device 100 adds the ID 118 of the couch to the user selection queue 150.

Referring to FIG. 1E, in some implementations, the electronic device 100 displays a notification 140 in response to detecting the user input 130 shown in FIG. 1D. In some implementations, the notification 140 indicates that the electronic device 100 has added the ID 118 of the couch to the user selection queue 150. For example, as shown in FIG. 1E, in some implementations, the notification 140 includes text 142 (e.g., "Couch added to queue"). In some implementations, the notification 140 includes an affordance 144 to display a visual representation of the user selection queue 150, and an affordance 146 to continue browsing.

Figure 1F:
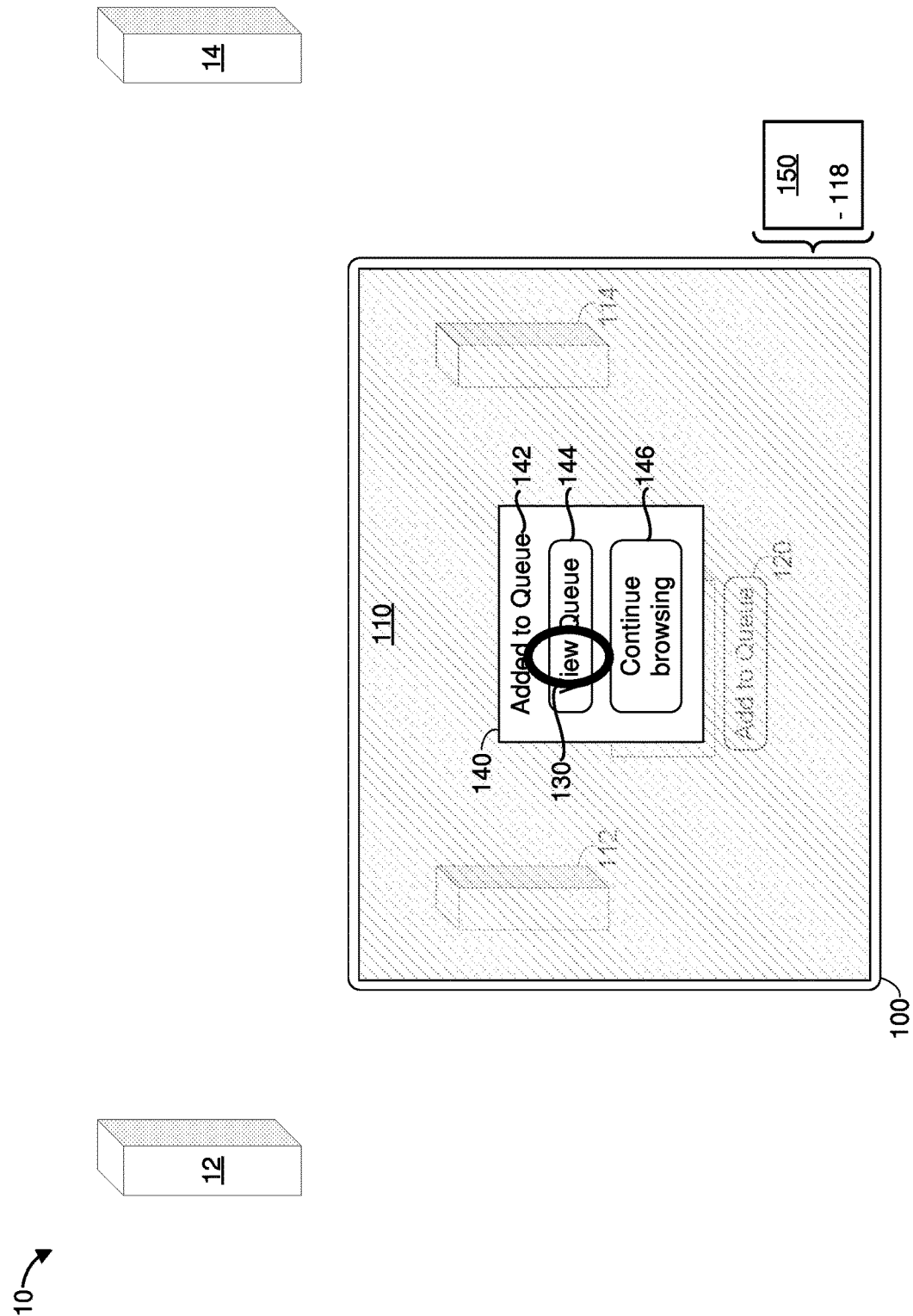
Figure 1G:
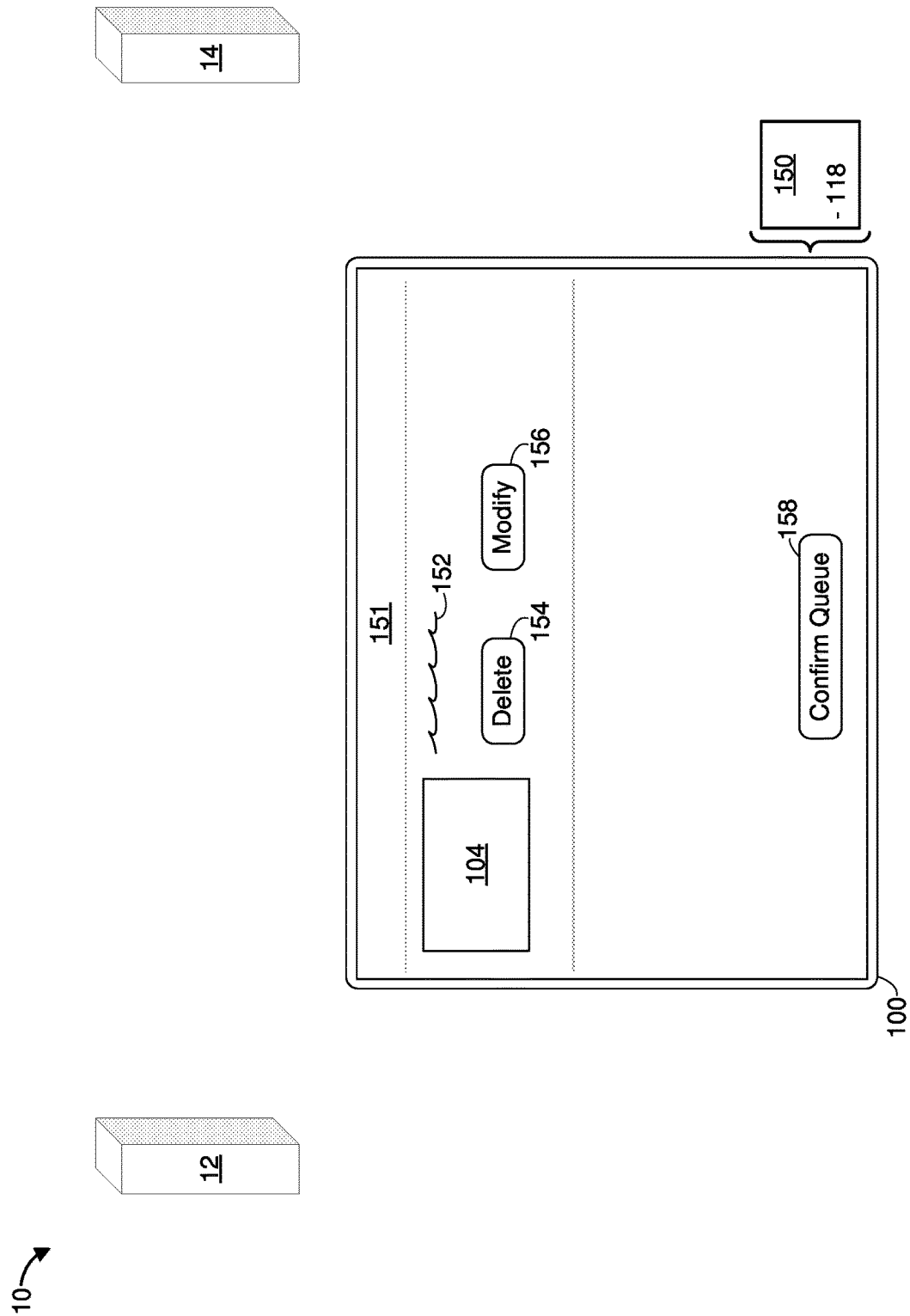

Referring to FIG. 1F, the electronic device 100 detects a user input 130 directed to the affordance 144 for displaying a visual representation of the user selection queue 150. As shown in FIG. 1G, in response to detecting the user input 130, the electronic device 100 displays a visual representation 151 of the user selection queue 150. In the example of FIG. 1G, the visual representation 151 of the user selection queue 150 includes the 2D representation 104 of the couch, a description 152 of the couch, a delete affordance 154 to remove the ID 118 from the user selection queue 150, a modify affordance 156, and a confirm affordance 158. In some implementations, the modify affordance 156 allows a user of the electronic device 100 to modify a quantity associated with the couch (e.g., increase the quantity from a default quantity of '1' to a higher number). In some implementations, the confirm affordance 158 allows a user of the electronic device 100 to confirm the user selection queue 150. In some implementations, detecting an activation of the confirm affordance 158 triggers the electronic device 100 to perform an operation (e.g., the electronic device 100 triggers transferring of credits to another device, for example, to a device associated with a seller of the couch).

Figure 1H:
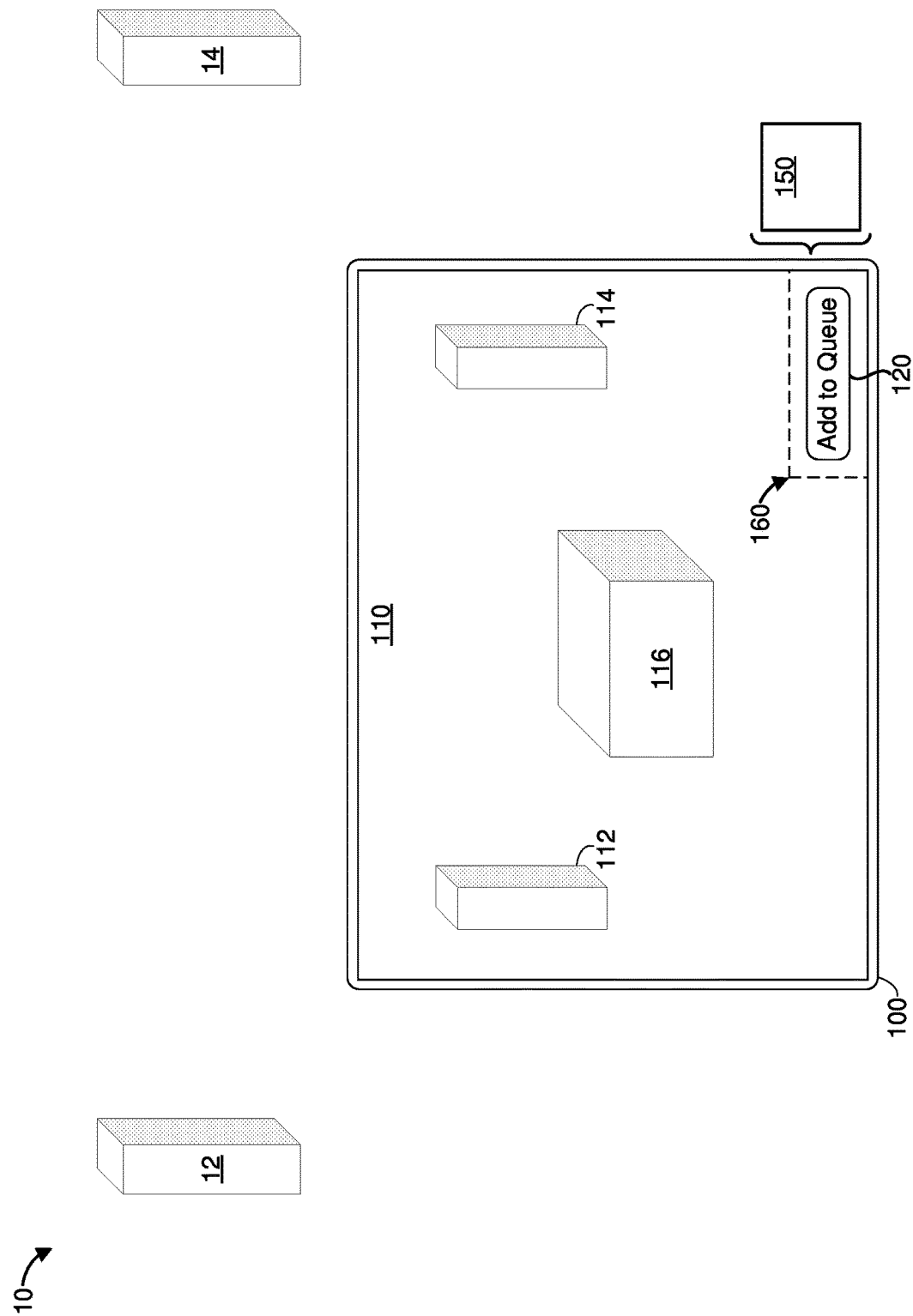

Referring to FIG. 1H, in some implementations, the electronic device 100 displays the affordance 120 in a designated portion 160 of the CGR environment 110. In the example of FIG. 1H, the designated portion 160 is towards the bottom-right corner of the CGR environment 110. However, in some implementations, the designated portion 160 is towards the left side of the CGR environment 110, the right side of the CGR environment 110, the top portion of the CGR environment 110, the bottom portion of the CGR environment 110, or at the center of the CGR environment 110.

Referring to FIG. 1I, in some implementations, the electronic device 100 displays CGR representations of multiple articles that are not in the physical environment 10. In the example of FIG. 1I, the electronic device 100 displays a CGR painting 170 that represents a physical painting. In some implementations, the electronic device 100 displays an affordance 172 to add an ID (not shown) identifying the physical painting to the user selection queue 150. In some implementations, the electronic device 100 displays an affordance 180 to concurrently add IDs of multiple physical articles to the user selection queue 150. In the example of FIG. 1I, in response to detecting an activation of the affordance 180, the electronic device 100 adds the ID 118 of the couch to the user selection queue 150 and an ID of the physical painting to the user selection queue 150. As such, a user of the electronic device 100 need not separately activate the affordances 120 and 172 thereby reducing a number of user inputs and enhancing the user experience of the electronic device 100.

In some implementations, a head-mountable device (HMD) (not shown), being worn by a person, presents (e.g., displays) the CGR environment 110 according to various implementations. In some implementations, the HMD includes an integrated display (e.g., a built-in display) that displays the CGR environment 110. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the CGR environment 110. In various implementations, examples of the electronic device 100 include smartphones, tablets, media players, laptops, etc.

Figure 1J:
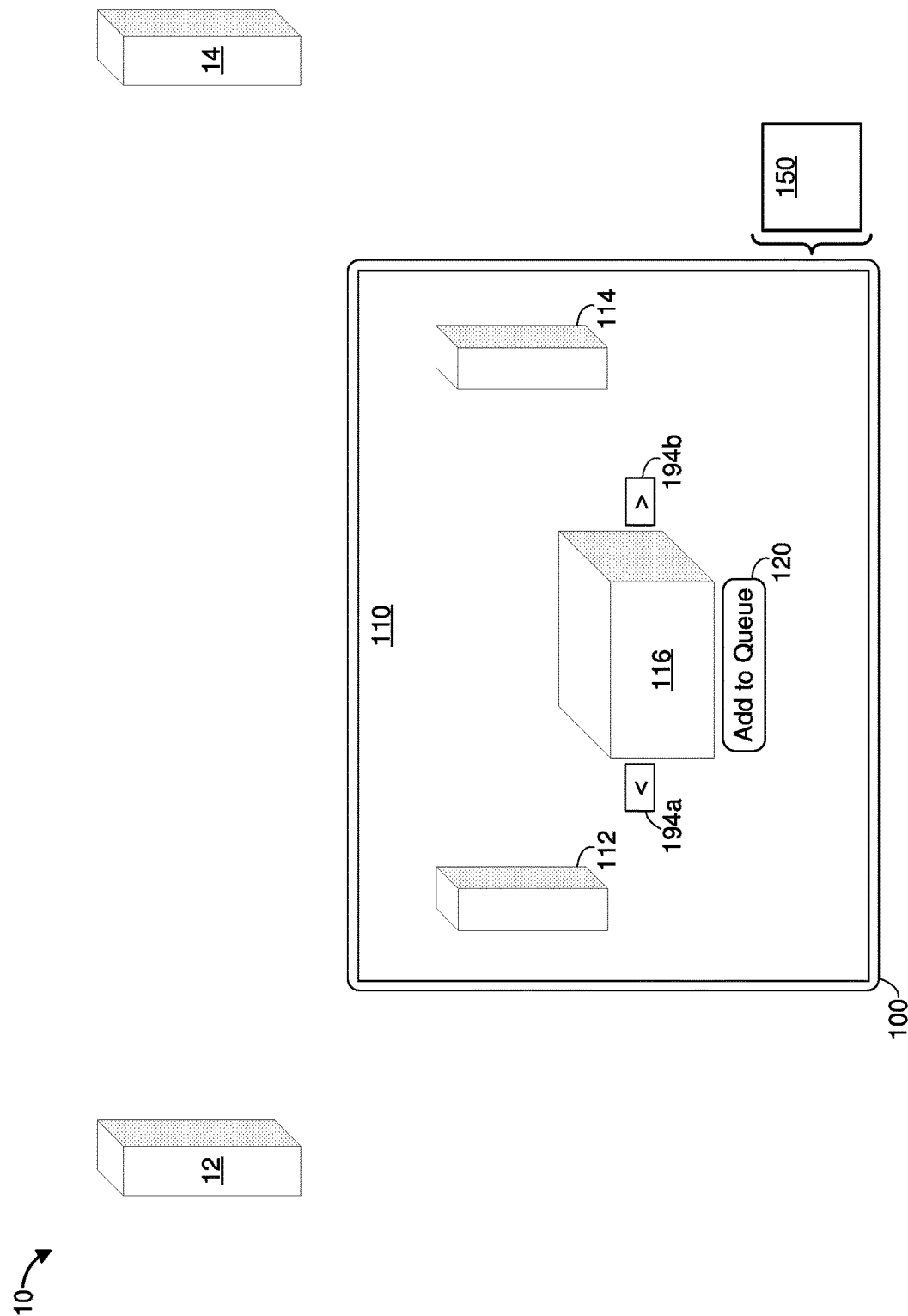

Referring to FIG. 1J, in some implementations, the electronic device 100 displays a replacement affordance to replace a CGR object with a replacement CGR object. In the example of FIG. 1J, the electronic device 100 displays a first replacement affordance 194a (e.g., a left arrow) and a second replacement affordance 194b (e.g., a right arrow) that allow a user of the electronic device 100 to replace the CGR couch 116 with a replacement CGR object (e.g., another CGR couch, for example, a different CGR couch that represents a different physical couch).

Figure 1K:
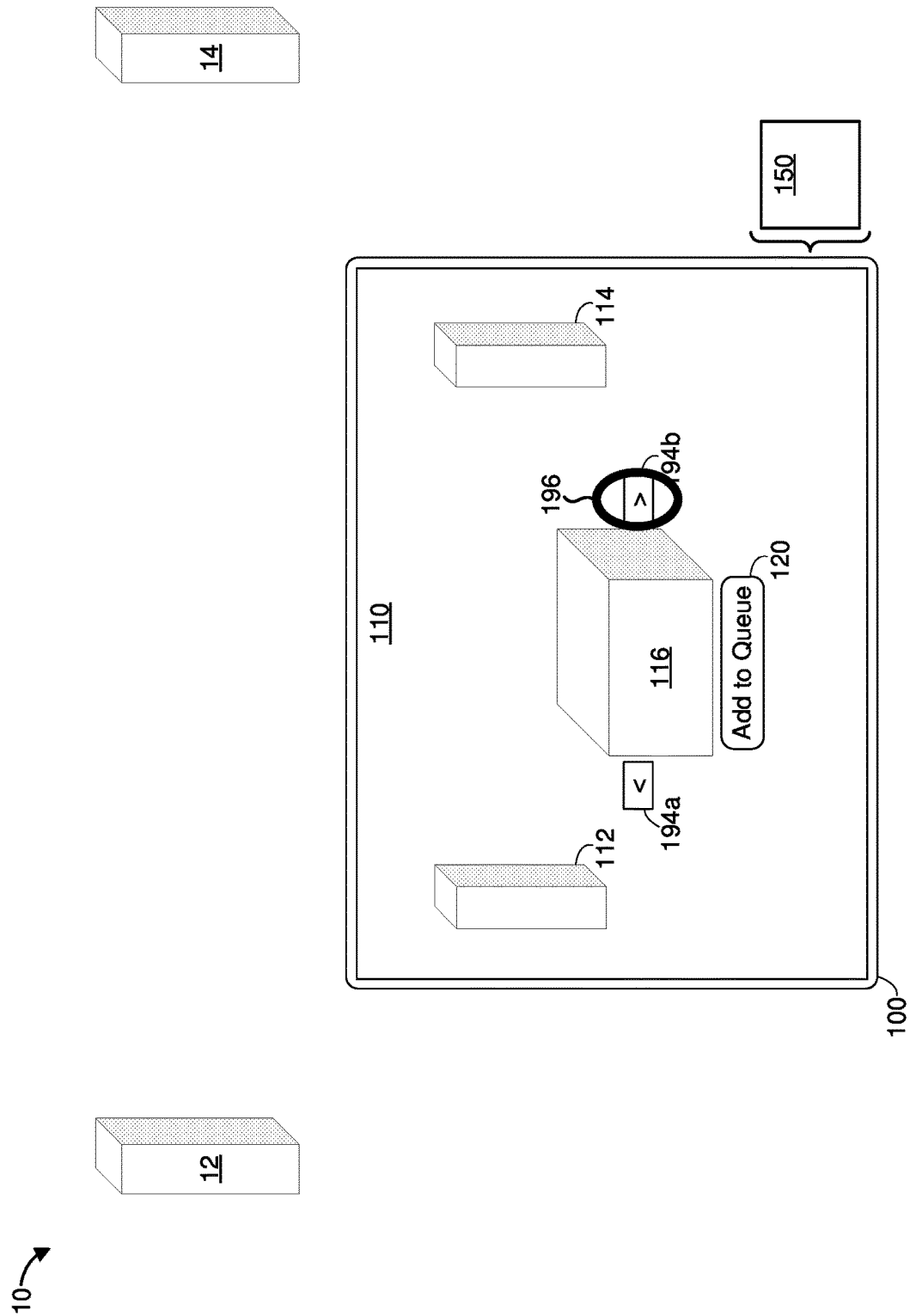
Figure 1L:
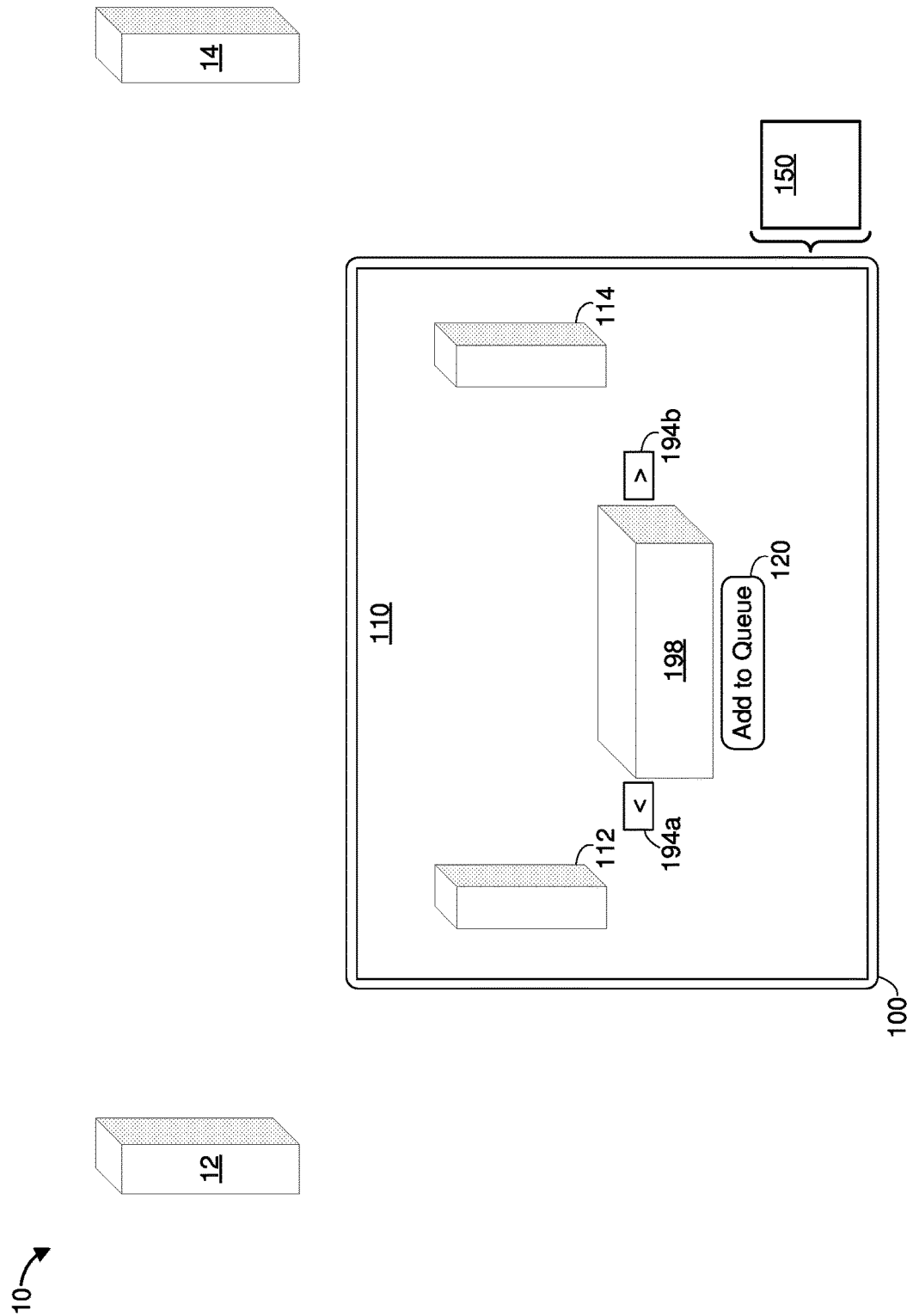

Referring to FIG. 1K, the electronic device 100 detects a user input 196 directed to the second replacement affordance 194b. As shown in FIG. 1L, in response to detecting the user input 196, the electronic device 100 replaces the CGR couch 116 with a second CGR couch 198 that represents a second physical couch which is different from the physical couch represented by the CGR couch 116 shown in FIG. 1N. In the example of FIG. 1L, the affordance 120 is configured to add an ID of the second physical couch to the user selection queue 150.

Selecting wearable physical articles via a device is sometimes difficult because size charts are often inaccurate and wearable physical articles often do not fit the user well. As such, a user often has to return the wearable physical article which results in unnecessary user inputs that lead to wear-and-tear on the device and/or excessive power usage. The present disclosure provides methods, systems, and/or devices for generating a CGR object that represents a wearable physical article, and displaying the CGR object as being worn by a CGR representation of the user. The CGR object is associated with a deformation model which defines how the CGR object deforms when the CGR object is worn by the CGR representation of the user.

The deformation model of the CGR object is a function of one or more material characteristics of the wearable physical article. For example, the deformation model is a function of a material type, a texture, a stiffness, an elasticity, a color, and/or a size of the wearable physical article. The CGR representation of the user can be generated by scanning the user. For example, by taking pictures of the user and determining user dimensions based on photogrammetry. The user dimensions can also be determined based on depth data captured by a depth camera. The device can obtain the CGR object (e.g., from a manufacturer of the wearable physical article), or generate the CGR object based on the material characteristics of the wearable physical article. For example, the device can utilize a size value and material composition information associated with the wearable physical article to generate the CGR object.

Figure 2A:
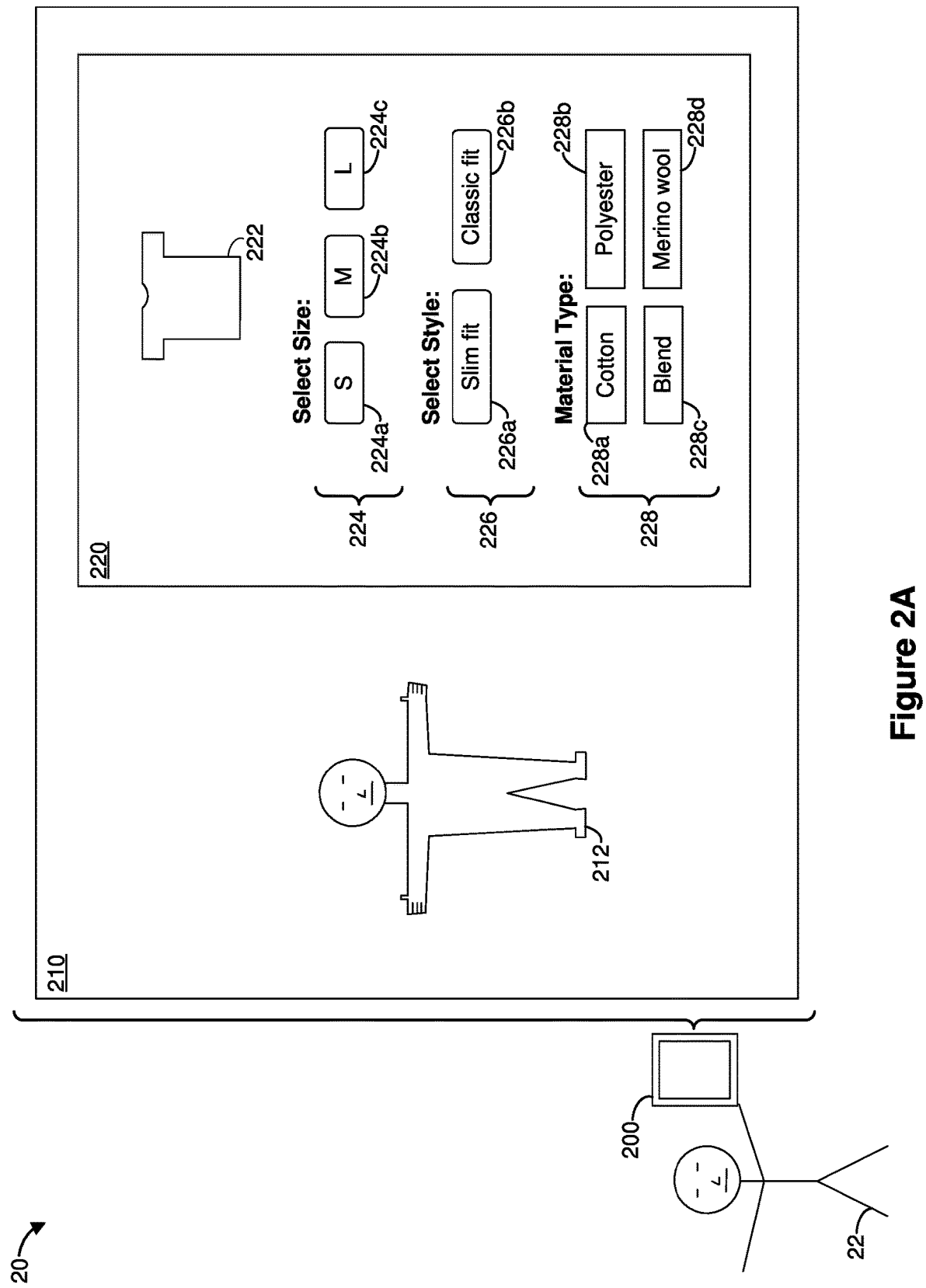
FIGS. 2A-2G are diagrams of an example operating environment for displaying a CGR object that represents a wearable physical article in accordance with some implementations.

FIG. 2A is a block diagram of an example physical environment 20 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 20 includes a person 22 and an electronic device 200. As shown in FIG. 2A, in some implementations, the electronic device 200 is held by the person 22. In some implementations, the electronic device 200 includes a smartphone, a tablet, a laptop, or the like.

In the example of FIG. 2A, the electronic device 200 displays a CGR environment 210. The CGR environment 210 includes a CGR representation 212 of the person 22. In some implementations, the CGR representation 212 is proportional to the person 22. For example, a ratio between a head and a torso of the CGR representation 212 matches a ratio between a head and a torso of the person 22. In various implementations, the electronic device 200 generates the CGR representation 212 of the person 22 based on a body model of the person 22. In some implementations, the electronic device 200 captures images of the person 22, generates a body model of the person 22 based on the images, and generates the CGR representation 212 in accordance with the body model. In some implementations, the electronic device 100 receives a user input corresponding to body measurements of the person 22, and the electronic device 200 generates the CGR representation 212 based on the body measurements.

In the example of FIG. 2A, the CGR environment 210 includes a CGR object configuration panel 220 ("panel 220", hereinafter for the sake of brevity). The panel 220 includes a two-dimensional (2D) representation 222 of a T-shirt (e.g., an image of a T-shirt). In some implementations, the panel 220 includes affordances for selecting a particular configuration of the T-shirt represented by the 2D representation 222. In the example of FIG. 2A, the panel 220 includes size affordances 224 for selecting a size of the T-shirt, style affordances 226 for selecting a style of the T-shirt, and material affordances 228 for selecting a material type of the T-shirt. The size affordances 224 include a small size affordance 224a for selecting a small size of the T-shirt, a medium size affordance 224b for selecting a medium size of the T-shirt, and a large size affordance 224c for selecting a large size of the T-shirt. The style affordances 226 includes a slim fit style affordance 226a for selecting a slim fit style of the T-shirt, and a classic fit style affordance 226b for selecting a classic fit style of the T-shirt. The material affordances 228 include a cotton affordance 228a for selecting a cotton version of the T-shirt, a polyester affordance 228b for selecting a polyester version of the T-shirt, a blend affordance 228c for selecting a blended material version of the T-shirt, and a merino wool affordance 228d for selectin a merino wool version of the T-shirt.

Figure 2B:
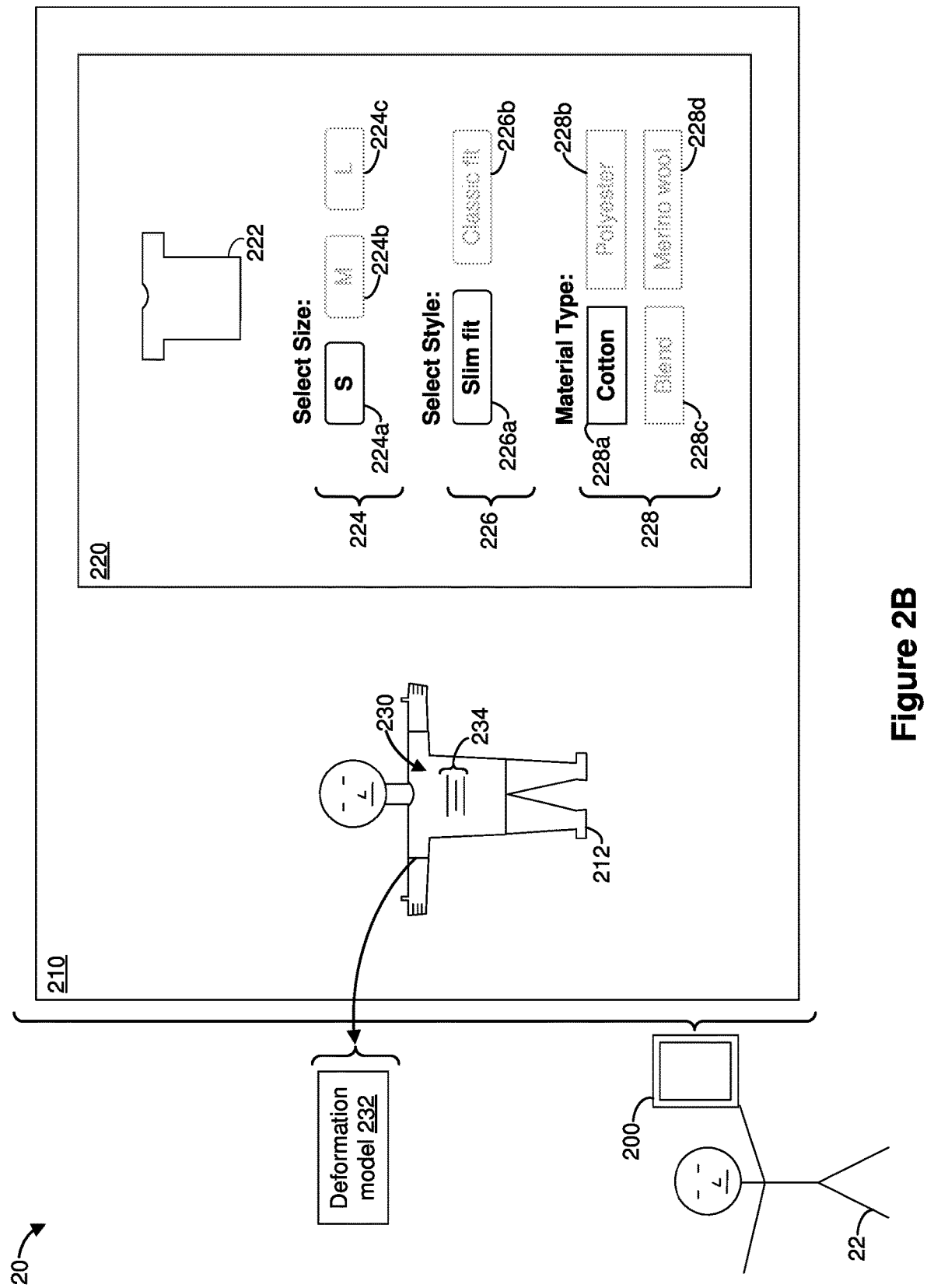

Referring to FIG. 2B, the electronic device 200 detects that the small size affordance 224a, the slim fit style affordance 226a, and the cotton affordance 228a have been selected. The electronic device 200 generates and displays a CGR T-shirt 230 in association with the CGR representation 212 of the person 22. For example, the electronic device 200 displays the CGR T-shirt 230 as being worn by the CGR representation 212 of the person 22. In some implementations, the electronic device 200 overlays the CGR T-shirt 230 over the CGR representation 212 of the person 22.

The CGR T-shirt 230 is associated with a deformation model 232. The deformation model 232 defines how the CGR T-shirt 230 interfaces with the CGR representation 212 of the person 22, which is representative of how a corresponding physical T-shirt (e.g., a cotton T-shirt that is small and slim fit) would fit the person 22. In some implementations, the deformation model 232 is a function of the selected affordances 224, 226 and 228. For example, the deformation model 232 is a function of the small size, the slim fit style and the cotton material of the T-shirt. More generally, in various implementations, the deformation model 232 is a function of one or more material characteristics (e.g., size, material type, style, stiffness, elasticity, etc.) of the T-shirt. The deformation model 232 defines a deformation of the CGR T-shirt 230 over the CGR representation 212 of the person 22. The deformation model 232 defines how a physical T-shirt represented by the CGR T-shirt 230 would fit the person 22.

Since the deformation model 232 characterizes one or more material characteristics of the T-shirt, the CGR T-shirt 230 is within a degree of similarity of a corresponding physical T-shirt. For example, the CGR T-shirt 230 is within a degree of similarity of a physical T-shirt that is small, slim fit and made from cotton. As such, a deformation of the CGR T-shirt 230 over the CGR representation 212 of the person 22 is within a degree of similarity to a deformation of the corresponding physical T-shirt over the person 22. For example, a fit of the CGR T-shirt 230 on the CGR representation 212 is within a degree of similarity of a fit of the corresponding physical T-shirt on the person 22. In the example of FIG. 2B, putting the CGR T-shirt 230 on the CGR representation 212 results in CGR stretch lines 234. Since the deformation of the CGR T-shirt 230 on the CGR representation 212 is within a degree of similarity to the deformation of the corresponding physical T-shirt on the person 22, the person 22 wearing the corresponding physical T-shirt will likely result in physical stretch lines that are similar to the CGR stretch lines 234.

Figure 2C:
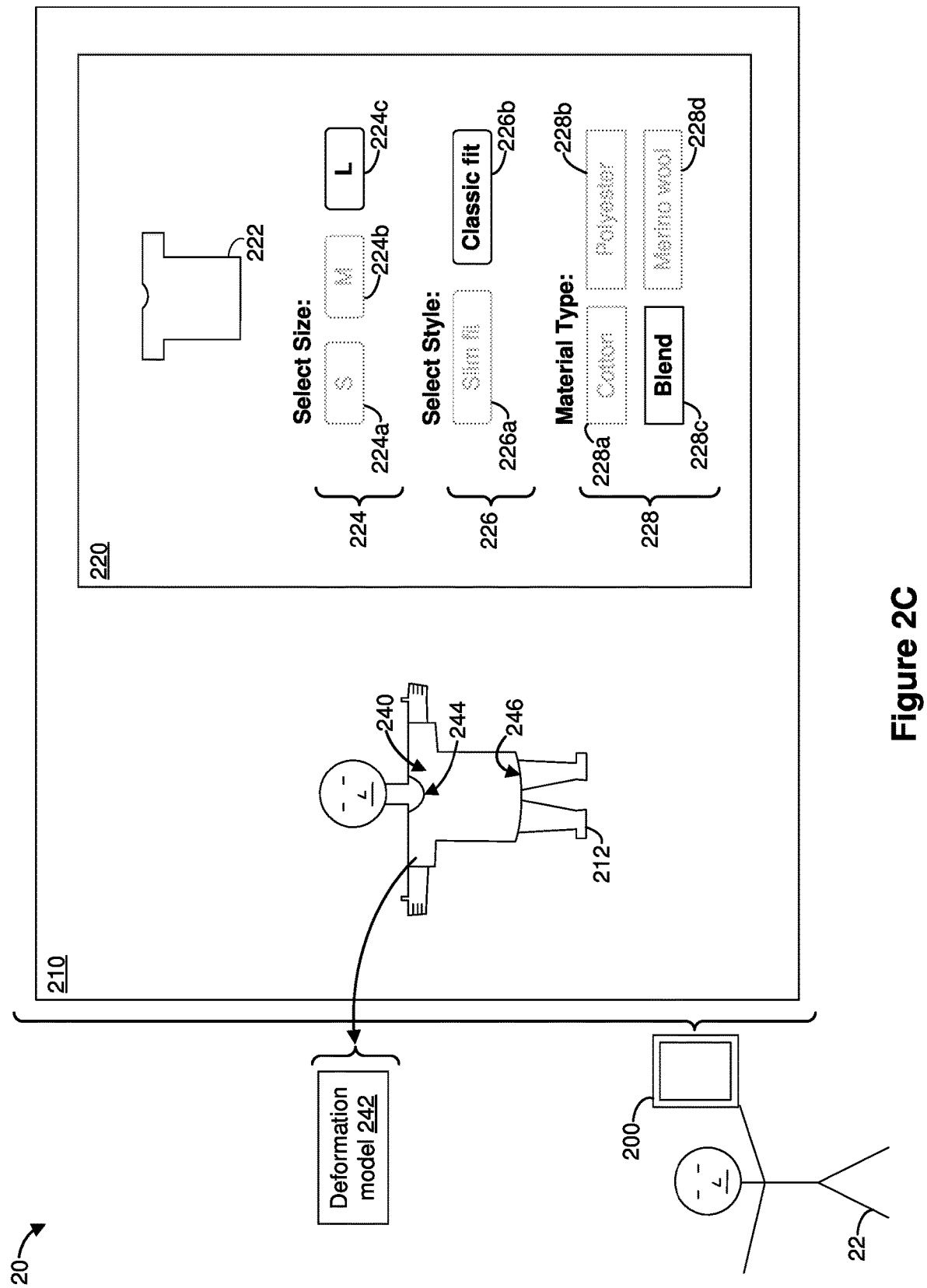

Referring to FIG. 2C, the electronic device 200 detects that the large size affordance 224c, the classic fit style affordance 226b, and the blend affordance 228c have been selected. In response to detecting the selection of the large size affordance 224c, the classic fit style affordance 226b, and the blend affordance 228c, the electronic device 200 generates and displays a CGR T-shirt 240 as being worn by the CGR representation 212 of the person 22. The CGR T-shirt 240 is associated with a deformation model 242. The deformation model 242 is a function of the large size, the classic fit style and the blend material of the T-shirt. The deformation model 242 defines a deformation of the CGR T-shirt 240 over the CGR representation 212 of the person 22. In the example of FIG. 2C, putting the CGR T-shirt 240 on the CGR representation 212 results in CGR drooping 244 at a neck portion of the CGR T-shirt 240 and CGR drooping 246 towards the bottom of the CGR T-shirt 240. Since the deformation model 242 models a deformation of the corresponding physical T-shirt on the person 22, the corresponding physical T-shirt will likely droop at a neck portion of the physical T-shirt and towards the bottom of the physical T-shirt when the person 22 wears the corresponding physical T-shirt.

Figure 2D:
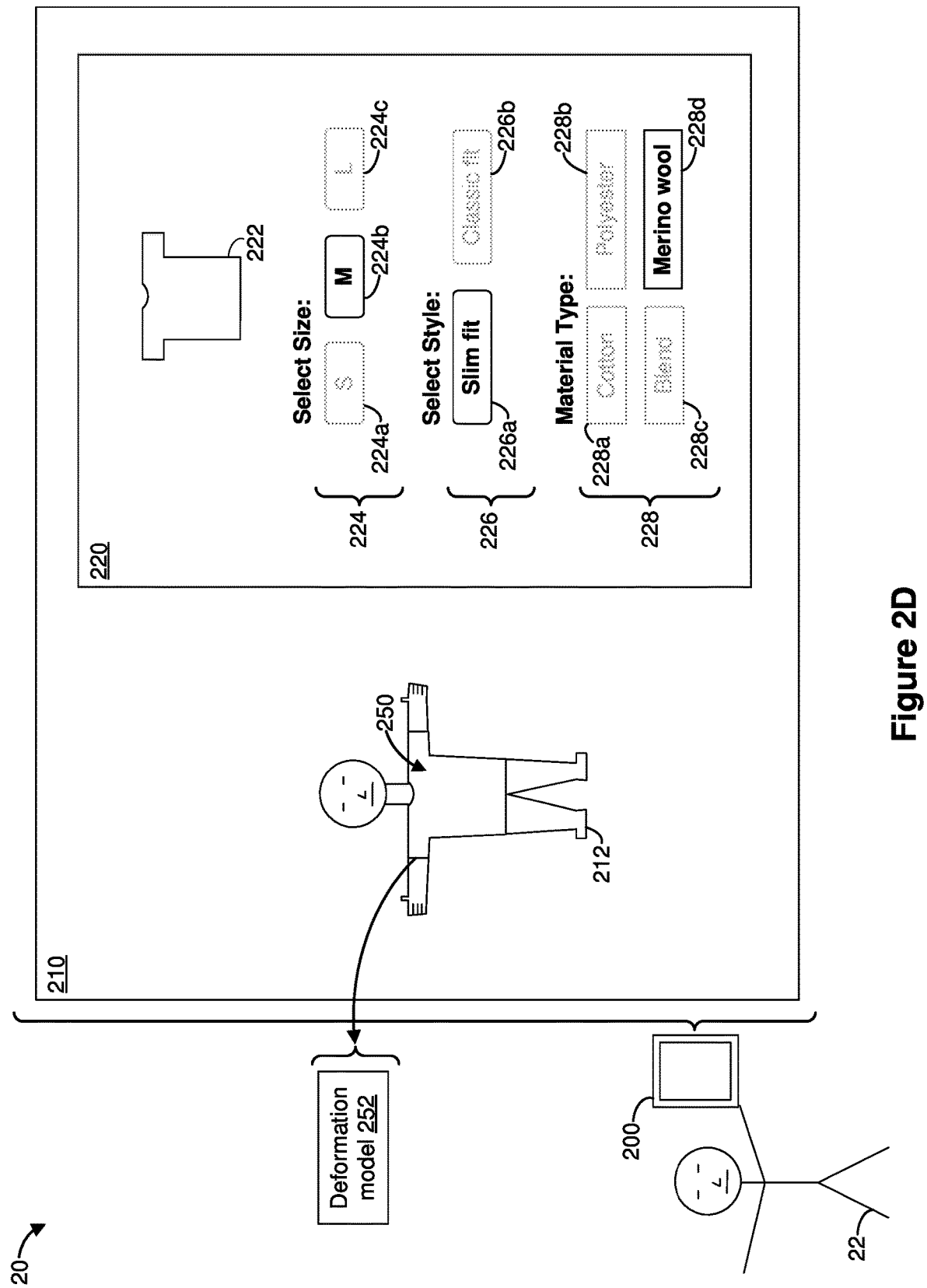

Referring to FIG. 2D, the electronic device 200 detects that the medium size affordance 224b, the slim fit style affordance 226a, and the merino wool affordance 228d have been selected. In response to detecting the selection of the medium size affordance 224b, the slim fit style affordance 226a, and the merino wool affordance 228d, the electronic device 200 generates and displays a CGR T-shirt 250 as being worn by the CGR representation 212 of the person 22. The CGR T-shirt 250 is associated with a deformation model 252. The deformation model 252 is a function of the medium size, the slim fit style and the merino wool material of the T-shirt. The deformation model 252 defines a deformation of the CGR T-shirt 250 over the CGR representation 212 of the person 22. In the example of FIG. 2D, putting the CGR T-shirt 250 on the CGR representation 212 does not result in stretch lines or drooping. Since the deformation model 252 models a deformation of the corresponding physical T-shirt on the person 22, the corresponding physical T-shirt will likely not droop or result in stretch lines when the person 22 wears the corresponding physical T-shirt. The CGR T-shirt 250 appears to be a better fit on the CGR representation 212 than the CGR T-shirts 230 and 240 shown in FIGS. 2B and 2C, respectively. As such, the physical T-shirt corresponding to the CGR T-shirt 250 will likely be a better fit on the person 22 than the physical T-shirts corresponding to the CGR T-shirts 230 and 240.

Figure 2E:
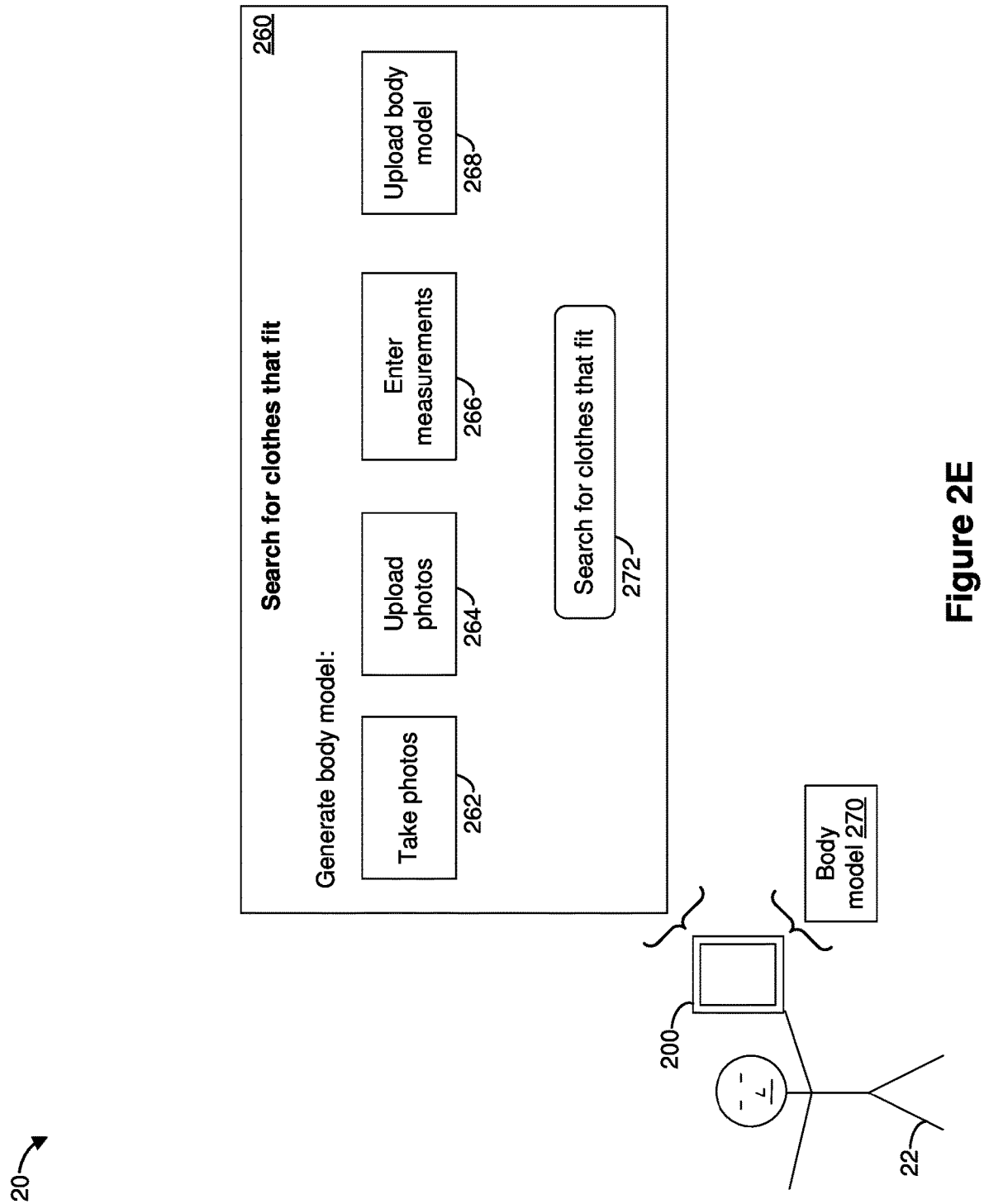

FIG. 2E illustrates a graphical user interface (GUI) 260 that allows the person 22 to search for wearable physical articles based on a body model 270 of the person 22. In some implementations, the GUI 260 allows the person 22 to generate the body model 270. In the example of FIG. 2E, the GUI 260 includes an affordance 262 that, when activated, triggers capturing of images of the person 22. In some implementations, the GUI 260 includes an upload image affordance 264 for uploading images (e.g., images of the person 22). In some implementations, the electronic device 200 generates the body model 270 based on the captured images and/or the uploaded images. In some implementations, the electronic device 200 utilizes methods, devices and/or systems associated with photogrammetry to extract dimensions of the person 22 from the captured images and/or the uploaded images, and the electronic device 200 generates the body model 270 based on the dimensions of the person 22.

In some implementations, the GUI 260 includes a measurement affordance 266 that allows the person 22 to enter body measurements (e.g., body dimensions of the person 22 such as a waist size, arm size, thigh size, arm size, etc.). In such implementations, the electronic device 200 generates the body model 270 based on the body measurements obtained by the electronic device 200. In some implementations, the GUI 260 includes an upload model affordance 268 that, when activated, allows the person 22 to upload the body model 270. In the example of FIG. 2E, the GUI 260 includes a search affordance 272 that, when activated, triggers a search for wearable physical articles based on the body model 270.

Figure 2F:
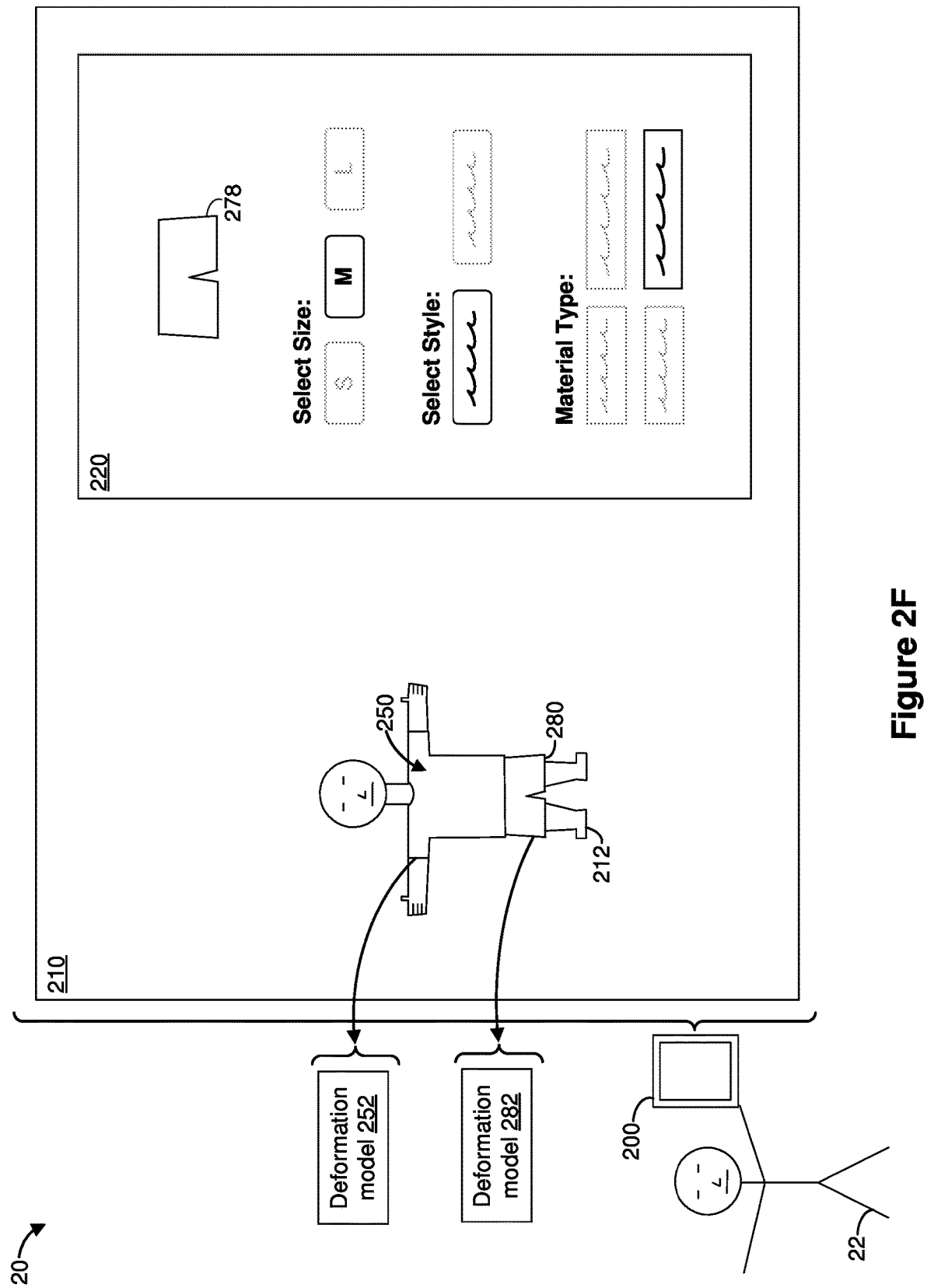

In some implementations, the CGR environment 210 concurrently displays CGR objects representing multiple wearable physical articles in association with the CGR representation 212 of the person 22. For example, the CGR environment 210 concurrently displays the CGR representation 212 wearing multiple CGR objects representing respective wearable physical articles. Referring to FIG. 2F, the panel 220 displays a 2D representation 278 of a physical pair of shorts. The CGR environment 210 displays a pair of CGR shorts 280, that represents the physical pair of shorts, as being worn by the CGR representation 212 of the person 22. The pair of CGR shorts 280 is associated with a deformation model 282 that models the deformation of the corresponding physical pair of shorts on the person 22.

Figure 2G:
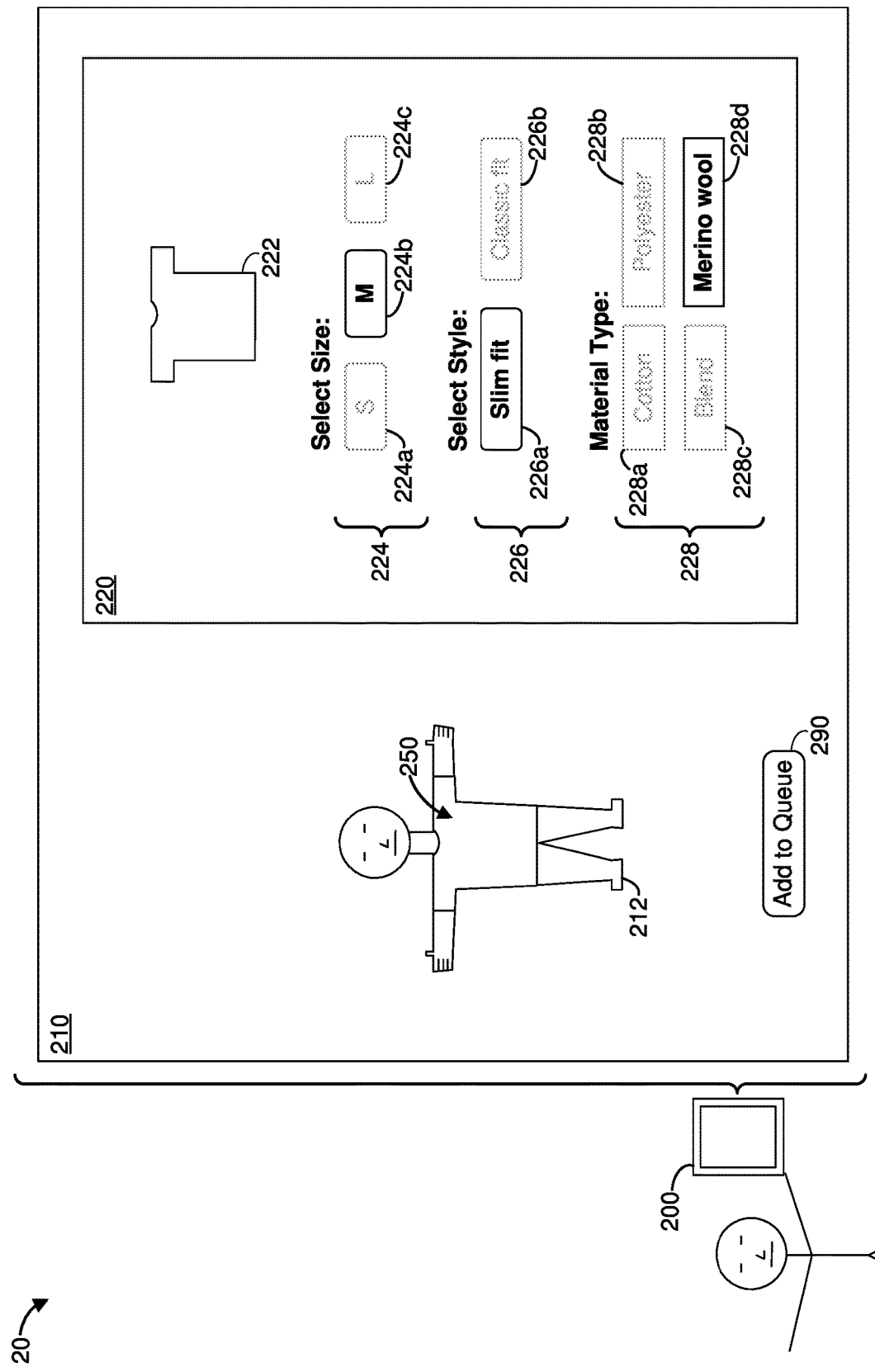

Referring to FIG. 2G, in some implementations, the CGR environment 210 includes an affordance 290 to add an identifier identifying the physical T-shirt represented by the CGR shirt 250 to a user selection queue (e.g., the user selection queue 150 shown in FIG. 1C). In some implementations, the electronic device 200 detects an activation of the affordance 290, and adds the identifier to the user selection queue.

In some implementations, a head-mountable device (HMD) (not shown), being worn by the person 22, presents (e.g., displays) the CGR environment 210 according to various implementations. In some implementations, the HMD includes an integrated display (e.g., a built-in display) that displays the CGR environment 210. In some implementations, the HMD includes a head-mountable enclosure. In various implementations, the head-mountable enclosure includes an attachment region to which another device with a display can be attached. For example, in some implementations, the electronic device 200 can be attached to the head-mountable enclosure. In various implementations, the head-mountable enclosure is shaped to form a receptacle for receiving another device that includes a display (e.g., the electronic device 200). For example, in some implementations, the electronic device 200 slides/snaps into or otherwise attaches to the head-mountable enclosure. In some implementations, the display of the device attached to the head-mountable enclosure presents (e.g., displays) the CGR environment 210. In various implementations, examples of the electronic device 200 include smartphones, tablets, media players, laptops, etc.

Adding identifiers of physical articles from different sources to respective user selection queues often requires a sequence of user inputs which detracts from the user experience. For example, the user may have to navigate to a web page for each source and add identifiers of physical articles provided by that source to a source-specific user selection queue. Excessive user inputs contribute to unnecessary wear-and-tear and unnecessary battery usage on a device. The present disclosure provides methods, systems, and/or devices for allowing a user to view CGR objects representing physical articles provided by different sources and adding identifiers identifying some or all of the physical articles to source-specific user selection queues. The present disclosure provides methods, systems, and/or devices that reduce the need to navigate to different pages corresponding to each source. As such, the present disclosure provides an enhanced user experience, reduces wear-and-tear on the device, and/or reduces power consumption by reducing unnecessary user inputs.

A device concurrently displays CGR objects representing physical articles from different sources. The device allows the user to provide an input selecting some or all of the CGR objects. The device adds identifiers of the physical articles corresponding to the selected CGR objects to source-specific user selection queues. For example, if the user selects physical articles that are provided by five different sources, then the device populates five source-specific user selection queues that correspond to the five sources.

Figure 3A:
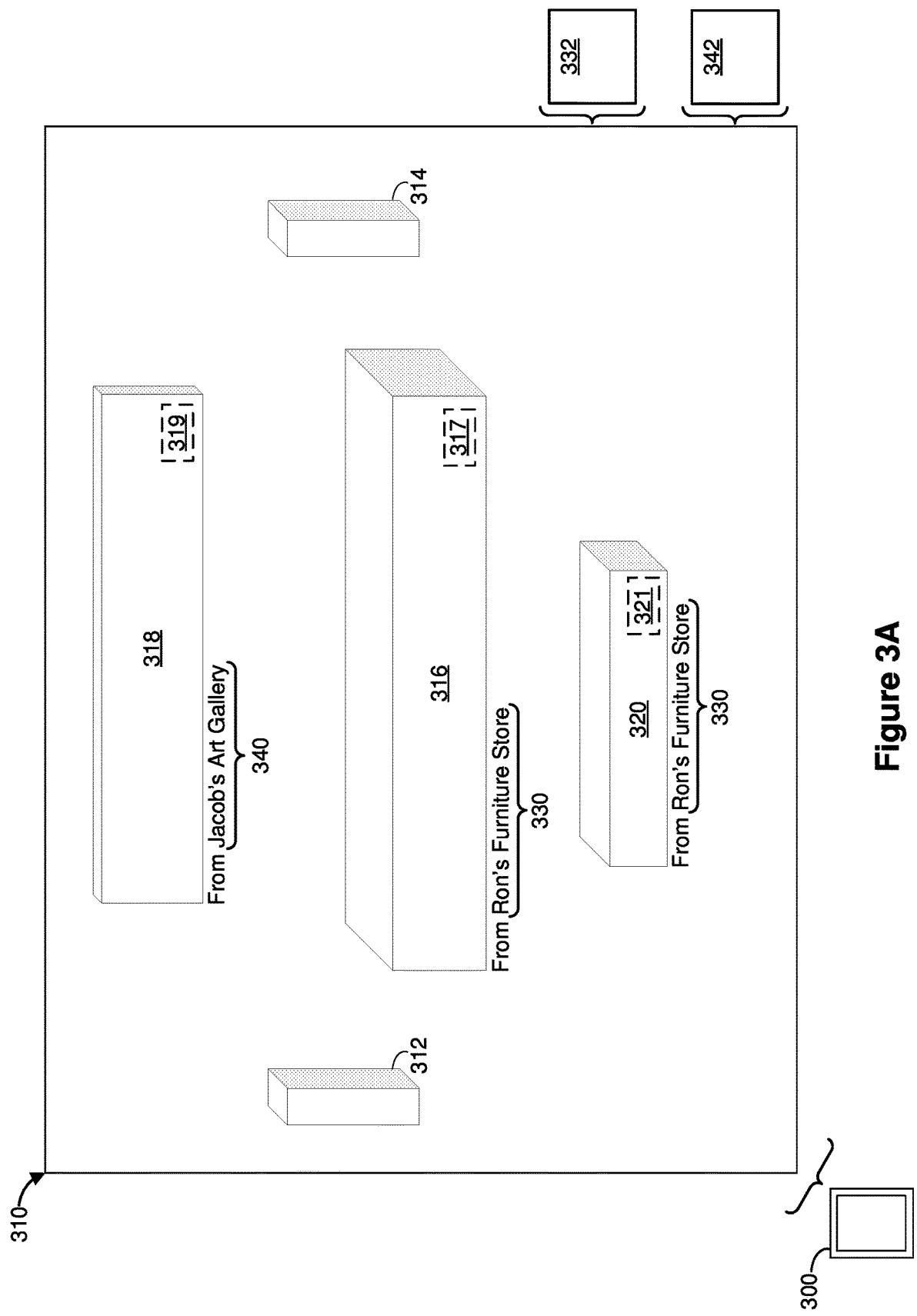
FIGS. 3A-3I are diagrams of an example operating environment for concurrently controlling multiple user selection queues in accordance with some implementations.

FIG. 3A is a block diagram of an example environment in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the environment includes an electronic device 300. In some implementations, the electronic device 300 is held by a person (not shown). In some implementations, the electronic device 300 includes a smartphone, a tablet, a laptop, or the like.

In some implementations, the electronic device 300 presents a CGR environment 310. In the example of FIG. 3A, the CGR environment 310 includes a first CGR lamp 312, a second CGR lamp 314, a CGR couch 316, a CGR painting 318, and a CGR coffee table 320. In some implementations, the CGR environment 310 represents a physical environment, and some of the CGR objects in the CGR environment 310 represent physical articles that are in the physical environment. For example, the first CGR lamp 312 represents a first physical lamp in the physical environment, and the second CGR lamp 314 represents a second physical lamp in the physical environment.

In some implementations, some of the CGR objects in the CGR environment 310 represent physical articles that are not in the physical environment that the CGR environment 310 represents. For example, the CGR couch 316 represents a physical couch that is not in the physical environment corresponding to the CGR environment 310. Similarly, the CGR painting 318 represents a physical painting that is not in the corresponding physical environment. The CGR coffee table 320 represents a physical coffee table that is not in the corresponding physical environment.

In some implementations, some of the CGR objects in the CGR environment 310 represent physical articles that are available from a source (e.g., from a store such as a physical store or an online store). In the example of FIG. 3A, the CGR couch 316 represents a physical couch that is available from a first source 330 (e.g., from Ron's Furniture Store). The CGR painting 318 represents a physical painting that is available from a second source 340 (e.g., from Jacob's art gallery). The CGR coffee table 320 represents a physical coffee table that is available from the first source 330.

In some implementations, the physical articles represented by the CGR objects are associated with respective identifiers (IDs) that identify the physical articles. For example, the physical couch represented by the CGR couch 316 is associated with a couch ID 317 that identifies the physical couch. In some implementations, the physical painting represented by the CGR painting 318 is associated with a painting ID 319 that identifies the physical painting. In some implementations, the physical coffee table represented by the CGR coffee table 320 is associated with a coffee table ID 321 that identifies the physical coffee table. In some implementations, the IDs include serial numbers, barcode numbers, item numbers, model numbers, product numbers, manufacturer codes, and/or machine-readable representations of data (e.g., optical machine-readable representations of data such as barcodes or QR codes).

The first source 330 is associated with a first user selection queue 332, and the second source 340 is associated with a second user selection queue 342 that is different from the first user selection queue 332. More generally, in various implementations, each source is associated with a respective user selection queue. When the electronic device 300 detects a selection of a particular CGR object that represents a particular physical article from a particular source, the electronic device 300 adds an identifier (ID) identifying that particular physical article to a source-specific user selection queue that is associated with the particular source.

Figure 3B:
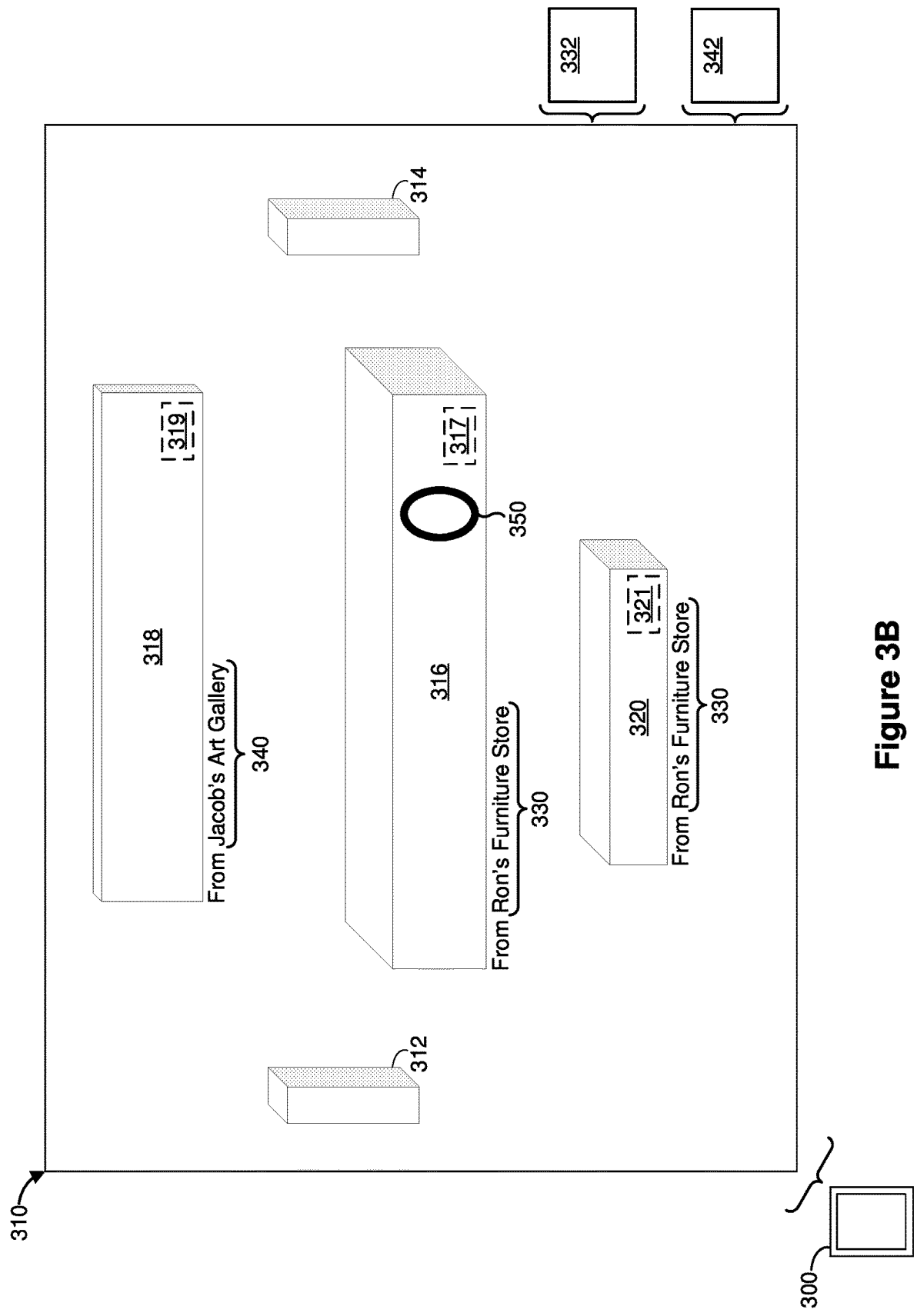

Referring to FIG. 3B, the electronic device 300 detects a user input 350 at a location corresponding to the CGR couch 316. In some implementations, the user input 350 corresponds to a request to associate the physical couch represented by the CGR couch 316 with the first user selection queue 332. For example, in some implementations, the user input 350 corresponds to a request to add the couch ID 317 identifying the physical couch represented by the CGR couch 316 to the first user selection queue 332.

Figure 3C:
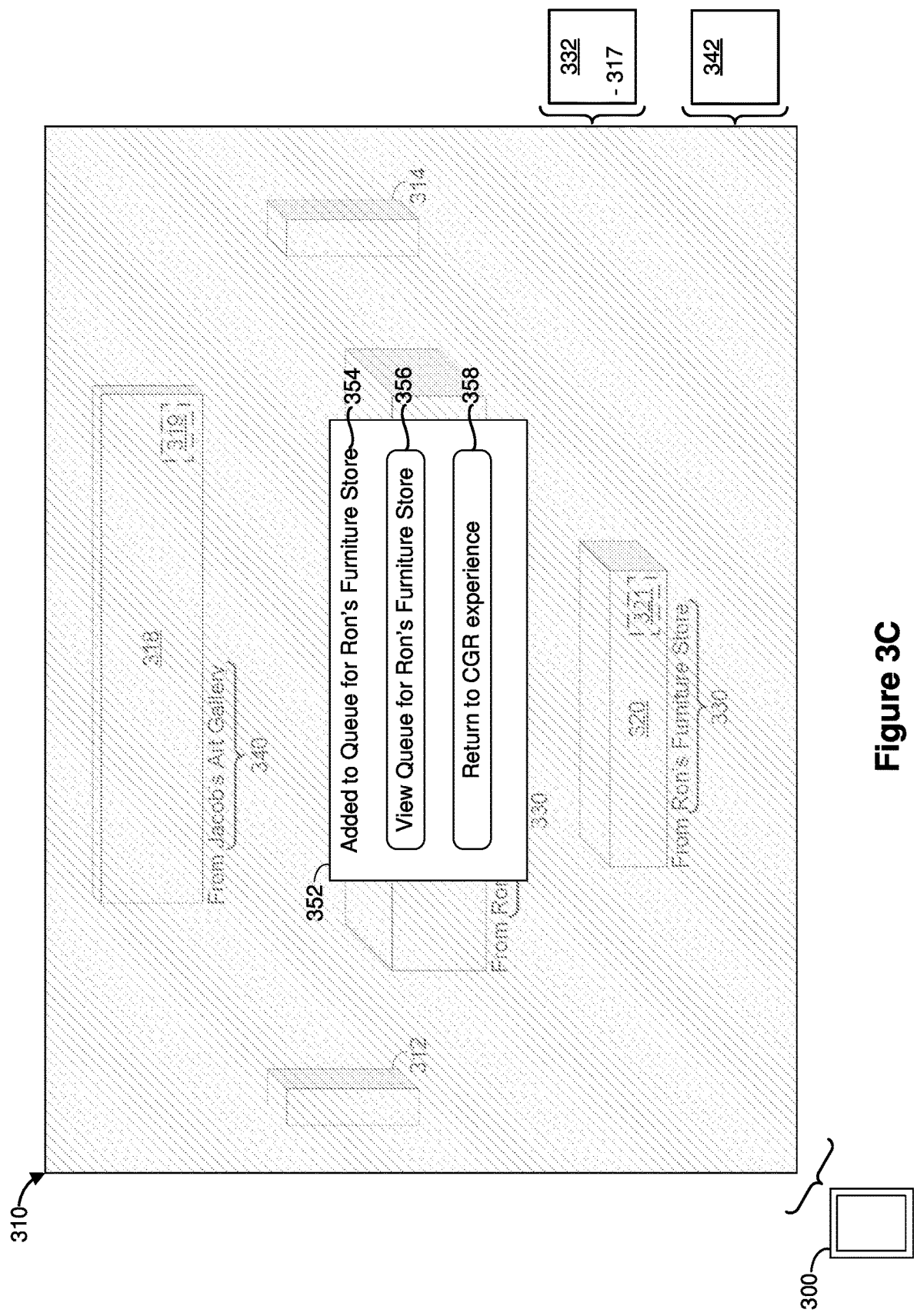

As shown in FIG. 3C, in some implementations, the electronic device 300 adds the couch ID 317 to the first user selection queue 332 in response to detecting the user input 350. In some implementations, the electronic device 300 displays a notification 352 in response to adding the couch ID 317 to the first user selection queue 332. In some implementations, the notification 352 includes text 354 indicating that the electronic device 300 has added the couch ID 317 to the first user selection queue 332. In some implementations, the notification 352 includes a first queue affordance 356 that, when activated, triggers the display of a visual representation of the first user selection queue 332. In some implementations, the notification 352 includes a return affordance 358 that, when activated, causes the electronic device 300 to re-display the CGR environment 310.

Figure 3D:
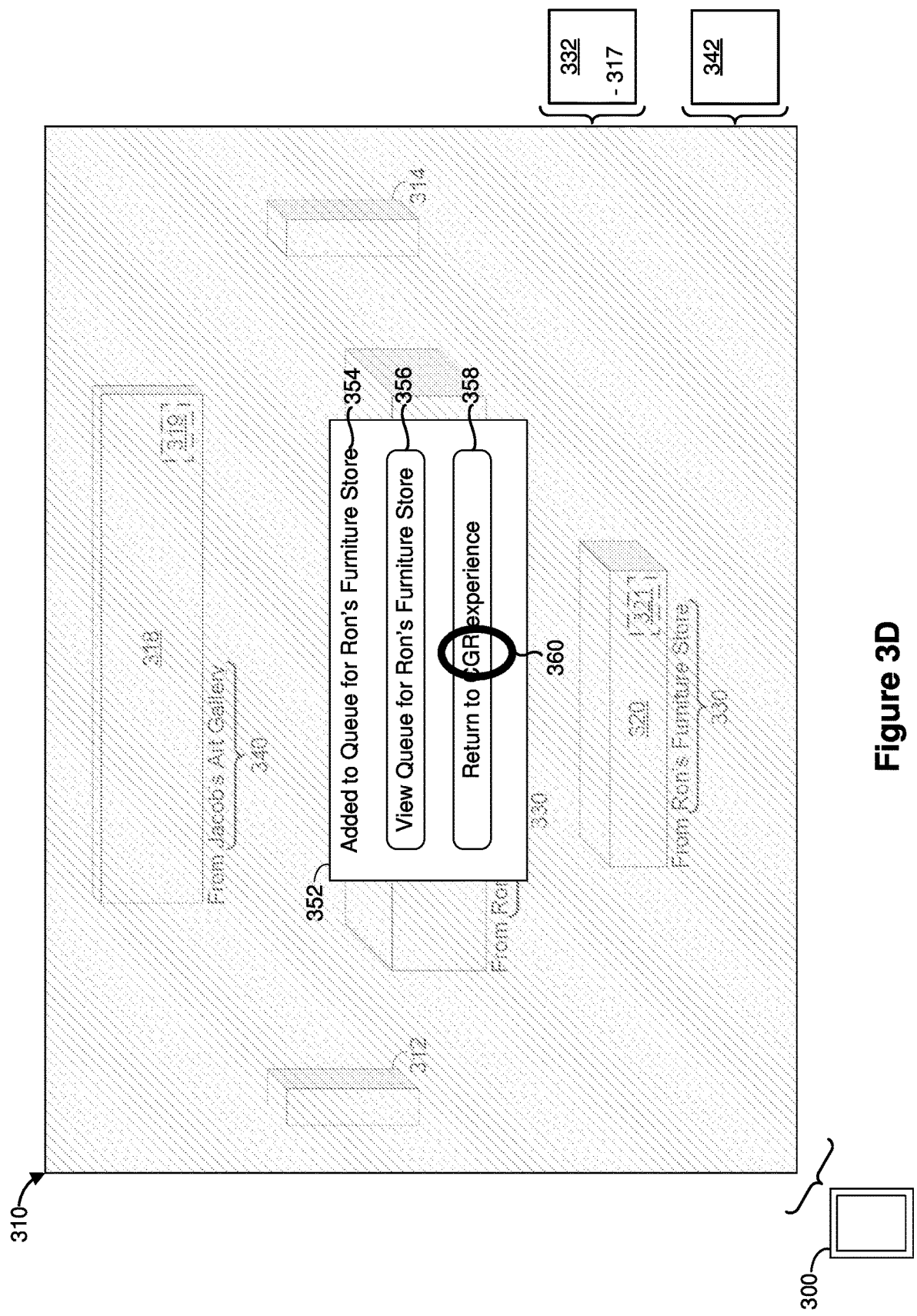
Figure 3E:
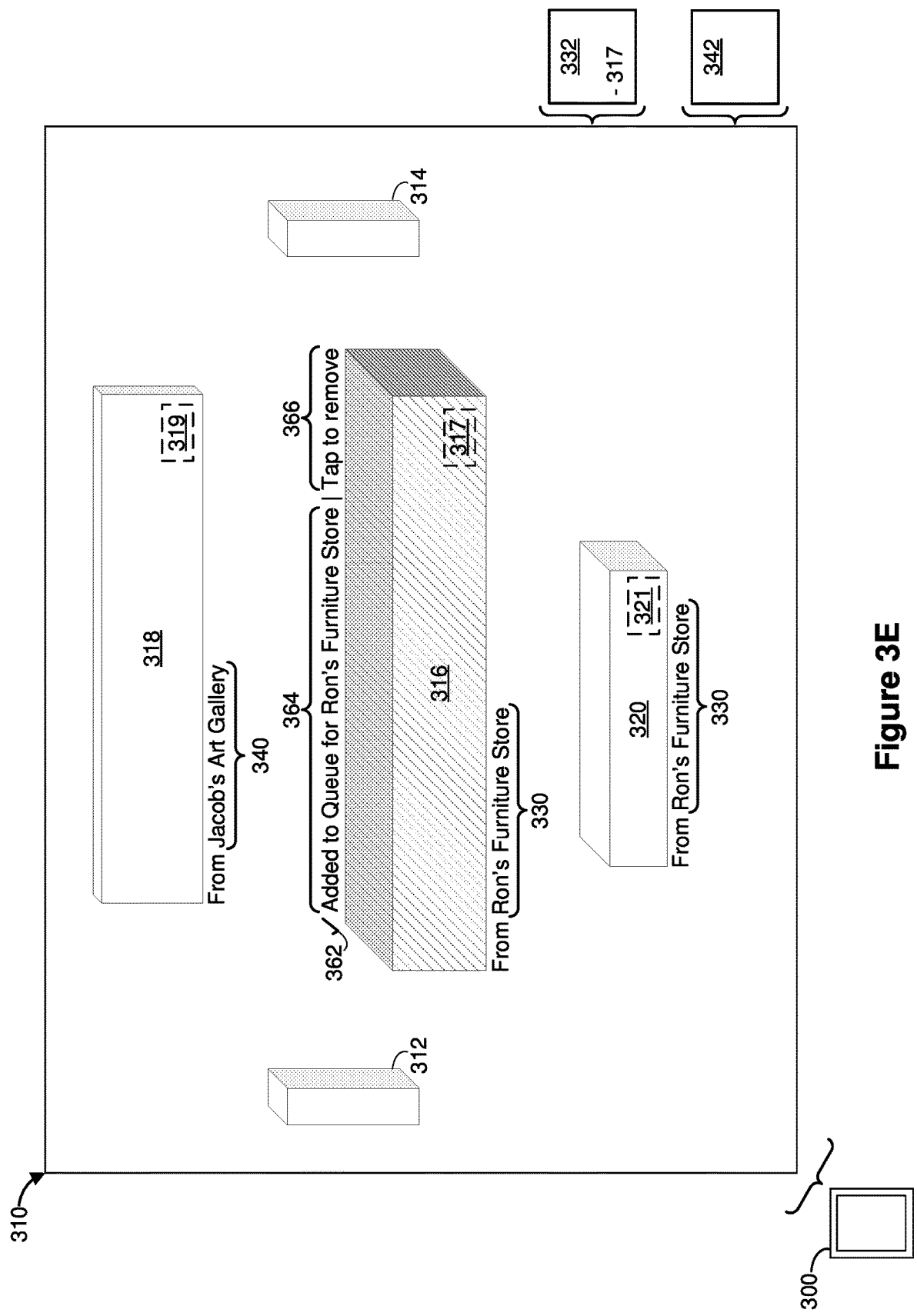

Referring to FIG. 3D, the electronic device 300 detects a user input 360 directed to the return affordance 358. As shown in FIG. 3E, in response to detecting the user input 360, the electronic device 300 re-displays the CGR environment 310. In some implementations, the electronic device 300 modifies a visual property of the CGR couch 316 in order to indicate that the couch ID 317 has been added to the first user selection queue 332. In the example of FIG. 3E, the electronic device 300 has displayed the CGR couch 316 with a shading effect. More generally, in some implementations, the electronic device 300 changes a visual property of a CGR object in order to indicate that an ID of the corresponding physical article has been added to a source-specific user selection queue.

In the example of FIG. 3E, the electronic device 300 displays an in-queue indicium 362 (e.g., a checkmark) to indicate that the CGR couch 316 has been selected and/or to indicate that an ID identifying the corresponding physical couch has been added to a user selection queue. In some implementations, the electronic device 300 displays text 364 to indicate that the couch ID 317 has been added to the first user selection queue 332. In some implementations, the electronic device 300 displays a remove affordance 366 that, when activated, removes the couch ID 317 from the first user selection queue 332.

Figure 3F:
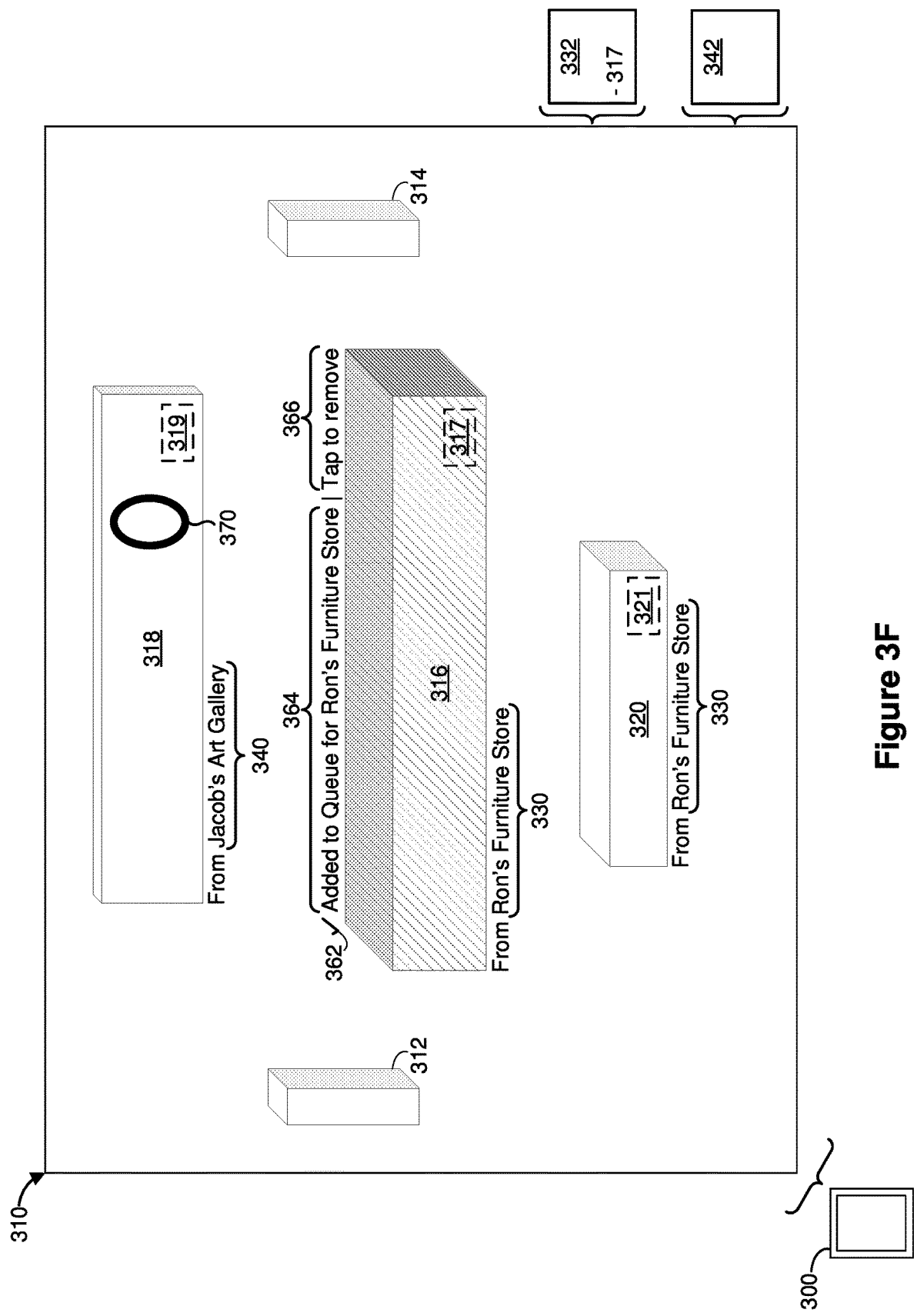

Referring to FIG. 3F, the electronic device 300 detects a user input 370 at a location corresponding to the CGR painting 318. In some implementations, the user input 370 corresponds to a request to associate the physical painting represented by the CGR painting 318 with the second user selection queue 342. For example, in some implementations, the user input 370 corresponds to a request to add the painting ID 319 identifying the physical painting represented by the CGR painting 318 to the second user selection queue 342.

Figure 3G:
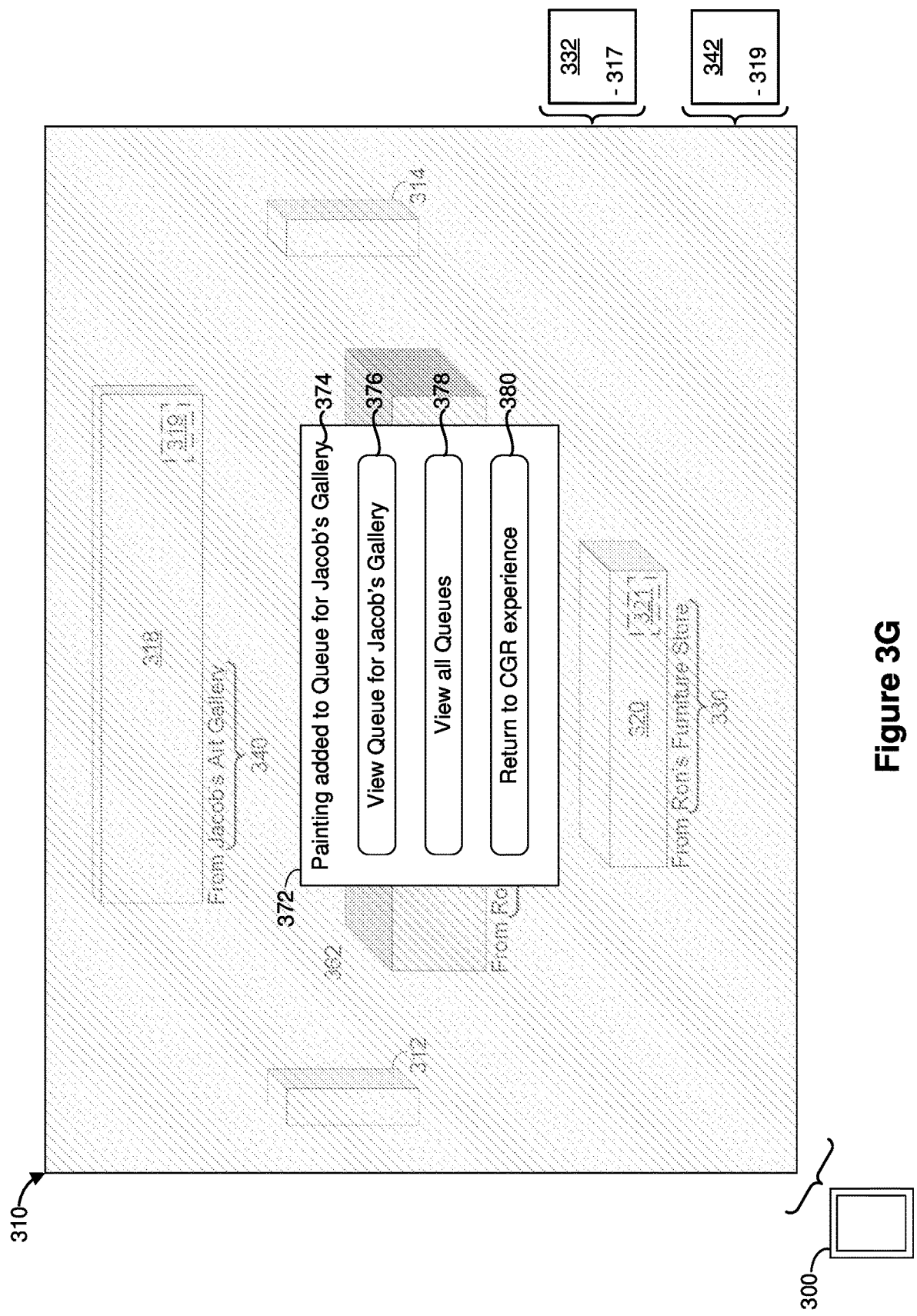

As shown in FIG. 3G, in some implementations, the electronic device 300 adds the painting ID 319 to the second user selection queue 342 in response to detecting the user input 370. In some implementations, the electronic device 300 displays a notification 372 in response to adding the painting ID 319 to the second user selection queue 342. In some implementations, the notification 372 includes text 374 indicating that the electronic device 300 has added the painting ID 319 to the second user selection queue 342. In some implementations, the notification 372 includes a second queue affordance 376 that, when activated, triggers the display of a visual representation of the second user selection queue 342. In some implementations, the notification 372 includes a return affordance 378 that, when activated, causes the electronic device 300 to re-display that CGR environment 310. In some implementations, the notification 372 includes a multiple queue affordance 378 (e.g., an all queues affordance) that, when activated, triggers the display of visual representations of multiple user selection queues (e.g., visual representations of all user selection queues, for example, a visual representation of the first user selection queue 332 and a visual representation of the second user selection queue 342). The notification 372 includes a return affordance 380 that, when activated, causes the electronic device 300 to re-display the CGR environment 310.

Figure 3H:
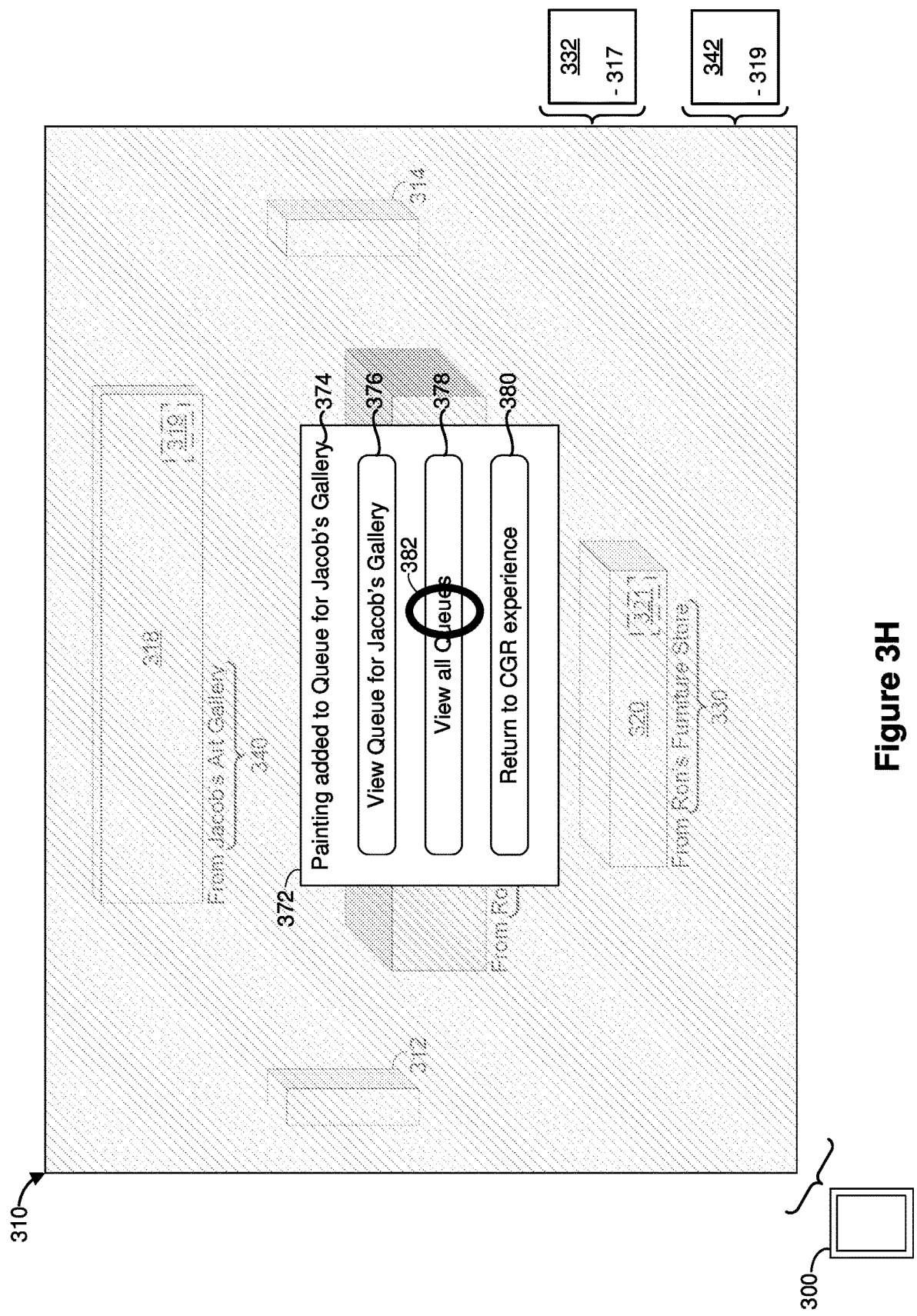
Figure 3I:
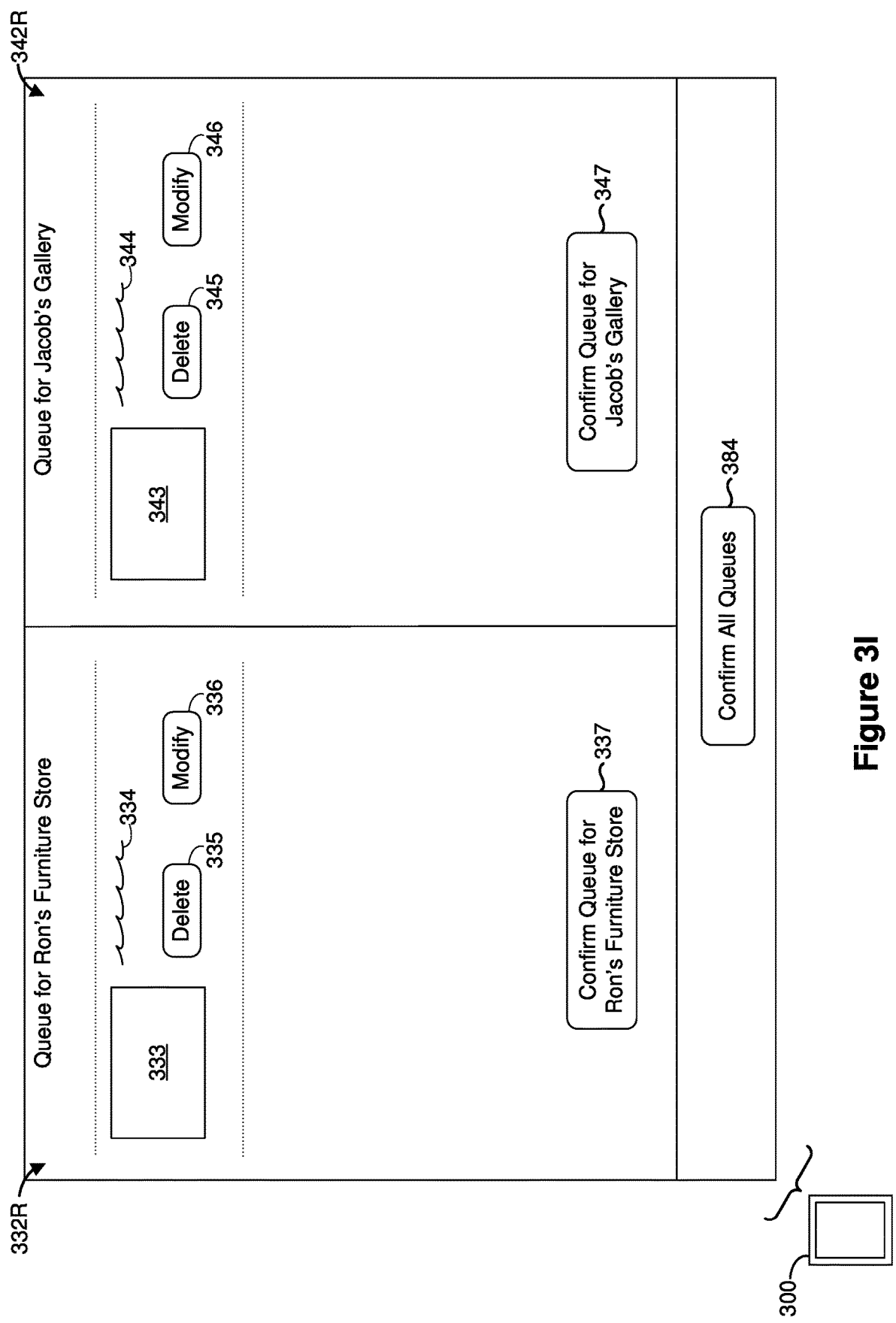

Referring to FIG. 3H, the electronic device 300 detects a user input 382 directed to the return affordance 380. As shown in FIG. 3I, in response to detecting the user input 382, the electronic device 300 displays a first visual representation 332R of the first user selection queue 332, and a second visual representation 342R of the second user selection queue 342. The first visual representation 332R includes a 2D representation 333 of the physical couch, a description 334 of the couch, a first delete affordance 335 to remove the couch ID 317 from the first user selection queue 332, a first modify affordance 336 to modify a quantity of the couch, and a first confirm affordance 337 to confirm the first user selection queue 332. The second visual representation 342R includes a 2D representation 343 of the physical painting, a description 344 of the painting, a second delete affordance 345 to remove the painting ID 319 from the second user selection queue 342, a second modify affordance 346 to modify a quantity of the painting, and a second confirm affordance 347 to confirm the second user selection queue 342. In some implementations, the electronic device 300 displays a third confirm affordance 384 that, when activated, concurrently confirms the first user selection queue 332 and the second user selection queue 342.

In some implementations, detecting an activation of the first confirm affordance 337 triggers a placement of the physical couch in the physical environment surrounding the electronic device 300. For example, in some implementations, in response to detecting an activation of the first confirm affordance 337, the electronic device 300 transmits a message to a device associated with the first source 330. In some implementations, the message includes a request to deliver the physical couch to the physical environment surrounding the electronic device 300.

In some implementations, a head-mountable device (HMD) (not shown), being worn by a person, presents (e.g., displays) the CGR environment 310 according to various implementations. In some implementations, the HMD includes an integrated display (e.g., a built-in display) that displays the CGR environment 310. In some implementations, the HMD includes a head-mountable enclosure. In various implementations, the head-mountable enclosure includes an attachment region to which another device with a display can be attached. For example, in some implementations, the electronic device 300 can be attached to the head-mountable enclosure. In various implementations, the head-mountable enclosure is shaped to form a receptacle for receiving another device that includes a display (e.g., the electronic device 300). For example, in some implementations, the electronic device 300 slides/snaps into or otherwise attaches to the head-mountable enclosure. In some implementations, the display of the device attached to the head-mountable enclosure presents (e.g., displays) the CGR environment 310. In various implementations, examples of the electronic device 300 include smartphones, tablets, media players, laptops, etc.

In some scenarios, a person may want to see how a physical article looks in a physical environment of the person. Some devices generate and present a CGR environment that resembles the physical environment of the person, and place a CGR object that represents a new physical article thereby allowing the person to see how the new physical article would look in the physical environment. However, if the physical environment is too cluttered then the corresponding CGR environment is similarly cluttered. Hence, there may be no space in the CGR environment to place the CGR object representing the new physical article. The present disclosure provides methods, devices and/or systems for masking physical articles that are in a physical environment in order to make space for a CGR object that represents a new physical article. The device detects a physical surface, detects that there are physical articles occluding portions of the physical surface, and composites a masking element in order to mask the physical articles and make space for a new CGR object.

Figure 4A:
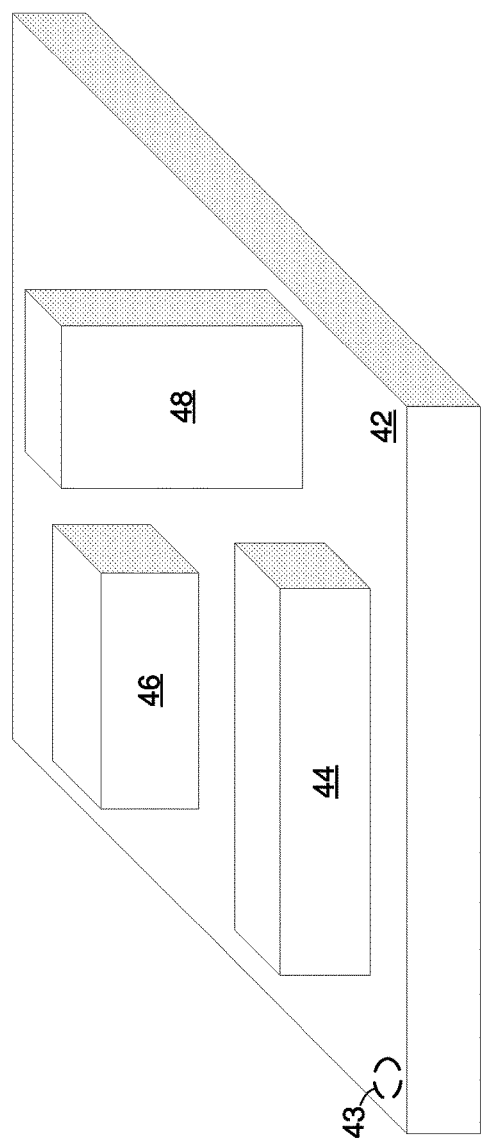
FIGS. 4A-4O are diagrams of an example operating environment for compositing a masking element in accordance with some implementations.

FIG. 4A is a block diagram of an example physical environment 40 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 40 includes a physical surface 42. In some implementations, the physical surface 42 represents a top surface of a physical table. In some implementations, the physical surface 42 represents a floor.

In some implementations, the physical surface 42 is associated with a visual property 43. In some implementations, the visual property 43 indicates a materialistic property of the physical surface 42. For example, in some implementations, the visual property 43 indicates a color of the physical surface 42. In some implementations, the visual property 43 indicates a material type of the physical surface 42. In some implementations, the visual property 43 indicates a texture of the physical surface 42. In some implementations, the visual property 43 indicates a reflectiveness of the physical surface 42.

In the example of FIG. 4A, there are physical articles that are occluding respective portions of the physical surface 42. For example, a first physical article 44 (e.g., a package), a second physical article 46 (e.g., a box) and a third physical article 48 (e.g., a speaker) are placed on the physical surface 42. As can be seen in FIG. 4A, the first physical articles 44, 46 and 48 are occluding (e.g., covering) a significant portion of the physical surface 42 (e.g., a majority of the physical surface 42).

Figure 4B:
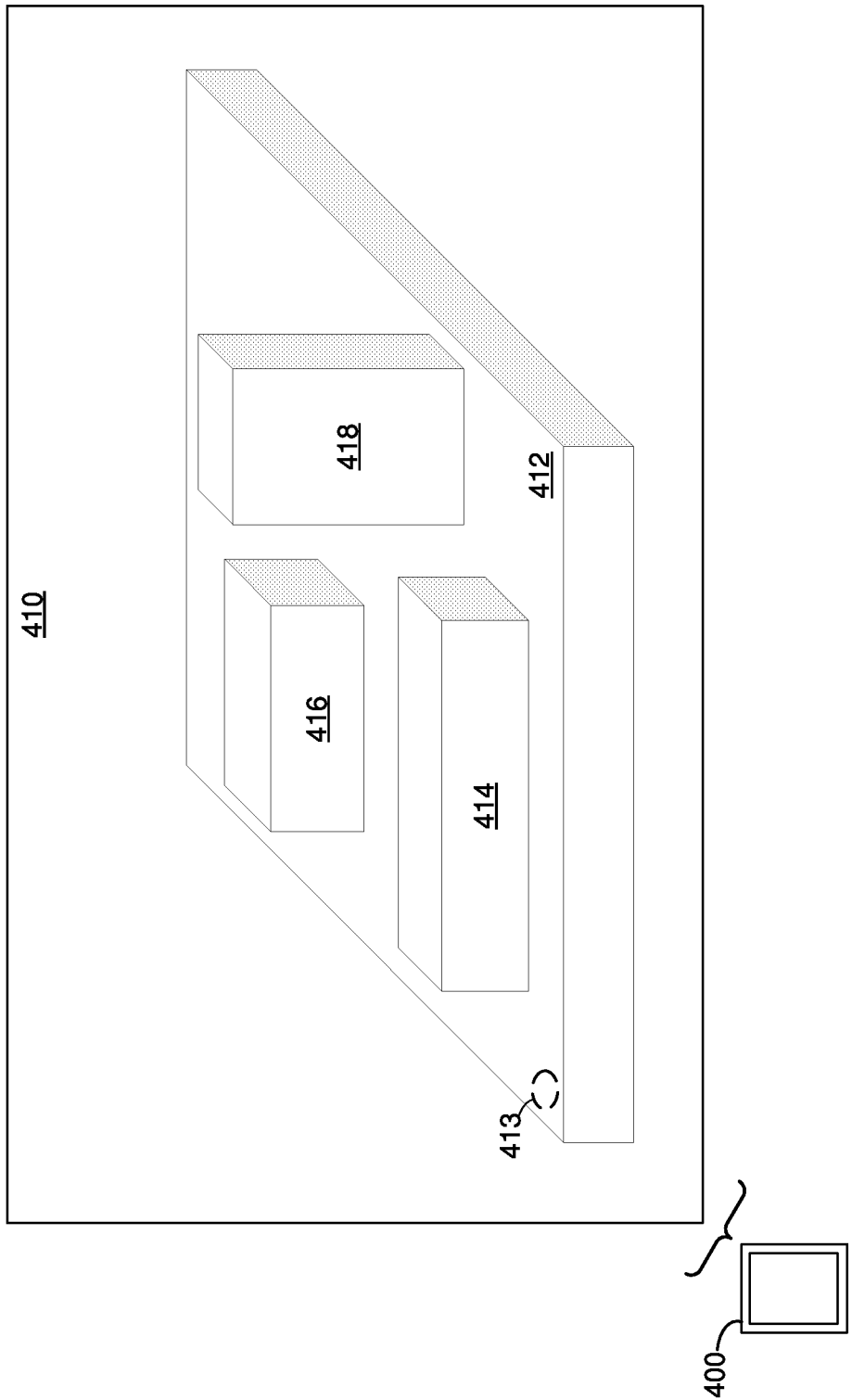

Referring to FIG. 4B, in some implementations, an electronic device 400 presents (e.g., displays) a CGR environment 410 that corresponds to (e.g., represents) the physical environment 40. The CGR environment 410 includes a CGR surface 412 that represents the physical surface 42. The CGR surface 412 is associated with a visual property 413 that is within a degree of similarity to the visual property 43 of the physical surface. For example, In some implementations, the CGR surface 412 has the same materialistic property as the physical surface 42. For example, the CGR surface 412 has the same color, uses the same material type, has the same texture, and/or has the same texture as the physical surface 42.

In the example of FIG. 4B, the CGR environment 410 includes a first CGR object 414 that represents the first physical article 44, a second CGR object 416 that represents the second physical article 46, and a third CGR object 418 that represents the third physical article 48. As can be seen in FIG. 4B, the CGR objects 414, 416 and 418 occupy a significant portion of the CGR surface 412. As such, there is not much space on the CGR surface 412 to place an additional CGR object. In some implementations, the electronic device 400 is held by a person (not shown). In some implementations, the electronic device 400 includes a smartphone, a tablet, a laptop, or the like.

In some implementations, the CGR environment 410 is a pass-through of the physical environment 40. For example, in some implementations, the CGR environment 410 is a video pass-through of the physical environment 40. In some implementations, the CGR environment 410 is an optical pass-through of the physical environment 40. In such implementations, the CGR surface 412 and CGR objects 414, 416 and 418 are the same as the physical surface 42 and physical articles 44, 46 and 48, respectively.

Figure 4C:
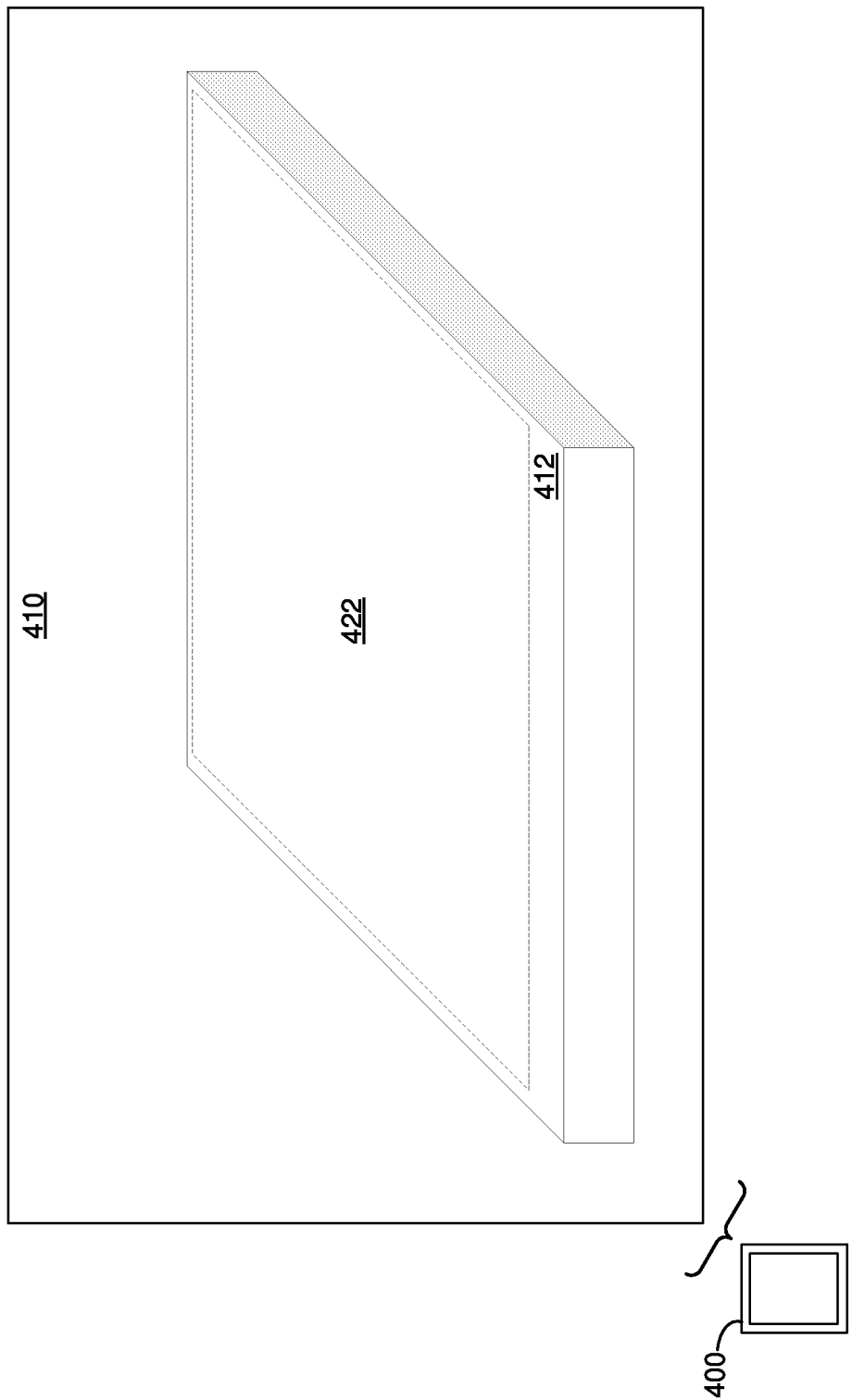

Referring to FIG. 4C, in some implementations, the electronic device 400 composites a masking element 422 in order to mask the physical articles 44, 46 and 48 that are located on the physical surface 42. In some implementations, the electronic device 400 composites the masking element 422 in order to mask the CGR objects 414, 416 and 418 that are on the CGR surface 412. As can be seen in FIG. 4C, in some implementations, compositing the masking element 422 provides an appearance that there are no CGR objects on the CGR surface 412. Since the CGR surface 412 represents the physical surface 42, compositing the masking element 422 provides an appearance that there are no physical articles on the physical surface 42. As such, compositing the masking element 422 provides an appearance of decluttering the physical surface 42 without requiring an operator (e.g., a person or a robot) to physically remove the physical articles 44, 46 and 48 from the physical surface 42.

Figure 4D:
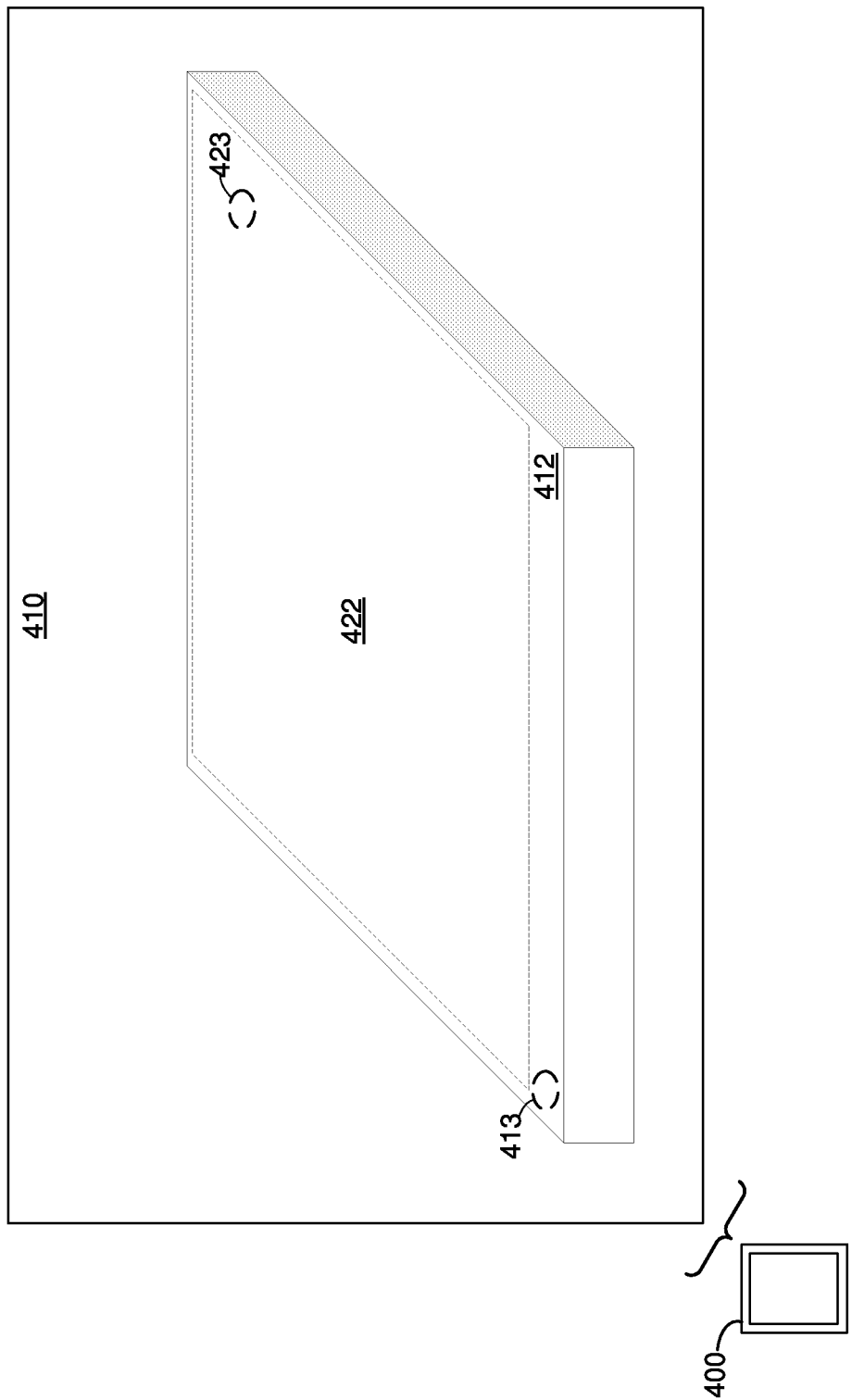

Referring to FIG. 4D, in some implementations, the masking element 422 is associated with a visual property 423. In some implementations, the visual property 423 of the masking element 422 is within a degree of similarity to the visual property 413 of the CGR surface 412. Since the visual property 413 of the CGR surface 412 is within a degree of similarity to the visual property 43 of the physical surface, in some implementations, the visual property 423 of the masking element 422 is within a degree of similarity to the visual property 43 of the physical surface 42. As such, in some implementations, the masking element 422 has the same color, material type, texture and/or reflectiveness as the physical surface 42. Matching the visual property 423 of the masking element 422 with the visual property 43 of the physical surface 42 provides an appearance that there are no physical articles on the physical surface 42.

Figure 4E:
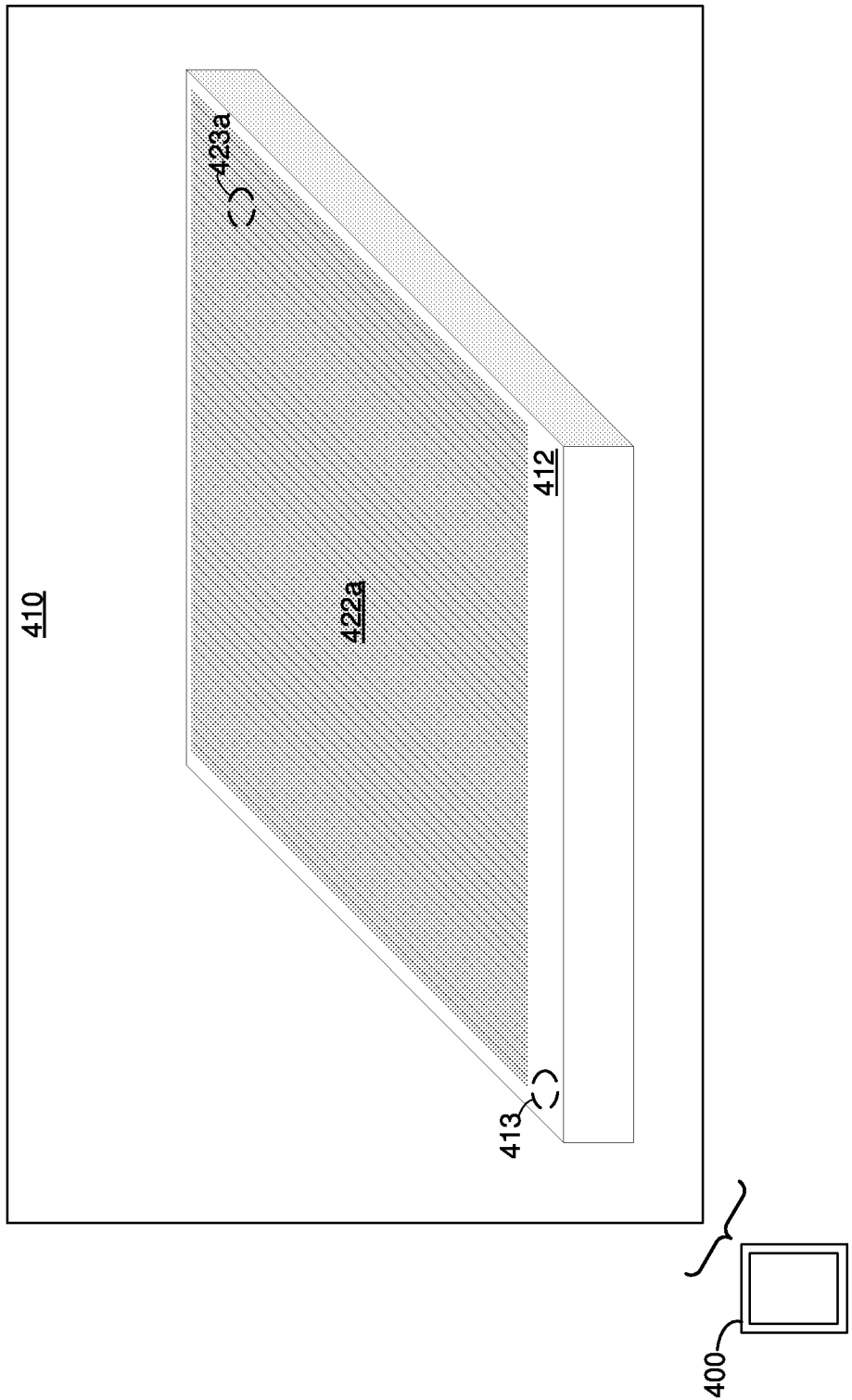

FIG. 4E illustrates another masking element 422*a* that is associated with a visual property 423*a*. In the example of FIG. 4E, the visual property 423*a* of the masking element 422*a* is different (e.g., noticeably different) from the visual property 413 of the CGR surface 412. Since the visual property 413 of the CGR surface 412 is within a degree of similarity to the visual property 43 of the physical surface 42, in some implementations, the visual property 423*a* of the masking element 422*a* is not within a degree of similarity to the visual property 43 of the physical surface 42. As such, in some implementations, the masking element 422*a* has a different color, material type, texture and/or reflectiveness than the physical surface 42.

Figure 4F:
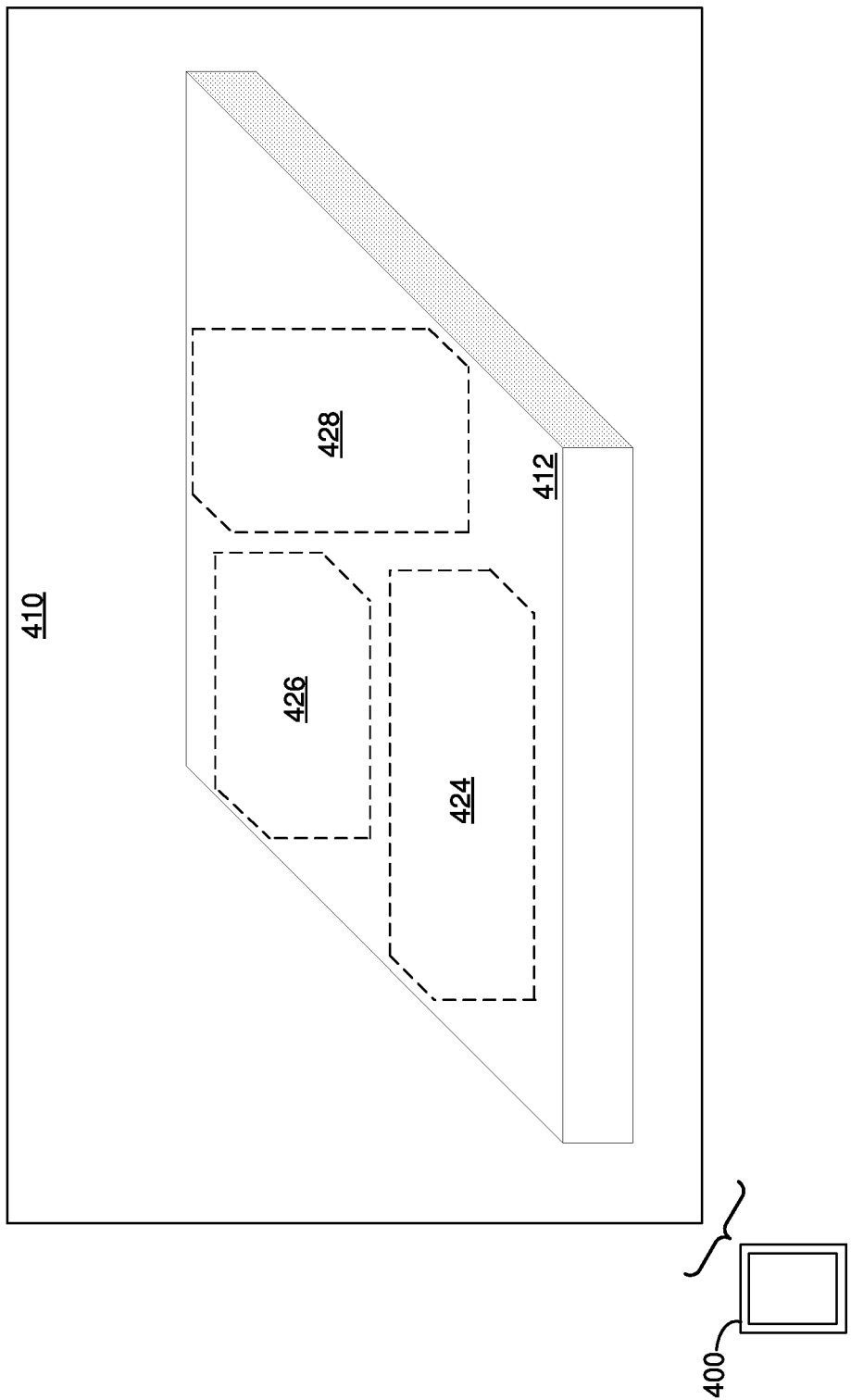

Referring to FIG. 4F, in some implementations, the electronic device 400 composites multiple masking elements. In some implementations, each masking element masks a respective one of the physical articles. In some implementations, each masking element conforms to a shape of the physical article that the masking element masks. In some implementations, each masking element masks a respective one of the CGR objects. In some implementations, each masking element conforms to a shape of the CGR object that the masking element conforms. In the example of FIG. 4F, the electronic device 400 generates a first masking element 424 in order to mask the first CGR object 414 representing the first physical article 44, a second masking element 426 in order to mask the second CGR object 416 representing the second physical article 46, and a third masking element 428 in order to mask the third CGR object 418 representing the third physical article 48. In some implementations, the first masking element 424 conforms to a shape of the first CGR object 414 and/or the first physical article 44. In some implementations, the second masking element 426 conforms to a shape of the second CGR object 416 and/or the second physical article 46. In some implementations, the third masking element 428 conforms to a shape of the third CGR object 418 and/or the third physical article 48.

Figure 4G:
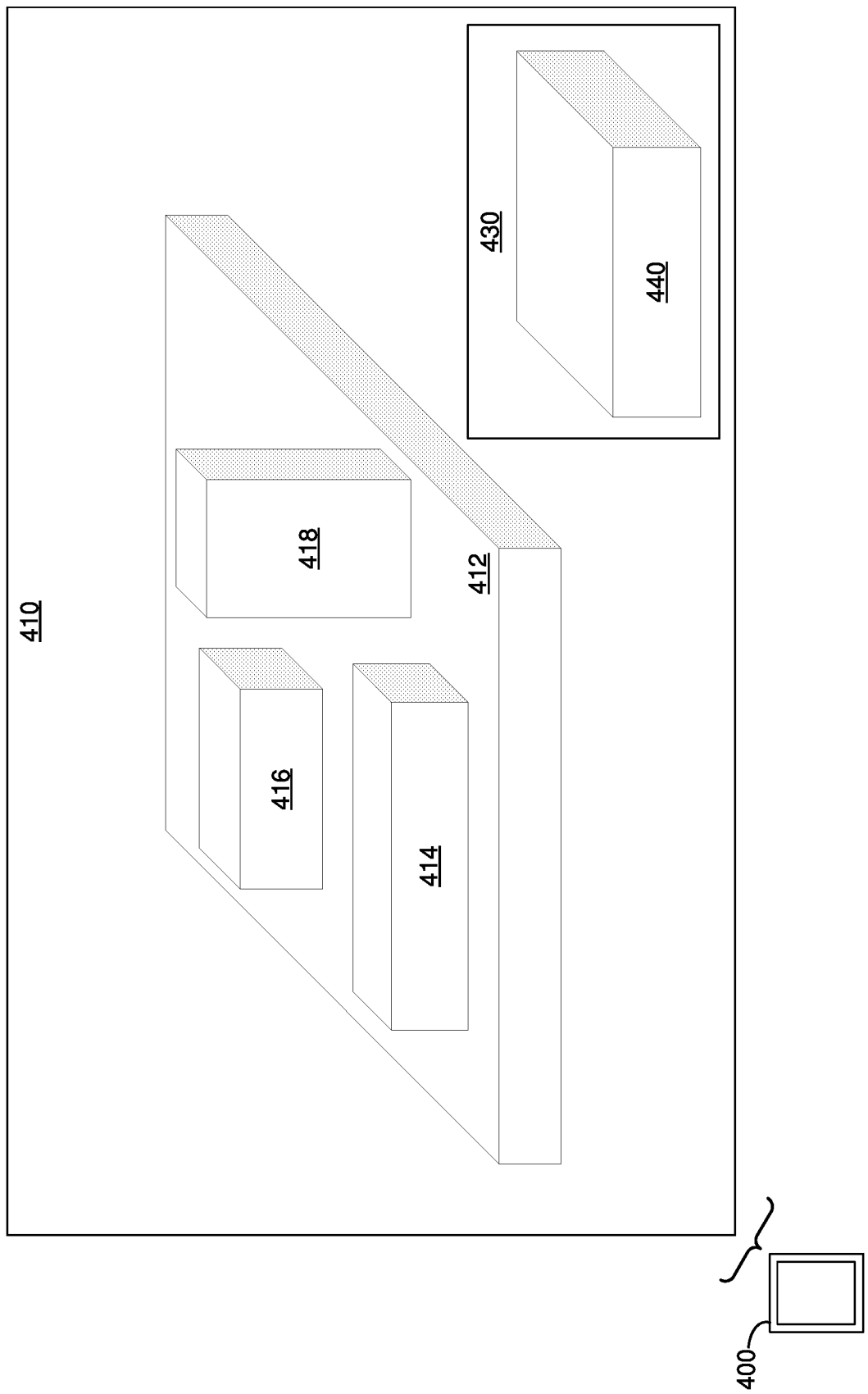
Figure 4H:
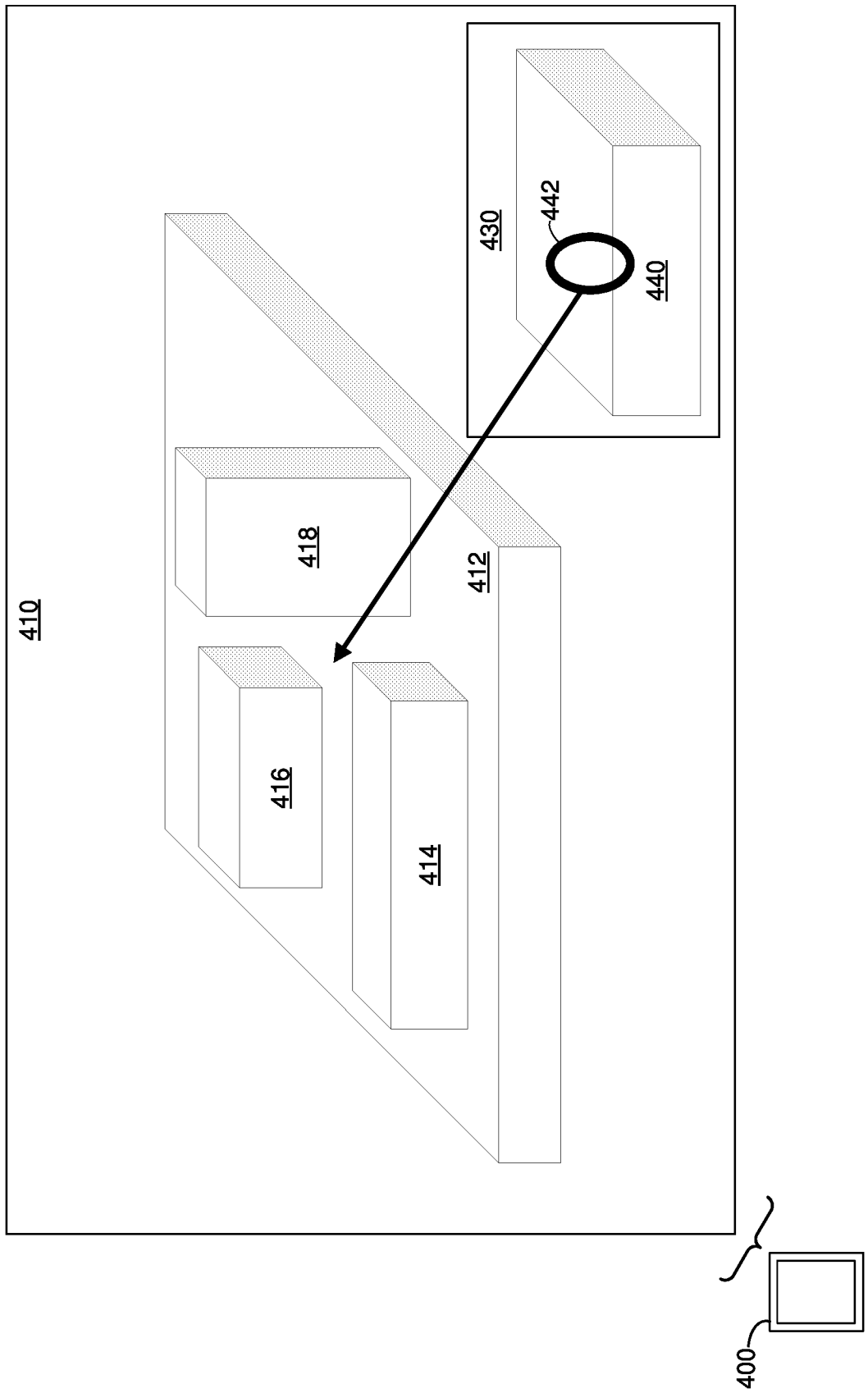

Referring to FIG. 4G, in some implementations, the electronic device 400 displays a CGR object store 430. The CGR object store 430 includes CGR objects that represent physical articles. In the example of FIG. 4G, the CGR object store 430 includes a fourth CGR object 440 (e.g., a CGR table lamp) that represents a fourth physical article (e.g., a physical table lamp). As shown in FIG. 4H, in some implementations, the electronic device 400 detects a user input 442 that corresponds to a request to place the fourth CGR object 440 on the CGR surface 412. In some implementations, the user input 442 includes a drag gesture that begins at the fourth CGR object 440 and ends at the CGR surface 412.

Figure 4I:
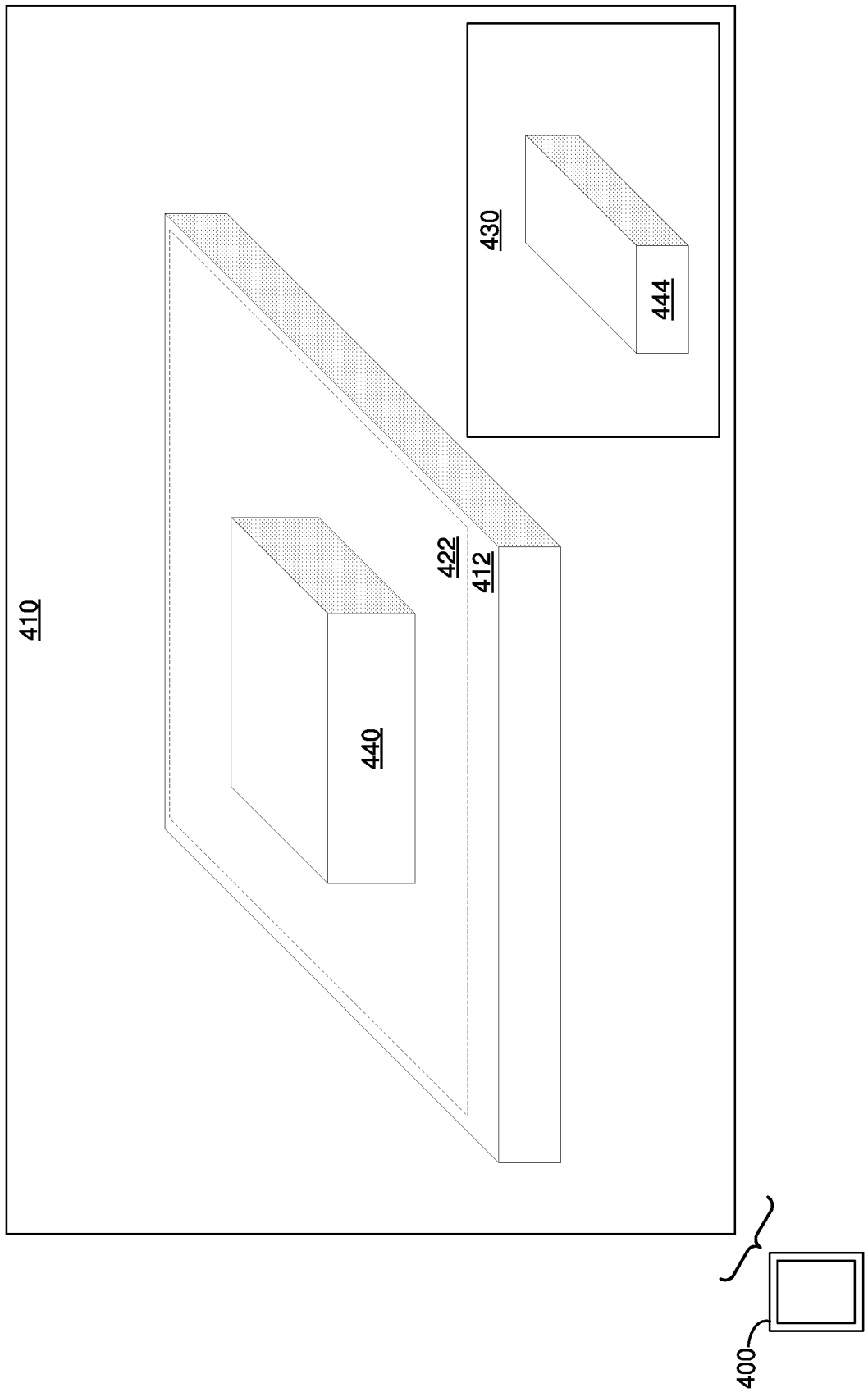

As shown in FIG. 4I, in some implementations, the electronic device 400 composites the masking element 422 in response to detecting the user input 442. The electronic device 400 overlays the fourth CGR object 440 onto the masking element 422 in order to provide an appearance that the fourth CGR object 440 is placed on the CGR surface 412. In the example of FIG. 4I, the CGR object store 430 displays a fifth CGR object 444.

Figure 4J:
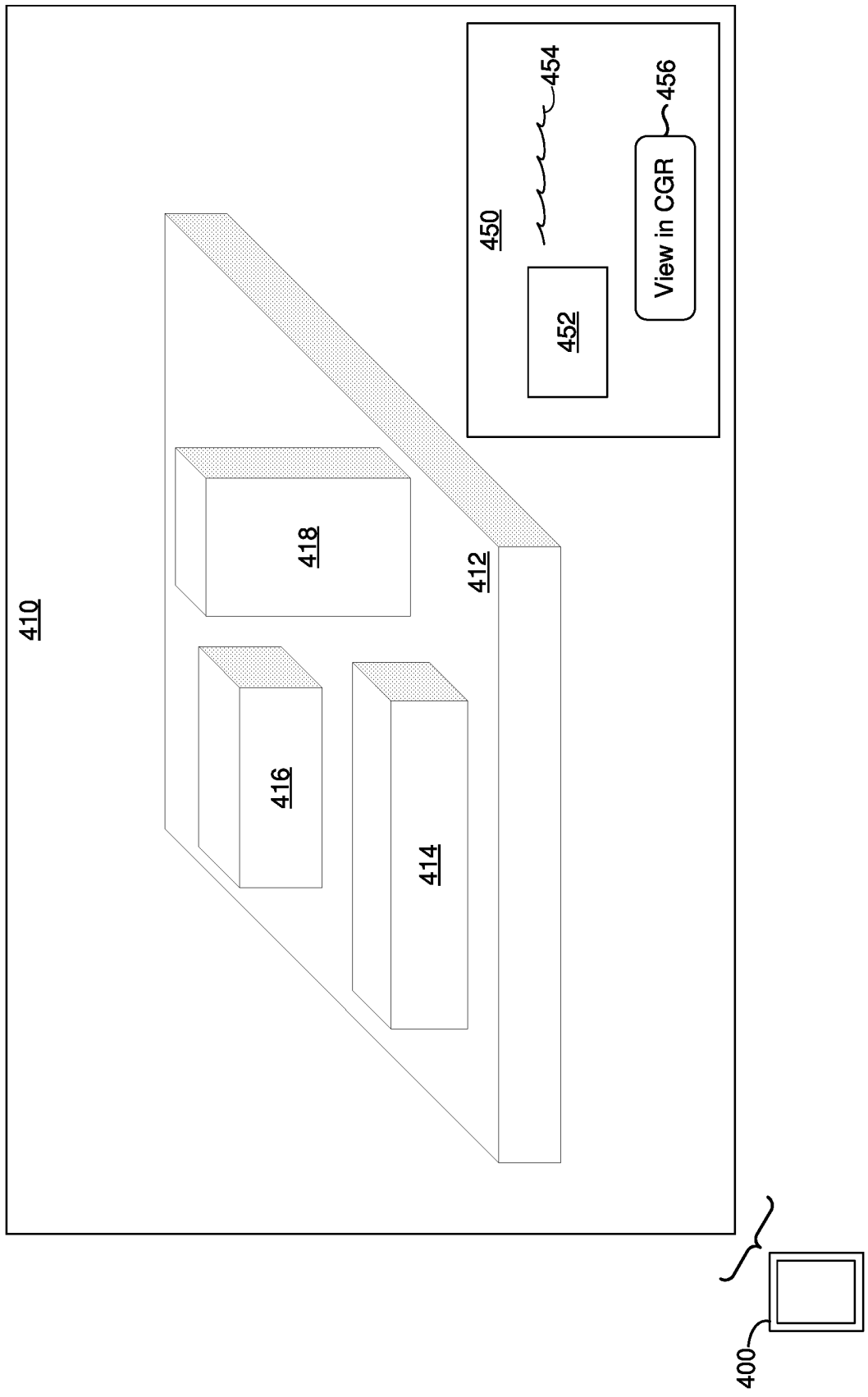
Figure 4K:
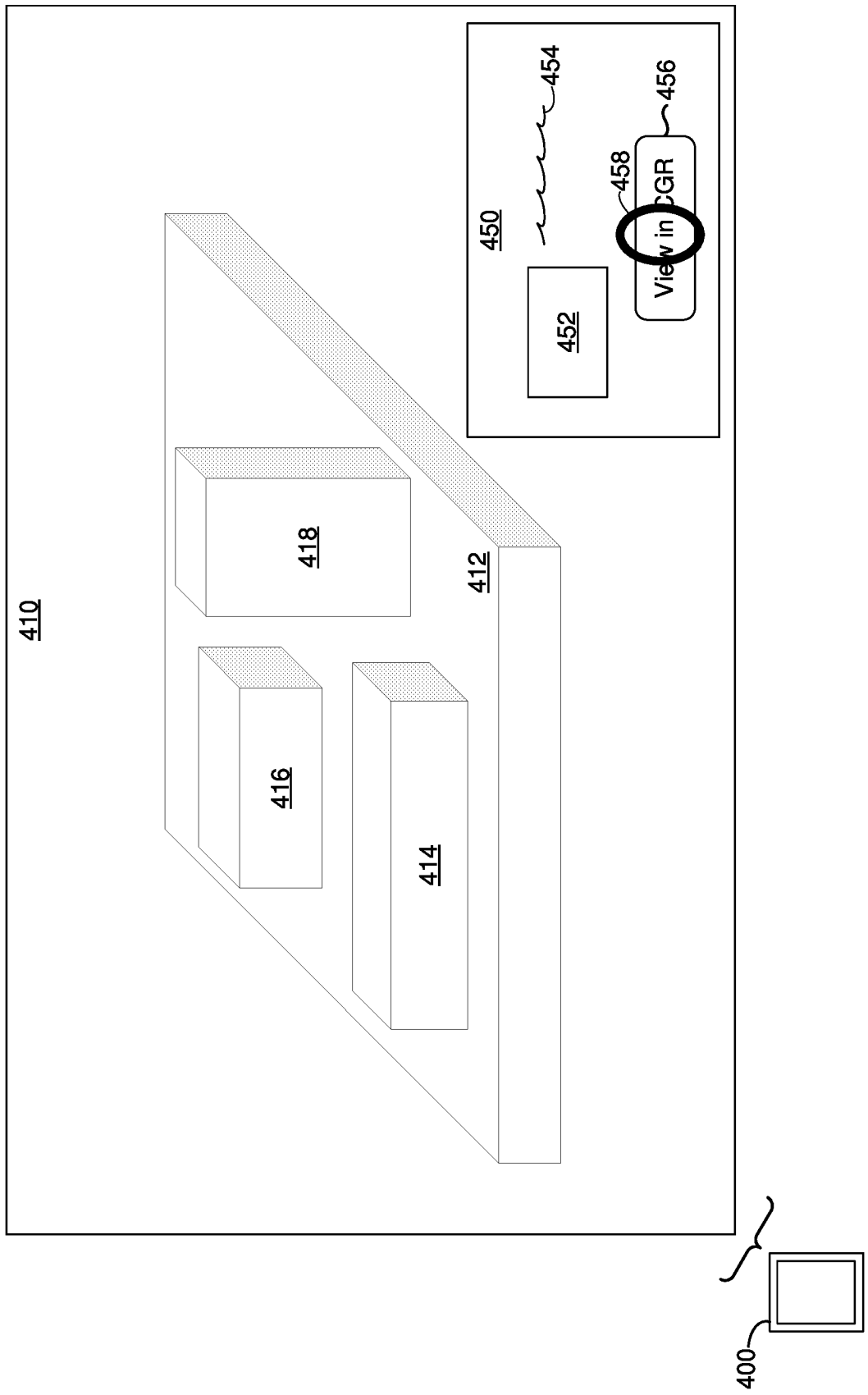
Figure 4L:
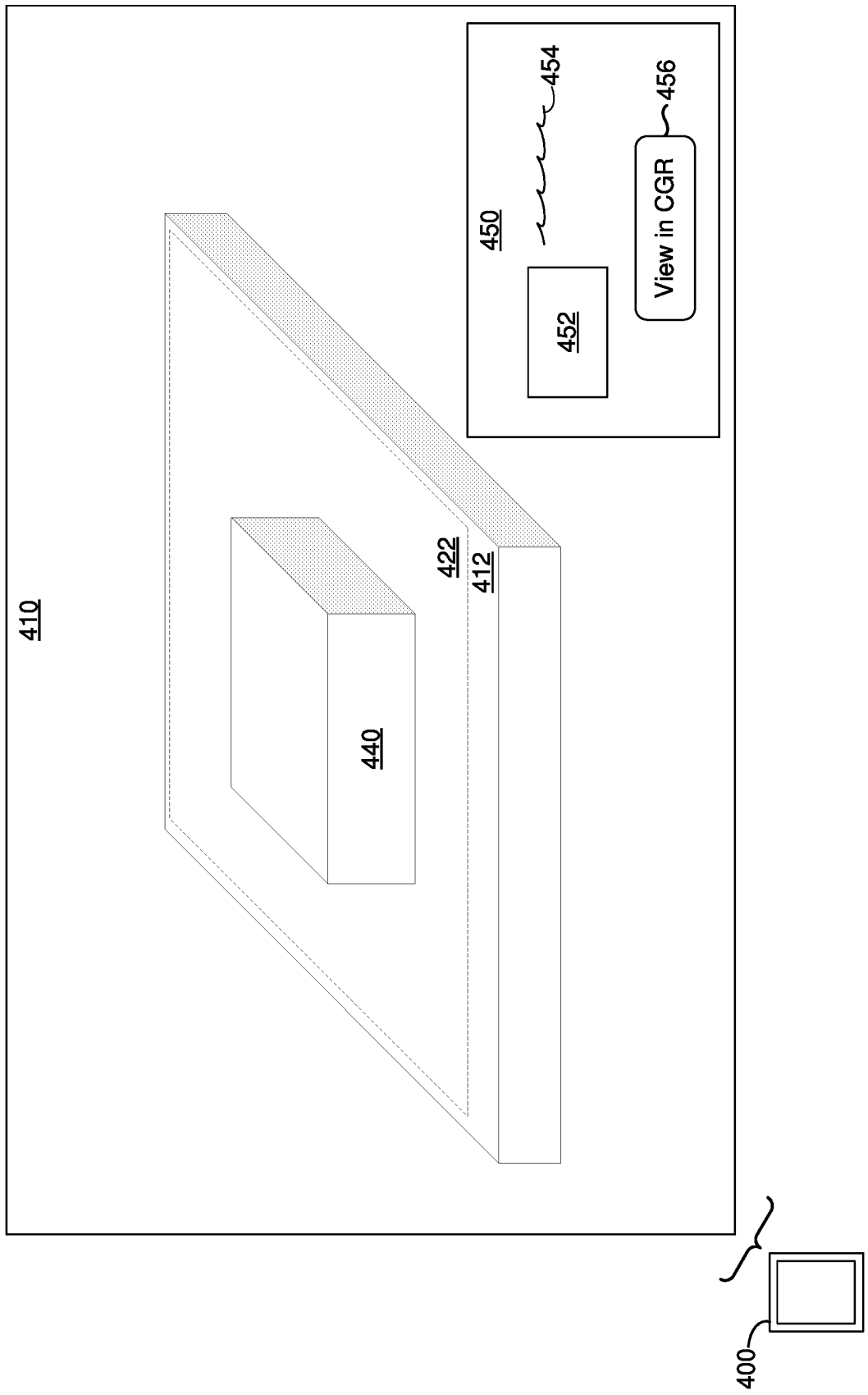

Referring to FIG. 4J, in some implementations, the electronic device 400 displays a web page 450 that corresponds to the fourth physical article (e.g., the physical table lamp). In some implementations, the web page 450 includes a 2D representation 452 of the fourth physical article (e.g., an image of the fourth physical article), a description 454 of the fourth physical article, and an affordance 456 that, when activated, causes the electronic device 400 to display the fourth CGR object 440 representing the fourth physical article. As shown in FIG. 4K, the electronic device 400 detects a user input 458 directed to the affordance 456. As shown in FIG. 4L, in response to detecting the user input 458, the electronic device 400 composites the masking element 422 and displays the fourth CGR object 440 on top of the masking element 422.

Figure 4M:
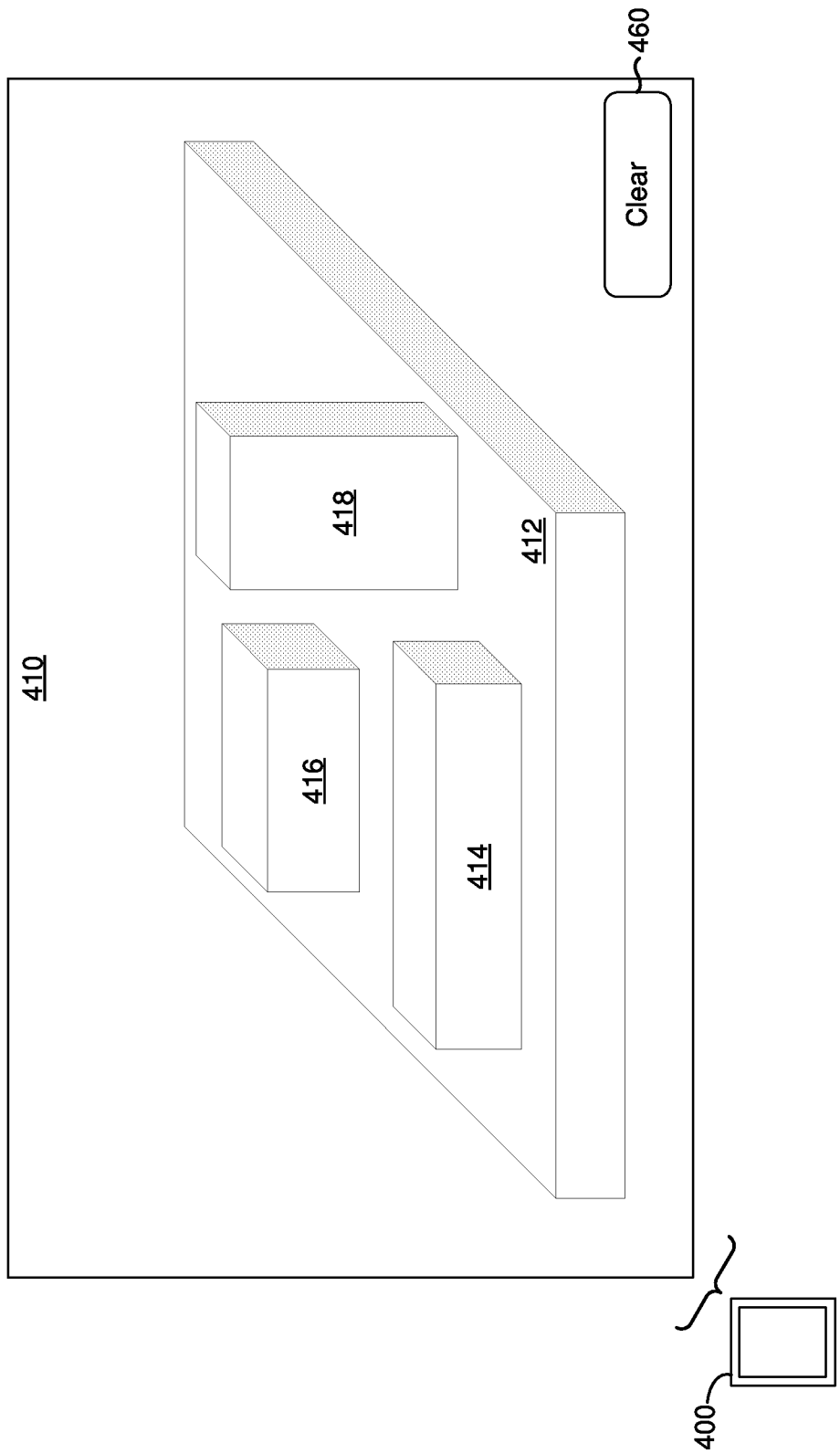
Figure 4N:
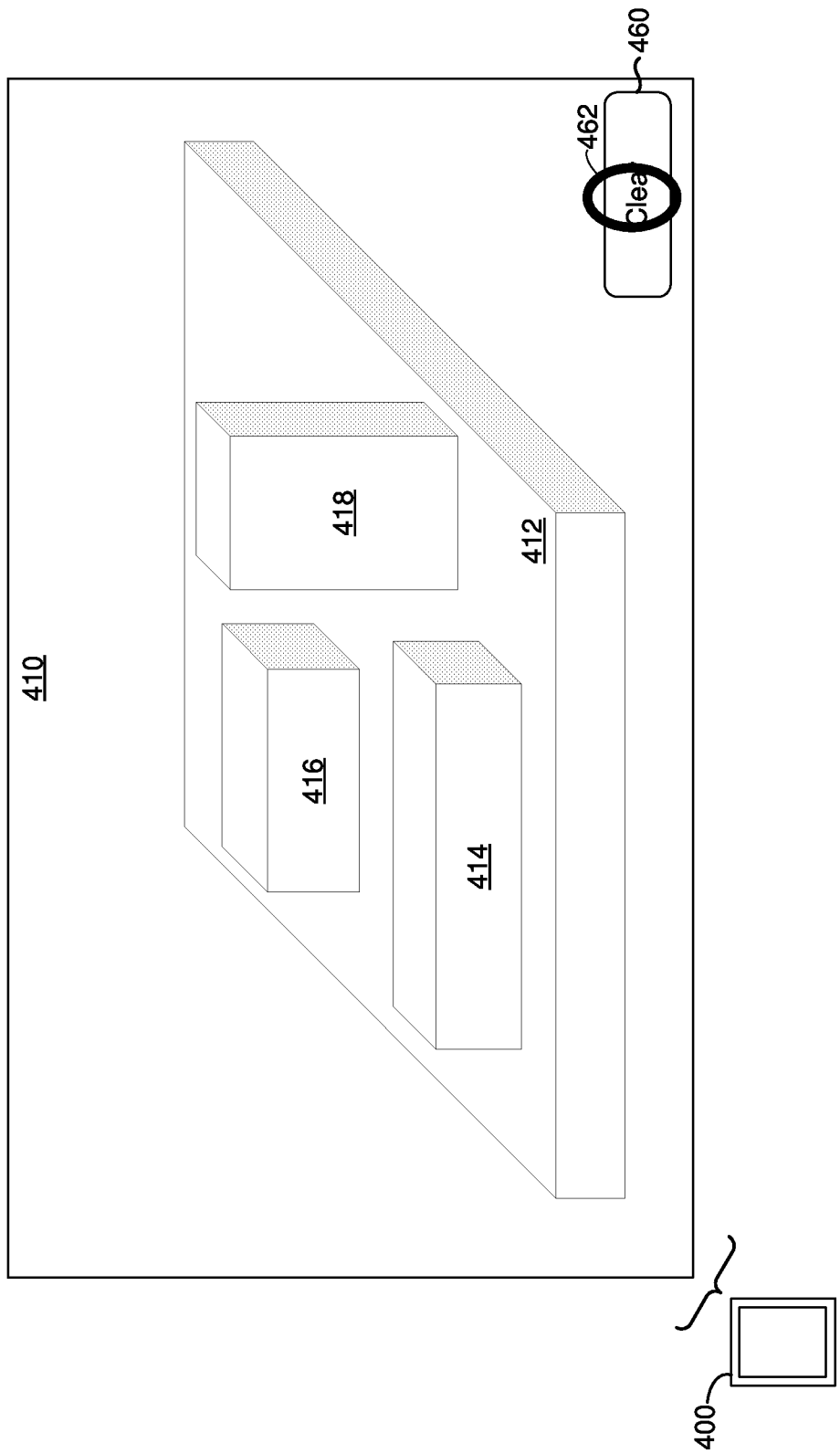
Figure 4O:
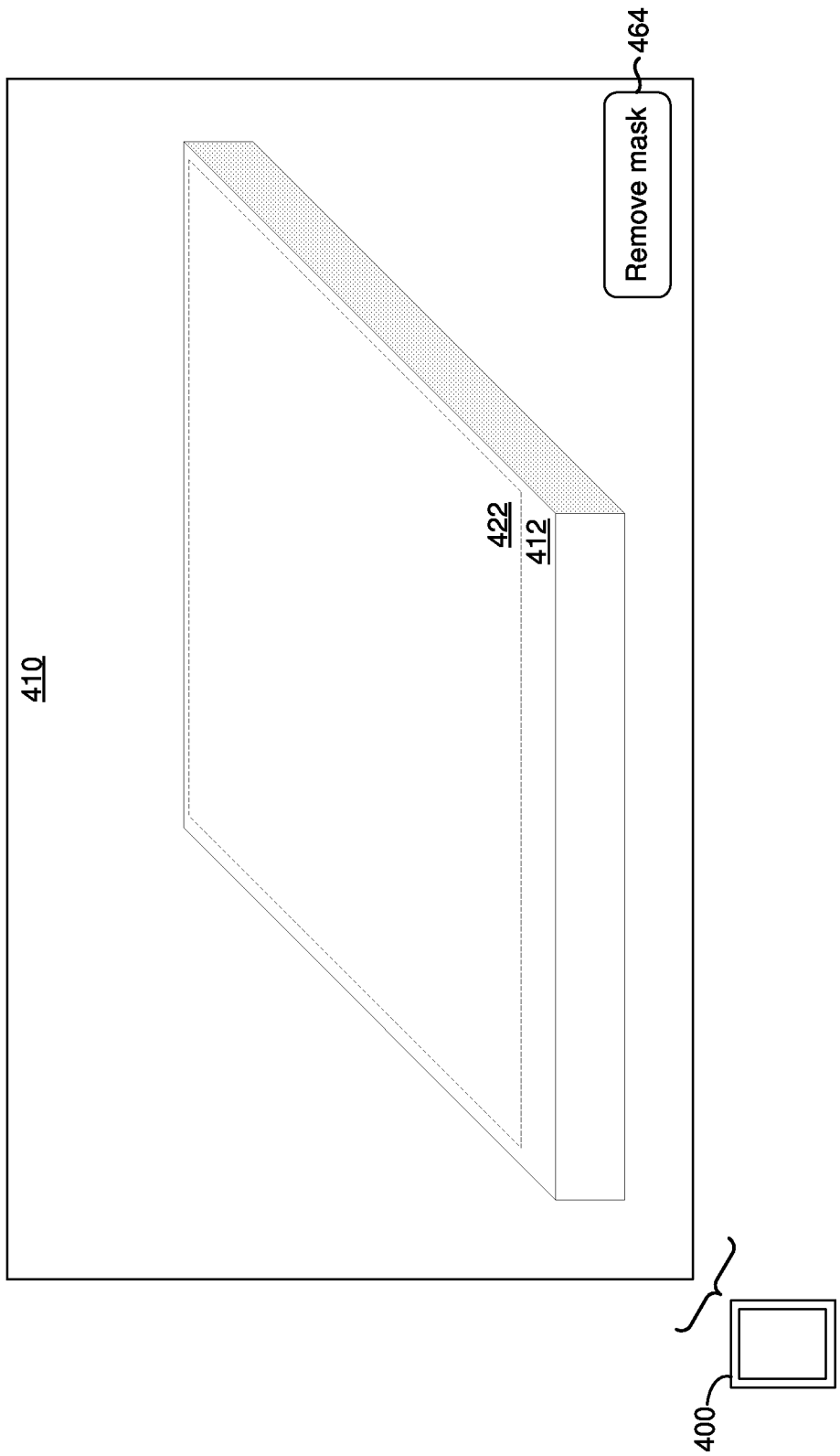

Referring to FIG. 4M, in some implementations, the electronic device 400 displays a clear affordance 460 that, when activated, causes the electronic device 400 to composite a masking element onto the CGR surface 412 in order to mask the CGR objects 414, 416 and 418 that are on the CGR surface 412. As shown in FIG. 4N, the electronic device 400 detects a user input 462 directed to the clear affordance 460. As shown in FIG. 4O, in response to detecting the user input 462, the electronic device 400 composites the masking element 422 on the CGR surface 412. In some implementations, the electronic device 400 displays a remove affordance 464 that, when activated, causes the electronic device 400 to remove the masking element 422 and re-display the CGR objects 414, 416 and 418 on the CGR surface 412.

In some implementations, a head-mountable device (HMD) (not shown), being worn by a person, presents (e.g., displays) the CGR environment 410 according to various implementations. In some implementations, the HMD includes an integrated display (e.g., a built-in display) that displays the CGR environment 410. In some implementations, the HMD includes a head-mountable enclosure. In various implementations, the head-mountable enclosure includes an attachment region to which another device with a display can be attached. For example, in some implementations, the electronic device 400 can be attached to the head-mountable enclosure. In various implementations, the head-mountable enclosure is shaped to form a receptacle for receiving another device that includes a display (e.g., the electronic device 400). For example, in some implementations, the electronic device 400 slides/snaps into or otherwise attaches to the head-mountable enclosure. In some implementations, the display of the device attached to the head-mountable enclosure presents (e.g., displays) the CGR environment 410. In various implementations, examples of the electronic device 400 include smartphones, tablets, media players, laptops, etc.

Figure 5A:
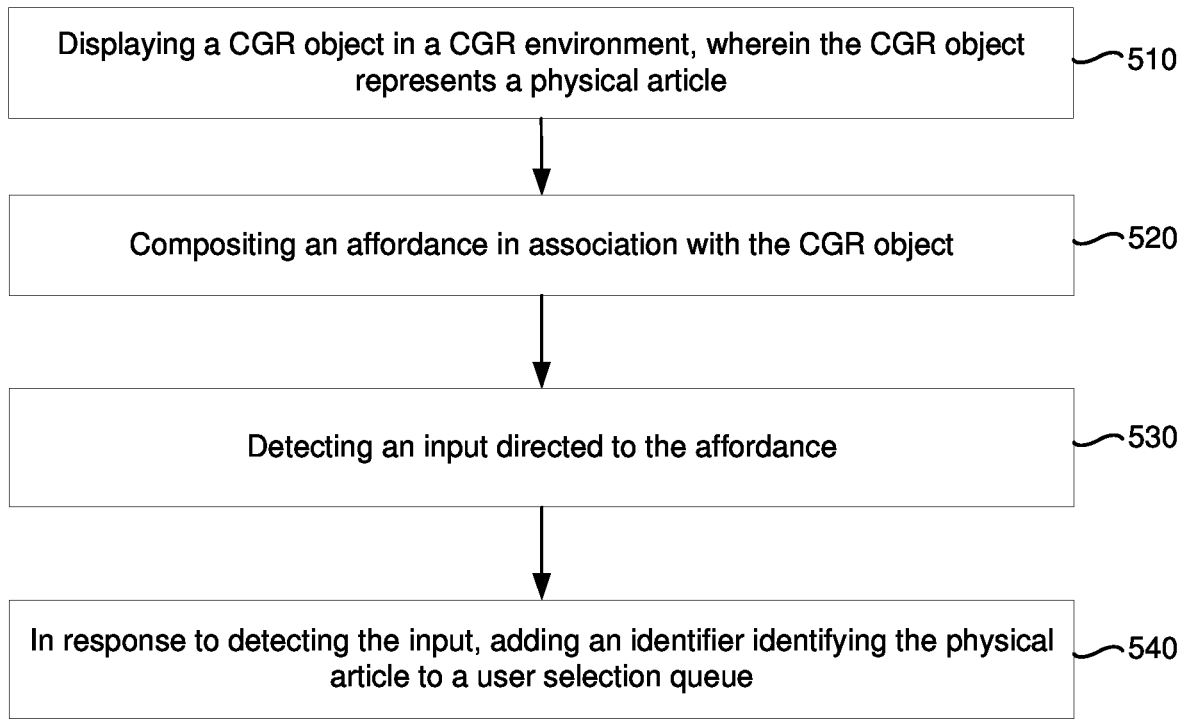
FIGS. 5A-5C are flowchart representations of a method of controlling a user selection queue in accordance with some implementations.

FIG. 5A is a flowchart representation of a method 500 of controlling a user selection queue. In various implementations, the method 500 is performed by a device with a display, a non-transitory memory and one or more processors coupled with the display and the non-transitory memory (e.g., the electronic device 100 shown in FIGS. 1A-1L). In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 510, in various implementations, the method 500 includes displaying a computer-generated reality (CGR) object in a CGR environment. In some implementations, the CGR object represents a physical article. For example, as shown in FIG. 1C, the electronic device 100 displays the CGR couch 116 in the CGR environment 110. As described in relation to FIG. 1C, the CGR couch 116 represents a physical couch (e.g., the couch represented by the 2D representation 104 shown in FIG. 1A).

As represented by block 520, in various implementations, the method 500 includes compositing an affordance in association with the CGR object. For example, as shown in FIG. 1C, the electronic device 100 composites the affordance 120 in association with the CGR couch 116. In some implementations, the method 500 includes displaying the affordance adjacent to the CGR object. For example, as shown in FIG. 1C, the electronic device 100 displays the affordance 120 adjacent to the CGR couch 116.

As represented by block 530, in various implementations, the method 500 includes detecting an input directed to the affordance. For example, as shown in FIG. 1D, the electronic device 100 detects the user input 130 directed to the affordance 120. In some implementations, the method 500 includes detecting a contact at a location corresponding to the affordance.

As represented by block 540, in various implementations, the method 500 includes, in response to detecting the input, adding an identifier identifying the physical article to a user selection queue. For example, as shown in FIGS. 1D-1E, the electronic device 100 adds the identifier 118 of the couch to the user selection queue 150 in response to detecting the user input 130. In some implementations, the method 500 includes writing the identifier identifying the physical article to the user selection queue. In some implementations, the method 500 includes associating the identifier identifying the physical article with the user selection queue. In various implementations, adding the identifier of the physical article to the user selection queue while the device is displaying the CGR object representing the physical articles reduces a need to manually navigate to a web page corresponding to the physical article in order to add the identifier identifying the physical article to the user selection queue.

Figure 5B:
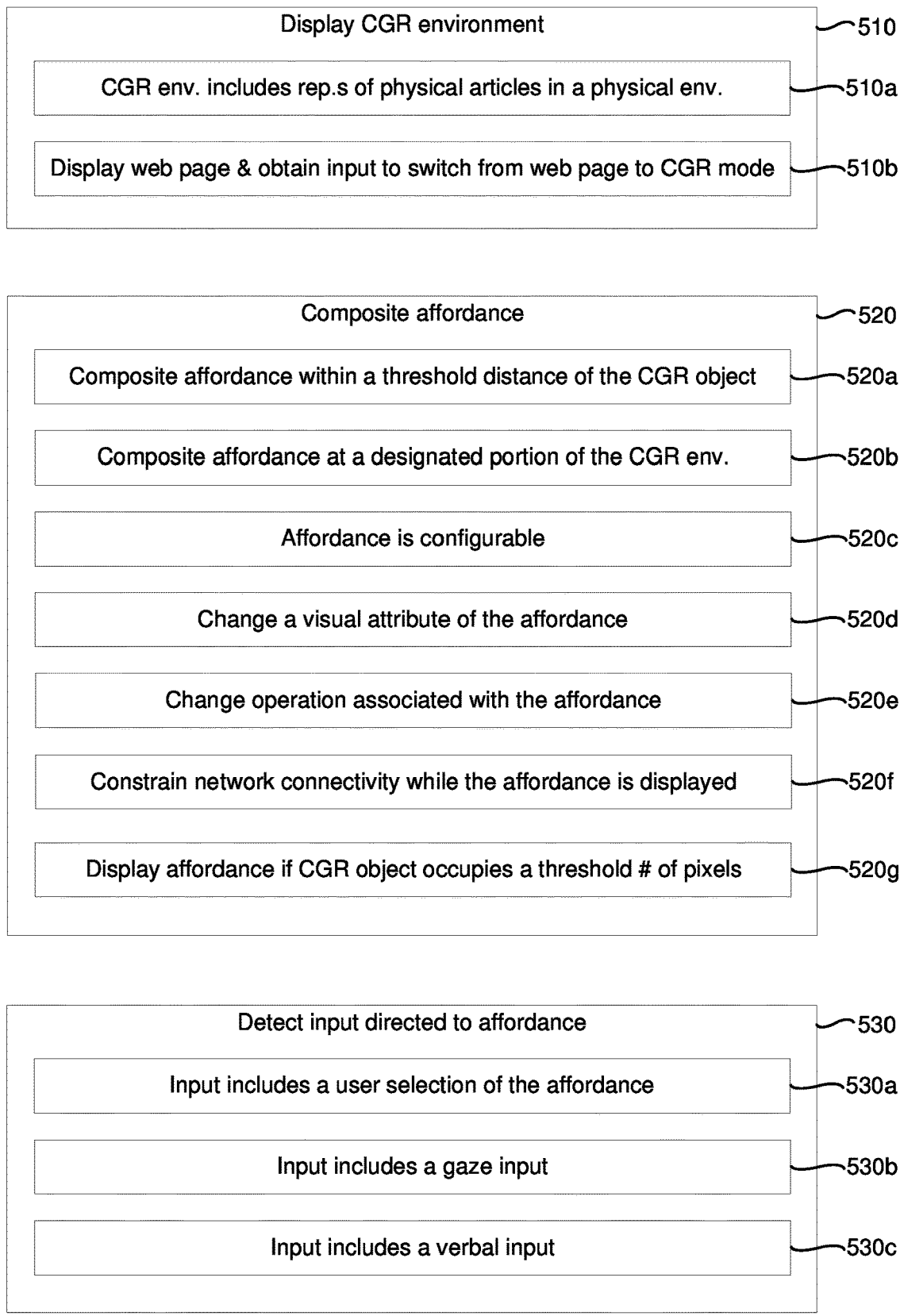

Referring to FIG. 5B, as represented by block 510a, in some implementations, the CGR environment includes representations of physical articles that are located in a physical environment surrounding the device. For example, as shown in FIG. 1C, the CGR environment 110 includes the first CGR floor lamp 112 representing the first floor lamp 12 in the physical environment 10 surrounding the electronic device 100, and the second CGR floor lamp 114 representing the second floor lamp 14 in the physical environment 10 surrounding the electronic device 100.

As represented by block 510b, in some implementations, the method includes displaying a web page that includes a two-dimensional (2D) representation of the physical article, and obtaining an input to switch from the web page to a CGR mode in which the CGR object representing the physical article is displayed. For example, as shown in FIG. 1A, the electronic device 100 displays the web page 102 that includes the 2D representation 104 of the couch. Moreover, as shown in FIG. 1B, the electronic device 100 detects the user input 108 directed to the affordance 106 corresponding to a request to switch to a CGR mode in which the CGR couch 116 representing the couch is displayed.

As represented by block 520a, in some implementations, compositing the affordance includes compositing the affordance within a threshold distance of the CGR object. For example, as shown in FIG. 1C, the electronic device 100 composites the affordance 120 adjacent to or proximate to the CGR couch 116. In some implementations, the method 500 include obtaining the threshold distance.

As represented by block 520b, in some implementations, the method 500 includes compositing the affordance at a designated portion of the CGR environment. For example, as shown in FIG. 1H, the electronic device 100 composites the affordance 120 at the designated portion 160. In some implementations, the method 500 includes selecting the designated portion. For example, as shown in FIG. 1H, the electronic device 100 selects the bottom-right corner of the CGR environment 110 as the designated portion 160.

As represented by block 520c, in some implementations, the method 500 includes configuring the affordance. As represented by block 520d, in some implementations, the method 500 includes changing a visual attribute of the affordance. For example, in some implementations, the method 500 includes changing a text string displayed by the affordance. In some implementations, the method 500 includes replacing a default text of the affordance with a replacement string. In some implementations, the replacement string is a function of the physical article that the CGR object represents (e.g., changing "Add to Queue" to "Add couch to Queue").

As represented by block 520e, in some implementations, the method 500 includes changing an operation associated with the affordance. In some implementations, the method 500 includes changing the operation to adding the identifier to the user selection queue and confirming the user selection queue. In some implementations, the method 500 includes changing the operation to adding the identifier to a list of favorites. In some implementations, the method 500 includes changing the operation to saving the identifier. In some implementations, the method 500 includes bookmarking the web page associated with the physical article represented by the CGR object. In some implementations, the method 500 includes sharing the identifier with another device (e.g., with another device associated with a contact in a contacts application of the device).

As represented by block 520f, in some implementations, the method 500 includes constraining a network connectivity of the device while the affordance is displayed. In some implementations, the method 500 includes preventing malicious code from executing on the device while the affordance is displayed. In some implementations, constraining the network connectivity prevents malicious code from executing on the device. In some implementations, the method 500 includes turning off a transceiver (e.g., a radio) of the device while the affordance is displayed. In some implementations, the method 500 includes switching the device from a communicating mode to a non-communicating mode (e.g., to an airplane mode) while the affordance is displayed.

As represented by block 520g, in some implementations, the method 500 includes determining whether the CGR object occupies at least a threshold number of pixels, and compositing the affordance in response to determining that the CGR object occupies at least the threshold number of pixels. In some implementations, the method 500 includes determining whether the CGR object occupies at least a threshold portion of the CGR environment, and compositing the affordance in response to determining that the CGR object occupies at least the threshold portion of the CGR environment.

As represented by block 530a, in some implementations, the input directed to the affordance includes a user selection of the affordance. For example, as shown in FIG. 1D, the electronic device 100 detects the user input 130 directed to the affordance 120. As represented by block 530b, in some implementations, the input directed to the affordance includes a gaze input directed to the affordance. For example, in some implementations, the electronic device 100 utilizes eye tracking to detect the gaze input. As represented by block 530c, in some implementations, the input directed to the affordance includes a verbal input. For example, in some implementations, the electronic device 100 detects speech, via a microphone, that corresponds to an input to activate the affordance.

Figure 5C:
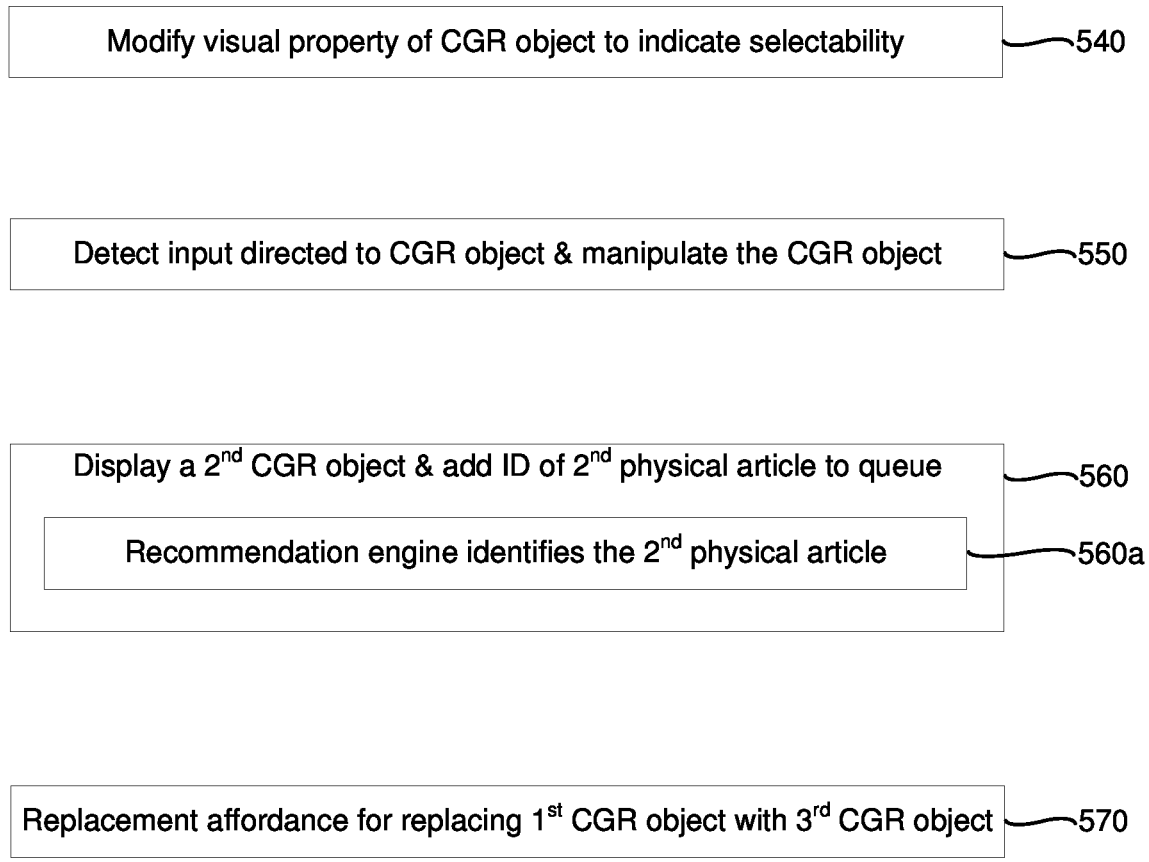

Referring to FIG. 5C, as represented by block 540, in some implementations, the method 500 includes modifying a visual property of the CGR object in order to indicate that the CGR object is selectable. For example, in some implementations, the method 500 includes displaying the CGR object with a raised appearance in order to indicate that the CGR object can be depressed. In some implementations, the method 500 includes displaying text adjacent to or overlapping with the CGR object indicating the selectability of the CGR object.

As represented by block 550, in some implementations, the method 500 includes detecting an input directed to the CGR object, and manipulating the CGR object in accordance with the input directed to the CGR object. For example, in some implementations, the electronic device 100 changes a size of the CGR object in response to detecting a pinch gesture at a location corresponding to the CGR object. In some implementations, the electronic device 100 moves the CGR object in response to detecting a drag gesture or a swipe gesture at a location corresponding to the CGR object.

As represented by block 560, in some implementations, the method 500 includes while displaying the CGR object in the CGR environment, displaying a second CGR object that represents a second physical article. In some implementations, the method 500 includes adding an identifier identifying the second physical article to the user selection queue in response to detecting the input directed to the affordance. In some implementations, the affordance is associated with the CGR object and the second CGR object. For example, as shown in FIG. 1I, the electronic device 100 displays the CGR painting 170 in addition to the CGR couch 116.

As represented by block 560a, in some implementations, the method 500 includes identifying, by a recommendation engine, the second physical article based on the physical article. For example, a recommendation engine identifies the painting represented by the CGR painting 170 in response to the electronic device 100 displaying the CGR couch 116.

As represented by block 570, in some implementations, the method 500 includes displaying a replacement affordance in association with the CGR object. In some implementations, the replacement affordance allows the CGR object to be replaced with a third CGR object representing a third physical article. For example, as shown in FIG. 1J, the electronic device 100 displays the second replacement affordance 194b. In some implementations, the method 500 includes detecting an input directed to the replacement affordance. For example, as shown in FIG. 1K, the electronic device 100 detects the user input 196 directed to the second replacement affordance 194b. In some implementations, the method 500 includes, in response to detecting the input directed to the replacement affordance, replacing the CGR object with the third CGR object. For example, as shown in FIG. 1L, the electronic device 100 displays the second CGR couch 198 in response to detecting the user input 196.

Figure 6A:
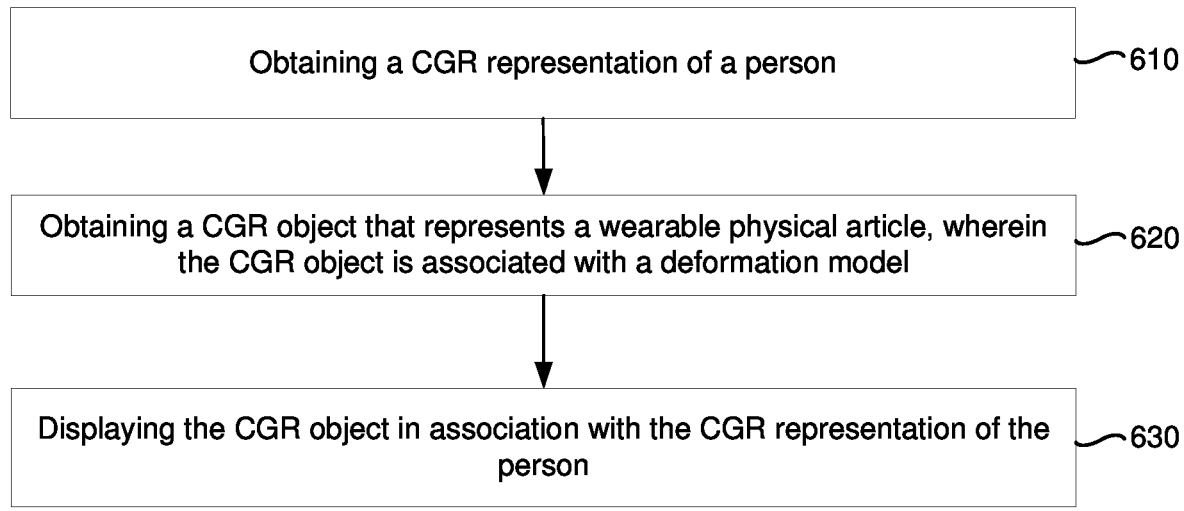
FIGS. 6A-6C are flowchart representations of a method of displaying a CGR object that represents a wearable physical article in accordance with some implementations.

FIG. 6A is a flowchart representation of a method 600 of displaying a CGR object that represents a wearable physical article. In various implementations, the method 600 is performed by a device with a display, a non-transitory memory and one or more processors coupled with the display and the non-transitory memory (e.g., the electronic device 200 shown in FIGS. 2A-2G). In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 610, in various implementations, the method 600 includes obtaining a computer-generated reality (CGR) representation of a person. In some implementations, at least a portion of the CGR representation is proportional to a corresponding portion of the person. For example, as shown in FIG. 2A, the electronic device 200 obtains (e.g., generates) and presents the CGR representation 212 of the person 22. As described in relation to FIG. 2A, in some implementations, the CGR representation 212 is proportional to the person 22.

As represented by block 620, in various implementations, the method 600 includes obtaining a CGR object that represents a wearable physical article. In some implementations, the CGR object is associated with a deformation model characterizing one or more material characteristics of the wearable physical article. For example, as shown in FIG. 2B, the electronic device 200 obtains (e.g., generates or receives) and presents the CGR T-shirt 230 that represents a physical T-shirt that is small in size, is slim fit in style and is made of cotton. As shown in FIG. 2B, the CGR T-shirt 230 is associated with the deformation model 232 that characterizes the material characteristics of the physical T-shirt (e.g., small size, slim fit style and cotton material composition).

As represented by block 630, in various implementations, the method 600 includes displaying the CGR object in association with the CGR representation of the person. In some implementations, the CGR object interfaces with the CGR representation of the person in accordance with the deformation model. For example, as shown in FIG. 2B, the electronic device 200 displays the CGR T-shirt 230 as being worn by the CGR representation 212 of the person 22. As shown in FIG. 2B, the CGR T-shirt 230 deforms over the CGR representation 212 in accordance with the deformation model 232. For example, the CGR T-shirt 230 deforms to form the CGR stretch lines 234. As described herein, since the deformation model models a deformation of the wearable physical article over the person, displaying the CGR object in association with the CGR representation of the person allows the person to see how the wearable physical article would fit the person thereby enhancing a user experience of the device.

Figure 6B:
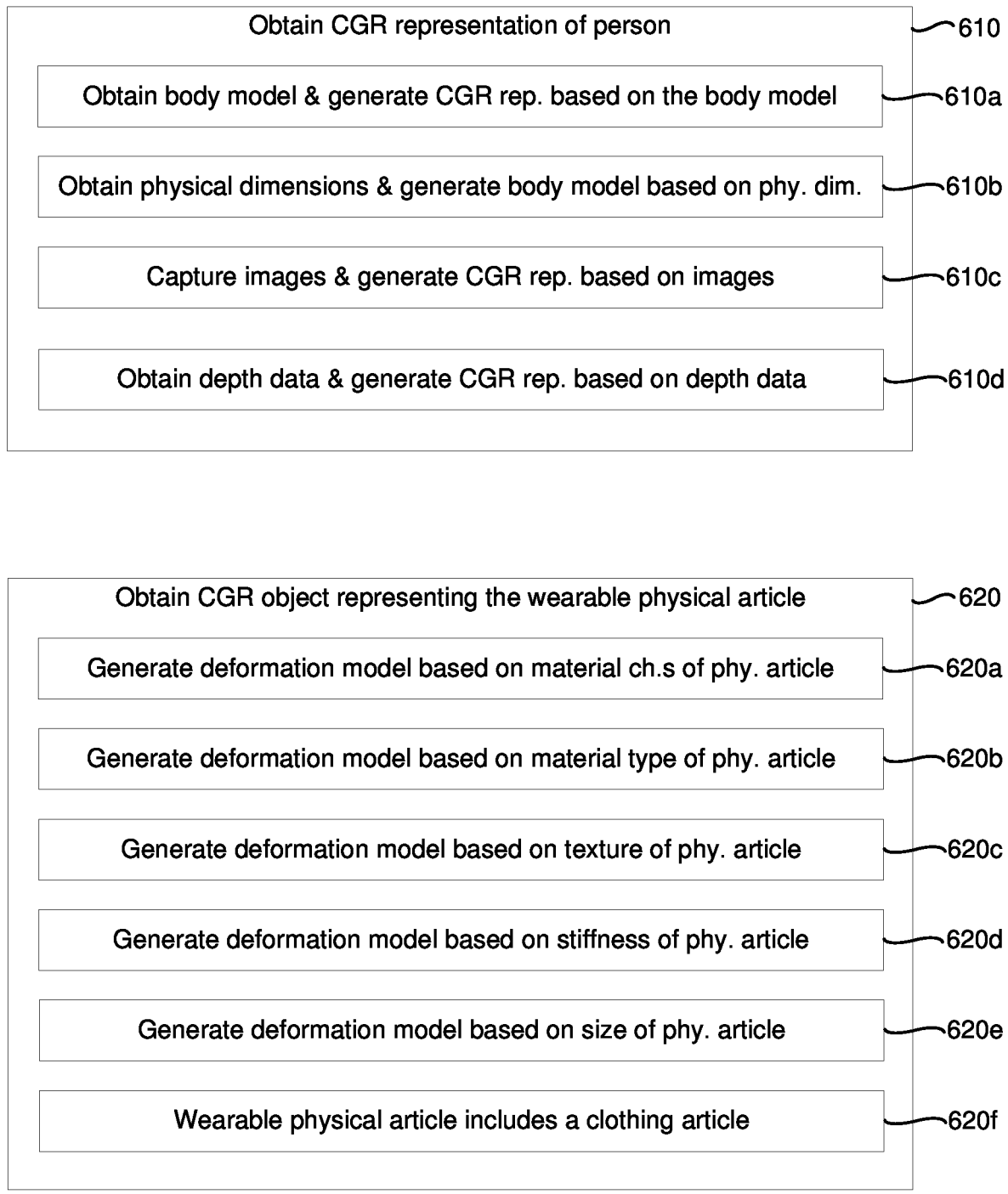

Referring to FIG. 6B, as represented by block 610a, in some implementations, the method 600 includes obtaining a body model of the person, and generating the CGR representation of the person based on the body model of the person. For example, as shown in FIG. 2E, in some implementations, the electronic device 200 obtains (e.g., generates or receives) the body model 270 for the person 22, and the electronic device 200 generates (e.g., synthesizes) the CGR representation 212 of the person 22 based on the body model 270.

As represented by block 610b, in some implementations, the method 600 includes obtaining physical dimensions of the person, and generating the body model based on the physical dimensions of the person. For example, as shown in FIG. 2E, in some implementations, the electronic device 200 displays the GUI 260 with the measurement affordance 266. In some implementations, in response to detecting an activation of the measurement affordance 266, the electronic device 200 displays user interface elements (e.g., text boxes, drop-downs, etc.) that allow the person 22 to enter physical dimensions. In some implementations, the electronic device 200 generates the body model 270 based on the physical dimensions, and the electronic device 200 generates the CGR representation 212 based on the body model 270.

As represented by block 610c, in some implementations, the method 600 includes capturing one or more images of the person, and generating the CGR representation of the person based on the one or more images of the person. For example, as shown in FIG. 2E, in some implementations, the electronic device 200 displays the affordance 262 that, when activated, triggers the capturing of pictures. In some implementations, the electronic device 200 utilizes the captured pictures to generate the CGR representation 212 of the person 22. In some implementations, the method 600 includes utilizing methods, devices and/or systems associated with photogrammetry to extract physical dimensions of the person 22 from the captured photos, and generating the body model 270 and/or the CGR representation 212 based on the extracted physical dimensions.

As represented by block 610d, in some implementations, the method 600 includes obtaining depth data associated with the person, and generating the CGR representation of the person based on the depth data. In some implementations, the method 600 includes capturing the depth data from a depth sensor (e.g., a depth camera) of the device. In some implementations, the method 600 includes determining physical dimensions of the person based on the depth data, and generating the body model and/or the CGR representation of the person based on the physical dimensions.

As represented by block 620a, in some implementations, the method 600 includes generating the deformation model for the CGR object based on the one or more material characteristics of the wearable physical article. For example, as shown in FIG. 2B, the electronic device 200 generates the deformation model 232 for the CGR T-shirt 230 based on the material characteristics of the physical T-shirt (e.g., small size, slim fit style and/or cotton composition).

As represented by block 620b, in some implementations, the method 600 includes generating the deformation model for the CGR object based on a material type of the wearable physical article. For example, as shown in FIG. 2B, the electronic device 200 generates the deformation model 232 for the CGR T-shirt 230 based on the cotton composition of the physical T-shirt.

As represented by block 620c, in some implementations, the method 600 includes generating the deformation model for the CGR object based on a texture of the wearable physical article. In some implementations, the texture is a function of the material type. As such, in some implementations, generating the deformation model based on the material type of the wearable physical article includes generating the deformation model based on the texture of the wearable physical article.

As represented by block 620d, in some implementations, the method 600 includes generating the deformation model for the CGR object based on a stiffness of the wearable physical article. In some implementations, the stiffness is a function of the material type and/or the style of the wearable physical article. As such, in some implementations, generating the deformation model based on the material type and/or the style of the wearable physical article includes generating the deformation model based on the stiffness of the wearable physical article. In some implementations, the method 600 includes obtaining a stiffness value and generating the deformation model based on the stiffness value. In some implementations, the stiffness value is related to an amount of starch that is applied to the wearable physical article.

As represented by block 620e, in some implementations, the method 600 includes generating the deformation model for the CGR object based on a size of the wearable physical article. For example, as shown in FIG. 2B, the electronic device 200 generates the deformation model 232 based on the small size selected by the person 22. As shown in FIG. 2B, the small size contributes to the formation of the CGR stretch lines 234. Similarly, as shown in FIG. 2C, the electronic device 200 generates the deformation model 242 based on the large size selected by the person 22. As shown in FIG. 2C, the large size contributes to the CGR droppings 244 and 246.

As represented by block 620f, in some implementations, the wearable physical article includes a clothing article (e.g., a T-shirt as shown in FIGS. 2A-2D, or a pair of shorts as shown in FIG. 2F). In various implementations, the method 600 allows a person to see how a particular clothing article may fit the person without trying-on the clothing article. In some implementations, the clothing article includes an undergarment (e.g., an undershirt or an underwear). Since many stores do not allow people to try-on undergarments, in various implementations, the method 600 allows a person to see how a particular undergarment may fit the person without trying-on the undergarment. In various implementations, the method 600 enables a person to find a clothing article that fits the person in a reduced amount of time thereby reducing an amount of time during which a display of the device is kept ON. Reducing the amount of time during which the display of the device is kept ON reduces the power consumption of the device.

Figure 6C:
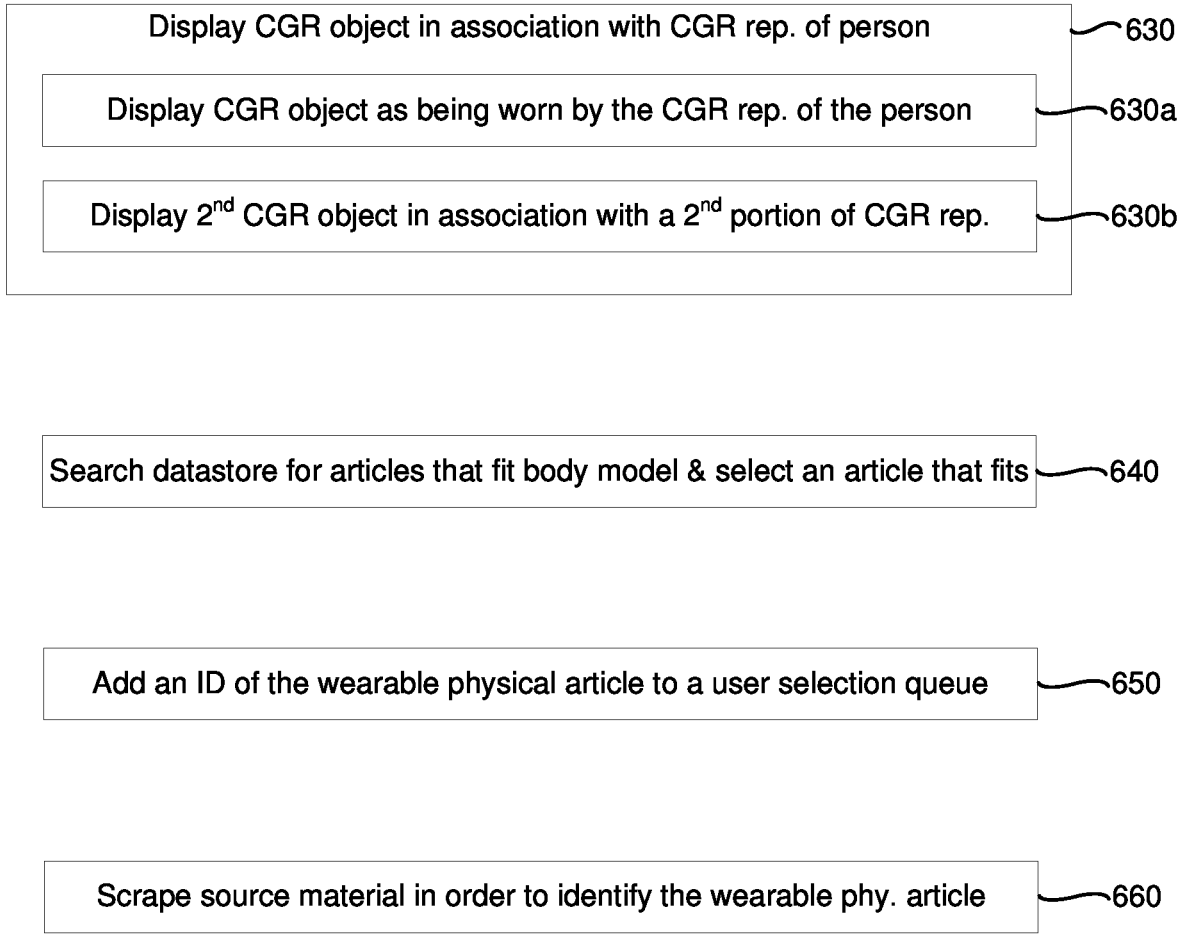

Referring to FIG. 6C, as represented by block 630a, in some implementations, the method 600 includes displaying the CGR object as being worn by the CGR representation of the person. For example, as shown in FIG. 2B, the electronic device 200 displays the CGR T-shirt 230 as being worn by the CGR representation 212 of the person 22.

As represented by block 630b, in some implementations, the method 600 includes displaying a second CGR object in association with a second portion of the CGR representation of the person. In some implementations, the second CGR object represents a second wearable physical article. For example, as shown in FIG. 2F, the electronic device 200 displays the CGR shorts 280 as being worn by the CGR representation 212 of the person 22. Concurrently displaying CGR objects representing multiple wearable physical articles reduces an amount of time during which the display of the device is kept ON thereby lowering the power consumption of the device. Concurrently displaying CGR objects representing multiple wearable physical articles allows the person to select multiple physical articles concurrently thereby enhancing the user experience of the device.

As represented by block 640, in some implementations, the method 600 includes searching a datastore for a set of wearable physical articles that fit the body model of the person, and selecting the wearable physical article from the set of wearable physical articles that fit the body model of the person. For example, as shown in FIG. 2E, in some implementations, the electronic device 200 displays the GUI 260 that allows the person 22 to search for clothes that fit the body model 270 of the person 22.

As represented by block 650, in some implementations, the method 600 includes after displaying the CGR object in association with the CGR representation of the person, displaying an affordance to add an identifier identifying the wearable physical article to a user selection queue. For example, as shown in FIG. 2G, the electronic device 200 displays the affordance 290 that, when activated, causes the electronic device 200 to add an ID identifying the physical T-shirt represented by the CGR T-shirt 250 to a user selection queue (e.g., the user selection queue 150 shown in FIG. 1C). In some implementations, the method 600 includes detecting an input directed to the affordance (e.g., detecting a user input activating the affordance 290 shown in FIG. 2G). In some implementations, the method 600 includes adding the identifier identifying the wearable physical article to the user selection queue (e.g., writing the identifier to the user selection queue 150 shown in FIG. 1C).

As represented by block 660, in some implementations, the method 600 includes scraping source material in order to identify the wearable physical article. For example, in some implementations, the method 600 includes scraping a movie in order to identify a clothing article worn by a fictional character in the movie, and searching a clothing datastore in order to find a physical clothing article that is within a degree of similarity to the clothing article worn by the fictional character in the movie.

Figure 7A:
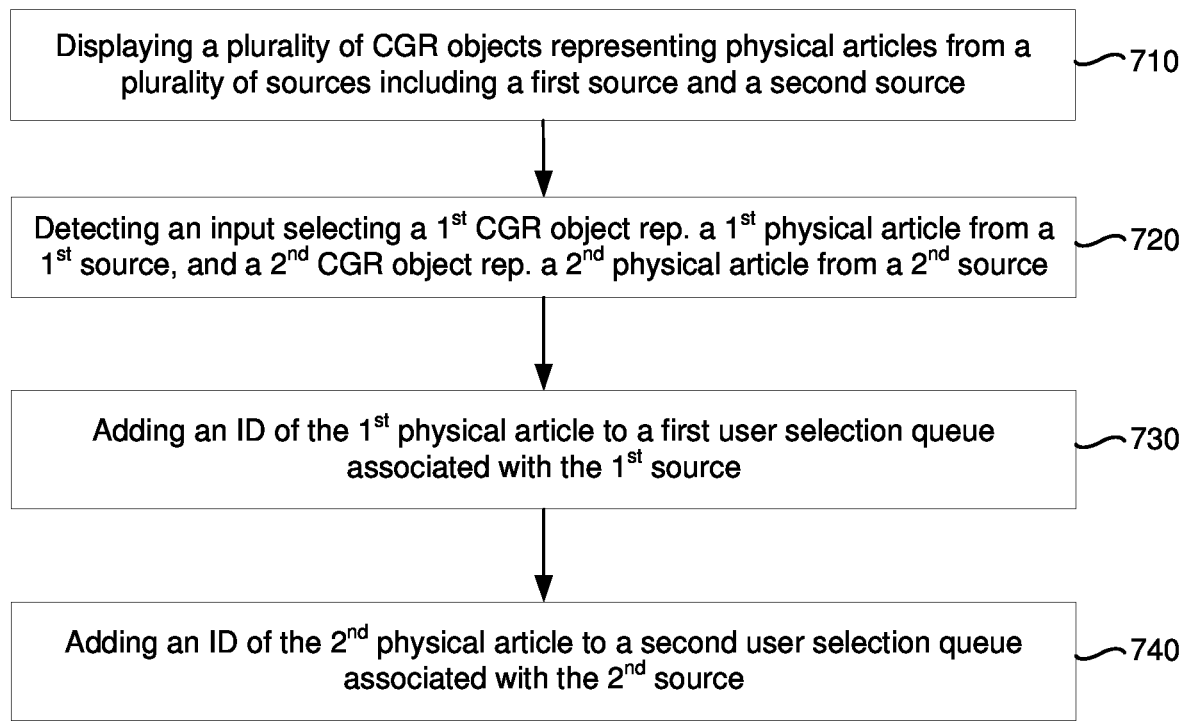
FIGS. 7A-7C are flowchart representations of a method of concurrently controlling multiple user selection queues in accordance with some implementations.

FIG. 7A is a flowchart representation of a method 700 of concurrently controlling multiple user selection queues. In various implementations, the method 700 is performed by a device with a display, a non-transitory memory and one or more processors coupled with the display and the non-transitory memory (e.g., the electronic device 300 shown in FIGS. 3A-3I). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 710, in various implementations, the method 700 includes displaying a plurality of computer-generated reality (CGR) objects representing respective physical articles from a plurality of sources including a first source and a second source. For example, as shown in FIG. 3A, the electronic device 300 displays the CGR couch 316 representing a physical couch from the first source 330, and the CGR painting 318 representing a physical painting from the second source 340.

As represented by block 720, in various implementations, the method 700 includes detecting an input selecting a first CGR object of the plurality of CGR objects and a second CGR object of the plurality of CGR objects. In some implementations, the first CGR object represents a first physical article from the first source and the second CGR object represents a second physical article from the second source. For example, as shown in FIGS. 3B and 3F, the electronic device 300 detects the user inputs 350 and 370, respectively, selecting the CGR couch 316 and the CGR painting 318, respectively.

As represented by block 730, in various implementations, the method 700 includes adding an identifier of the first physical article to a first user selection queue that is associated with the first source. For example, as shown in FIG. 3B, the electronic device 300 adds the couch ID 317 to the first user selection queue 332.

As represented by block 740, in various implementations, the method 700 includes adding an identifier of the second physical article to a second user selection queue that is associated with the second source. For example, as shown in FIG. 3G, the electronic device 300 adds the painting ID 319 to the second user selection queue 342. In various implementations, the method 700 allows concurrently adding IDs of physical articles from different sources to respective source-specific user selection queues thereby reducing user inputs corresponding to manually navigating to web pages associated with the sources in order to add the IDs to the respective source-specific user selection queues. As such, the method 700 enhances a user experience of the device and/or extends a battery of the device by reducing user inputs and/or by reducing an amount of time during which the display of the device is kept ON.

Figure 7B:
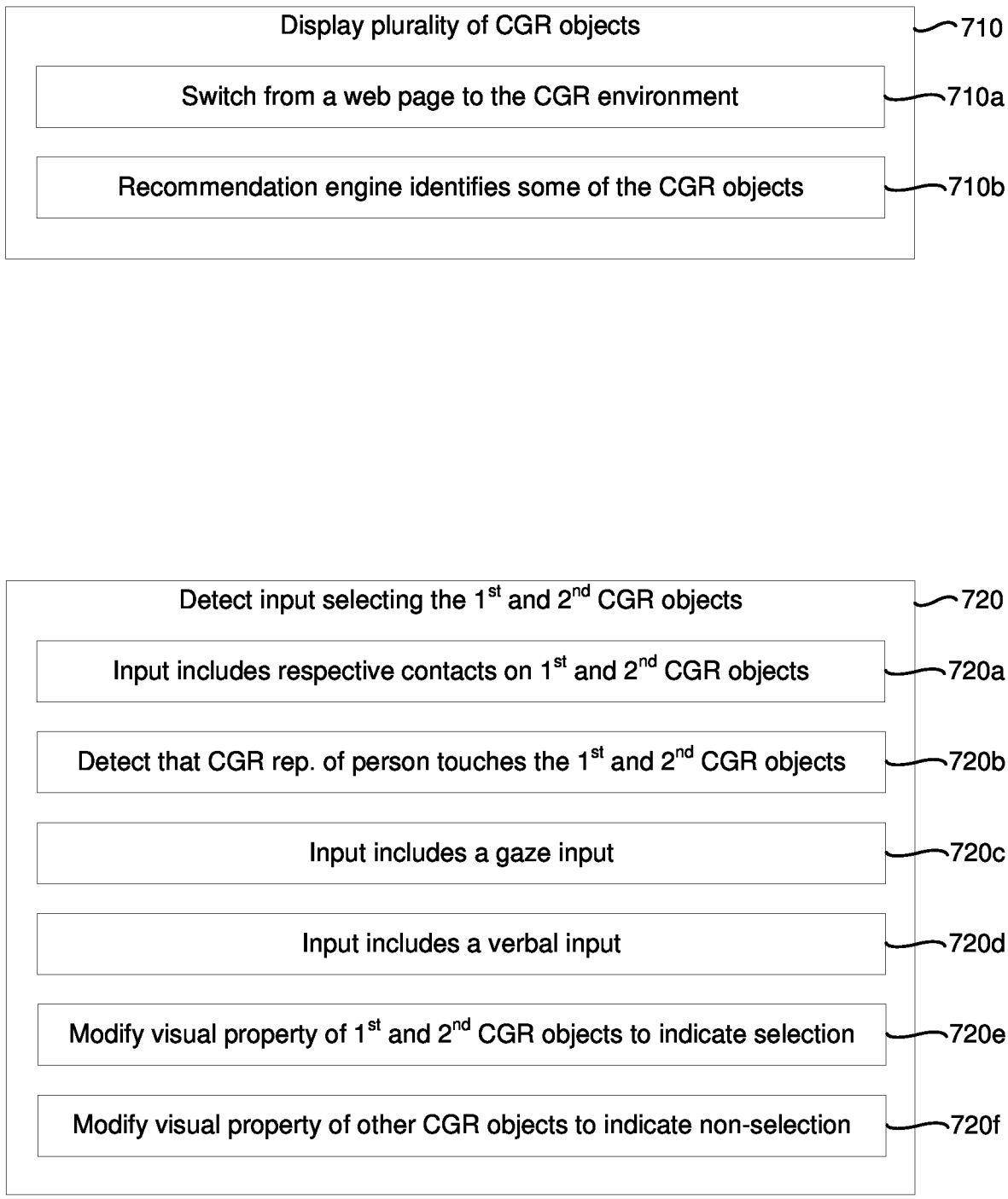

Referring to FIG. 7B, as represented by block 710a, in some implementations, the method 700 includes switching from a web page that includes two-dimensional (2D) representations of the physical articles to the CGR environment in response to an input corresponding to a request to display the plurality of CGR objects. For example, in some implementations, the electronic device 300 displays a web page similar to the web user input corresponding to a request to enter a CGR mode, and displaying a CGR environment that includes the plurality of CGR objects in response to detecting the user input.

As represented by block 710b, in some implementations, the method 700 includes identifying, by a recommendation engine, at least a portion of the CGR objects that are displayed. In some implementations, the method 700 includes identifying physical articles that are in the physical environment surrounding the device, recommending a new physical article based on the physical articles that are in the physical environment, and displaying a CGR object representing the new physical article. For example, in some implementations, the electronic device 300 identifies two floor lamps in the physical environment surrounding the electronic device 300, recommends that a couch be placed between the two floor lamps, and displays the CGR couch 316 between the CGR lamps 312 and 314.

As represented by block 720a, in some implementations, the method 700 includes detecting respective contacts with the first and second CGR objects. For example, as shown in FIGS. 3B and 3F, the electronic device 300 detects the user inputs 350 and 370, respectively, on the CGR couch 316 and the CGR painting 318, respectively.

As represented by block 720b, in some implementations, the method 700 includes detecting that a CGR representation of a person has touched the first and second CGR objects. For example, in some implementations, the CGR environment 310 includes a CGR representation of a person, and the CGR representation provides the user inputs 350 and 370 in FIGS. 3B and 3F, respectively.

As represented by block 720c, in some implementations, the method 700 includes detecting a gaze input directed to the first and second CGR objects. In some implementations, the method 700 includes tracking movement of an eye of a person using the device, and determining that the person has selected the first and second CGR objects in response to a gaze of the eye being fixated at the first and second CGR objects for a threshold amount of time.

As represented by block 720d, in some implementations, the method 700 includes detecting a verbal input directed to the first and second CGR objects. In some implementations, the method 700 includes detecting speech input corresponding to a selection of the first and second CGR objects.

As represented by block 720e, in some implementations, the method 700 includes modifying a visual property of the first and second CGR objects in order to indicate the selection of the first and second CGR objects. For example, as shown in FIG. 3E, the electronic device 300 displays the CGR couch 316 with a shaded effect in order to indicate that the CGR couch 316 has been selected. In some implementations, the method 700 includes highlighting the selected CGR objects, making the selected CGR objects brighter, and/or placing a polygon around the selected CGR objects.

As represented by block 720f, in some implementations, the method 700 includes modifying a visual property of the remainder of the plurality of CGR objects in order to indicate that the remainder of the plurality of CGR objects have not been selected. For example, in some implementations, the method 700 includes graying-out the remainder of the plurality of CGR objects, and/or making the remainder of the plurality of CGR object less bright.

Figure 7C:
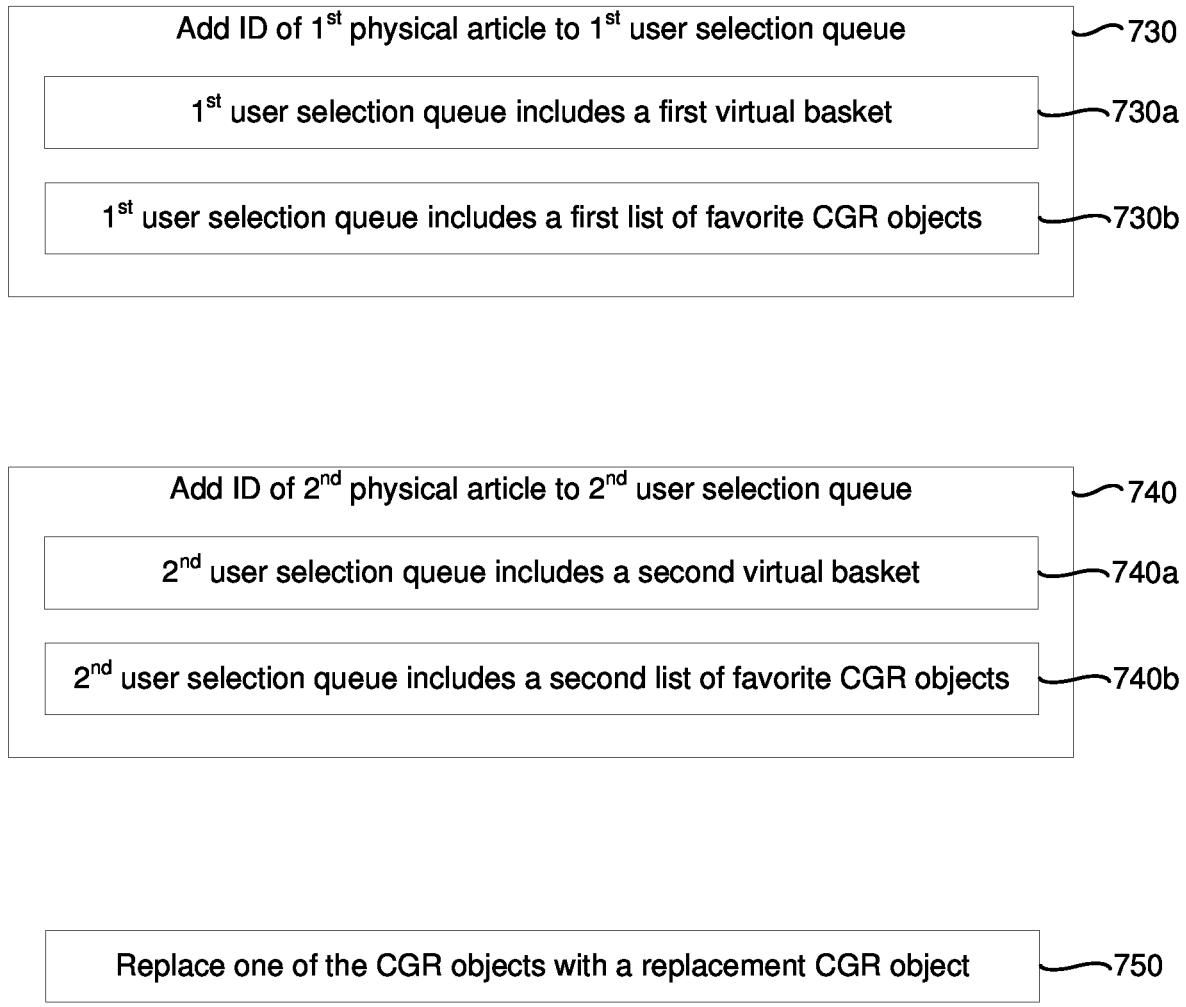

Referring to FIG. 7C, as represented by block 730a, in some implementations, the first user selection queue includes a first virtual basket. As represented by block 740a, in some implementations, the second user selection queue includes a second virtual basket. As represented by block 730b, in some implementations, the first user selection queue includes a first list of favorite CGR objects. As represented by block 740b, in some implementations, the second user selection queue includes a second list of favorite CGR objects.

As represented by block 750, in some implementations, the method 700 includes replacing one of the plurality of CGR objects with a replacement CGR object in response to detecting a replacement input while maintaining the display of the remainder of the plurality of CGR objects. For example, replacing the CGR couch 116 with another CGR couch that represents a different physical couch than the physical couch represented by the CGR couch 116 while maintaining the display of the CGR painting 318.

Figure 8A:
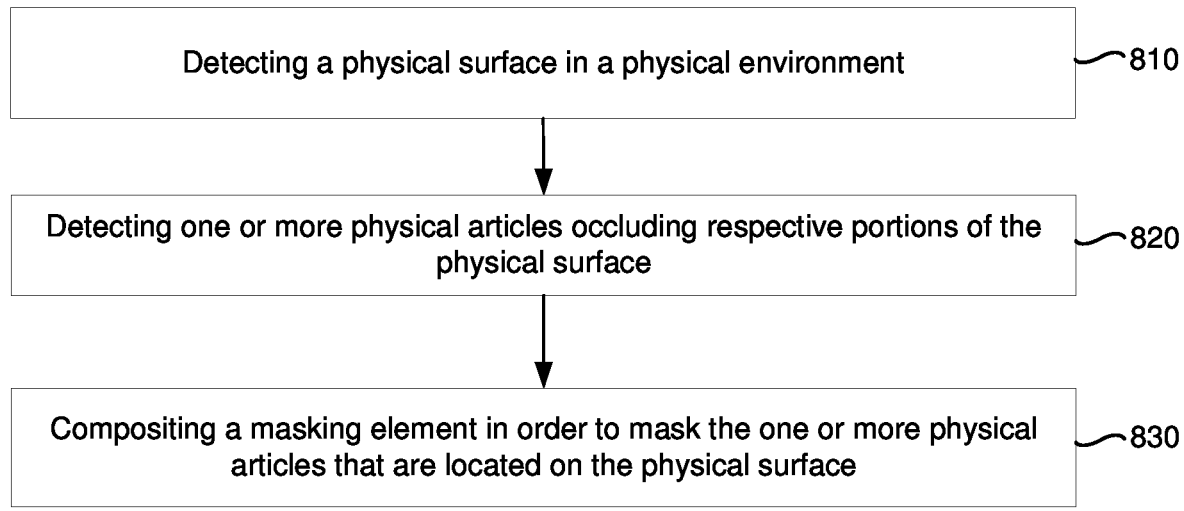
FIGS. 8A-8C are flowchart representations of a method of compositing a masking element in accordance with some implementations.

FIG. 8A is a flowchart representation of a method 800 of compositing a masking element. In various implementations, the method 800 is performed by a device with a display, an environmental sensor, a non-transitory memory and one or more processors coupled with the display, the environmental sensor and the non-transitory memory (e.g., the electronic device 400 shown in FIGS. 4A-4O). In some implementations, the method 800 is performed by processing logic, including hardware, firmware, software, or a combination thereof. In some implementations, the method 800 is performed by a processor executing code stored in a non-transitory computer-readable medium (e.g., a memory).

As represented by block 810, in various implementations, the method 800 includes detecting a physical surface in a physical environment surrounding the device. For example, as described in relation to FIGS. 4A and 4B, the electronic device 400 detects the physical surface 42 in the physical environment 40. In some implementations, the method 800 includes obtaining a mesh map of the physical environment, and determining that the physical environment includes a physical surface based on the mesh map. In some implementations, the method 800 includes capturing environmental data corresponding to the physical environment (e.g., images of the physical environment and/or depth data corresponding to the physical environment), and determining that the physical environment includes a physical surface based on the environmental data.

As represented by block 820, in various implementations, the method 800 includes detecting one or more physical articles occluding respective portions of the physical surface. For example, as described in relation to FIGS. 4A and 4B, the electronic device 400 detects the physical articles 44, 46 and 48 occluding respective portions of the physical surface 42. In some implementations, the method 800 includes detecting the physical articles based on environmental data. In some implementations, the method 800 includes detecting the physical articles based on a mesh map of the physical environment.

As represented by block 830, in various implementations, the method 800 includes compositing a masking element in order to mask the one or more physical articles that are located on the physical surface. For example, as shown in FIG. 4C, the electronic device 400 composites the masking element 422 onto the CGR surface 412 in order to mask the CGR objects 414, 416 and 418.

Figure 8B:
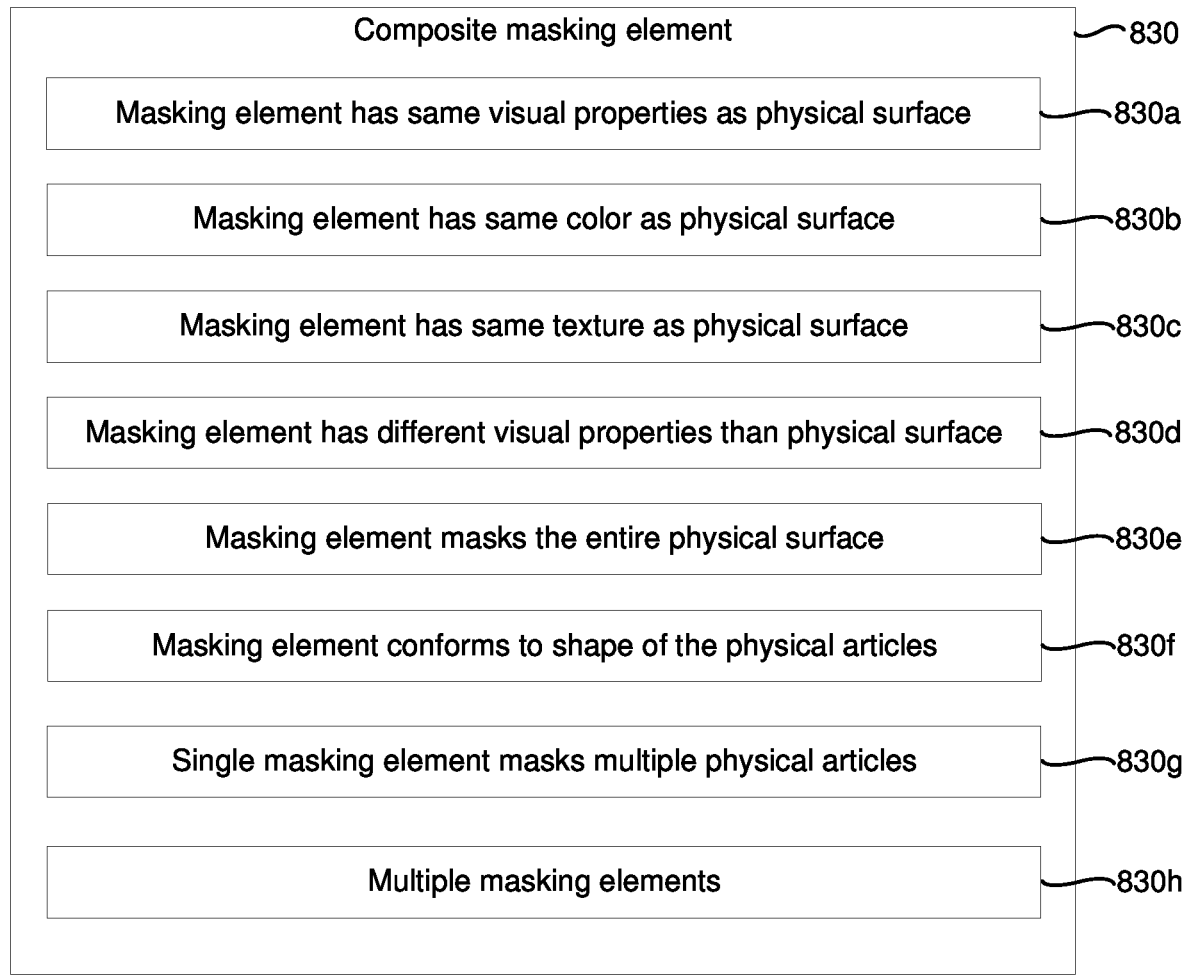

Referring to FIG. 8B, as represented by block 830a, in some implementations, the method 800 includes determining one or more visual properties of the physical surface, and configuring the masking element with the one or more visual properties of the physical surface. For example, in some implementations, the electronic device 400 determines the visual property 43 of the physical surface 42, and configures the visual property 423 of the masking element 422 to be within a degree of similarity to the visual property 43 of the physical surface 42.

As represented by block 830b, in some implementations, the method 800 includes setting a color value of the masking element based on the color of the physical surface such that a color of the masking element is within a degree of similarity to the color of the physical surface. For example, in some implementations, the electronic device 400 sets a color value of the masking element 422 such that a color of the masking element 422 matches a color of the physical surface 42.

As represented by block 830c, in some implementations, the method 800 includes determining a texture of the physical surface, and setting a texture value of the masking element based on the texture of the physical surface such that a texture of the masking element is within a degree of similarity to the texture of the physical surface. For example, in some implementations, the electronic device 400 sets a texture value of the masking element 422 such that a texture of the masking element 422 matches a texture of the physical surface 42.

As represented by block 830d, in some implementations, one or more visual properties of the masking element are different from one or more visual properties of the physical surface. For example, as shown in FIG. 4E, the visual property 423a of the masking element 422a is different from the visual property 413 of the CGR surface 412.

As represented by block 830e, in some implementations, the method 800 includes obfuscating an entirety of the physical surface. For example, in some implementations, the masking element 422 masks the entire CGR surface 412.

As represented by block 830f, in some implementations, the method 800 includes determining a shape of the one or more physical articles, and synthesizing the masking element based on the shape of the one or more physical articles. In some implementations, a shape of the masking element corresponds to the shape of the one or more physical articles. For example, in some implementations, the masking element 422 conforms the shape of the CGR objects 414, 416 and/or 418.

As represented by block 830g, in some implementations, the masking element includes a single masking element that masks a plurality of the one or more physical articles. For example, as shown in FIG. 4C, the masking element 422 masks the CGR objects 414, 416 and 418 representing the physical articles 44, 46 and 48, respectively.

As represented by block 830h, in some implementations, the masking element includes a plurality of masking elements, each masking element masks a respective one of the one or more physical articles. For example, as shown in FIG. 4F, the electronic device 400 generates the masking elements 424, 426 and 428 in order to mask the CGR objects 414, 416 and 418, respectively, that represent the physical articles 44, 46 and 48, respectively.

Figure 8C:
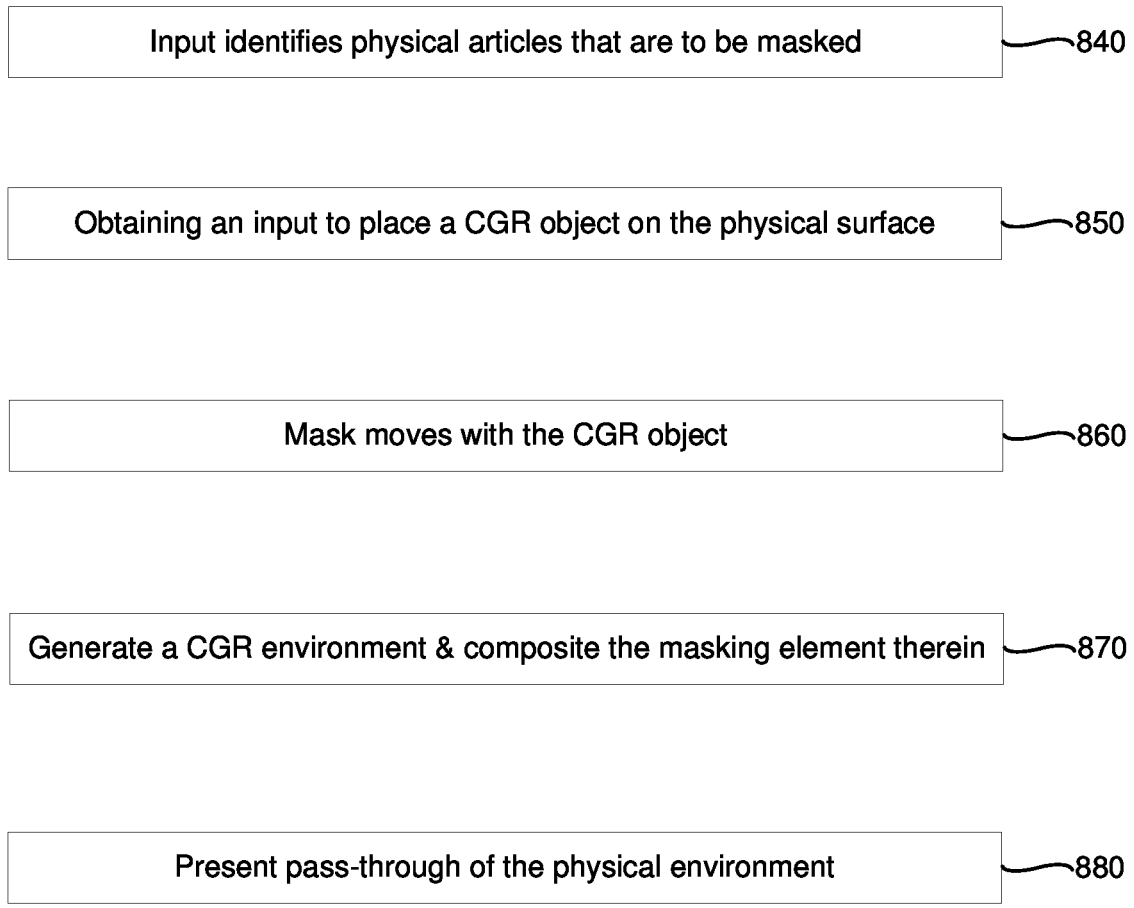

Referring to FIG. 8C, as represented by block 840, in some implementations, the method 800 includes obtaining an input that identifies the one or more physical elements that are to be masked. For example, as shown in FIG. 4N, the electronic device 400 detects the user input 462 that corresponds to a request to mask the CGR objects 414, 416 and 418 representing the physical articles 44, 46 and 48, respectively.

As represented by block 850, in some implementations, the method 800 includes obtaining an indication to place a computer-generated reality (CGR) object at a location corresponding to the one or more physical articles, compositing the masking element in response to obtaining the indication, and overlaying the CGR object onto the masking element. For example, as shown in FIGS. 4H, the electronic device 400 obtains a request to place the fourth CGR object 440 onto the CGR surface 412. As shown in FIG. 4I, the electronic device 400 composites the masking element 422 in response to obtaining the request to place the fourth CGR object 440 on the CGR surface 412, and overlays the fourth CGR object 440 onto the masking element 422.

As represented by block 860, in some implementations, the method 800 includes detecting an input to move the CGR object, and concurrently moving the masking element and the CGR object in a direction indicated by the input. For example, with reference to FIG. 4I, when the electronic device 400 detects an input to move the fourth CGR object 440 to an area of the CGR environment 410 that has other CGR objects that are not currently masked, the electronic device 400 moves the masking element 422 to that area in order to mask the CGR objects in that area.

As represented by block 870, in some implementations, the method 800 includes displaying a CGR environment that corresponds to the physical environment. In some implementations, the CGR environment includes CGR representations of the one or more physical articles. In some implementations, the method 800 includes compositing the masking element onto the CGR representations of the one or more physical articles. For example, as shown in FIGS. 4B and 4C, the electronic device 400 displays the CGR environment 410 that corresponds to the physical environment 40. As shown in FIG. 4B, the CGR environment 410 includes CGR objects 414, 416 and 418 that represent the physical articles 44, 46 and 48, respectively. As shown in FIG. 4C, the electronic device 400 composites the masking element 422 in order to mask the CGR objects 414, 416 and 418.

As represented by block 880, in some implementations, the method 800 includes displaying a pass-through of the physical environment. For example, as discussed in relation to FIG. 4B, in some implementations, the CGR environment 410 includes a pass-through of the physical environment 40. In some implementations, the method 800 includes displaying a video pass-through of the physical environment. In some implementations, the method 800 includes presenting an optical pass-through of the physical environment.

Figure 9:
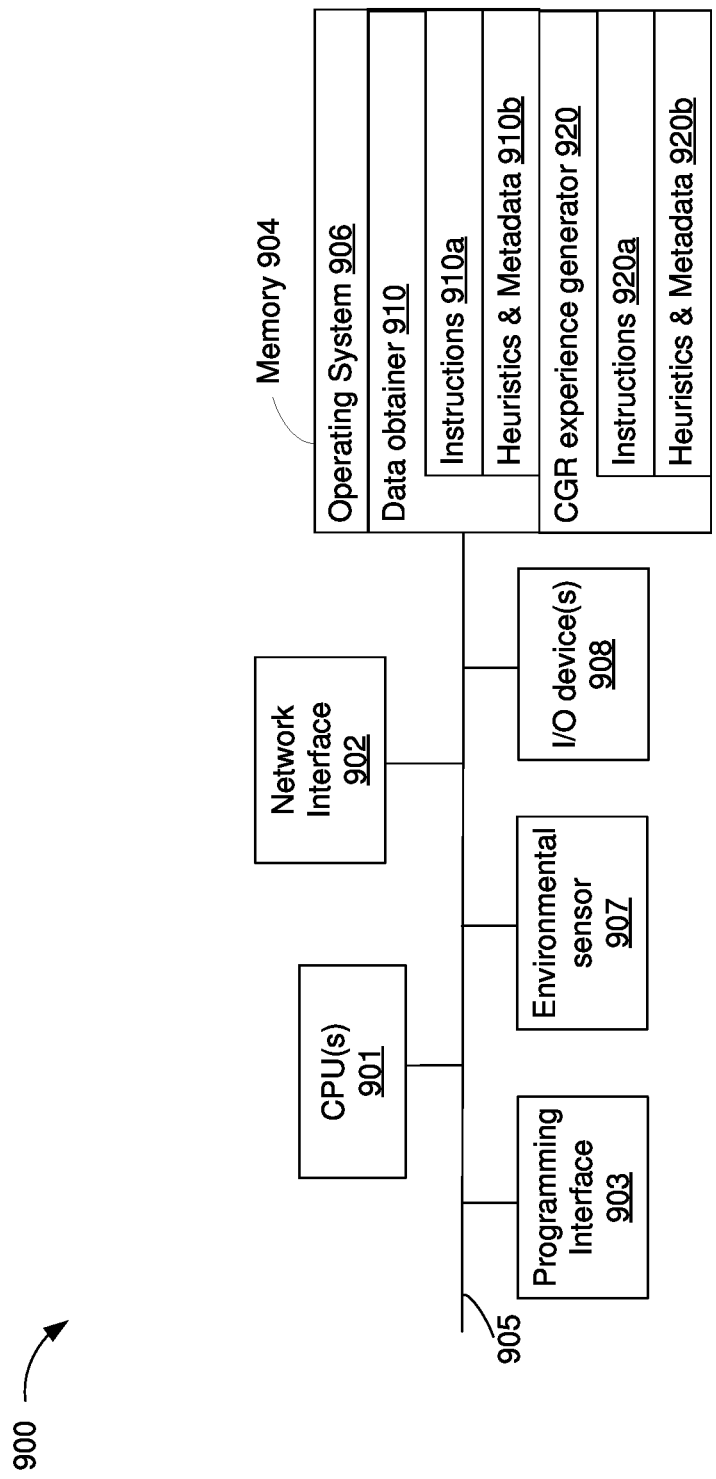
FIG. 9 is a block diagram of a device that presents a CGR environment in accordance with some implementations.

FIG. 9 is a block diagram of a device 900 that presents/masks communication data in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units (CPUs) 901, a network interface 902, a programming interface 903, a memory 904, an environmental sensor 907, one or more input/output (I/O) devices 908, and one or more communication buses 905 for interconnecting these and various other components.

In some implementations, the network interface 902 is provided to, among other uses, establish and maintain a metadata tunnel between a cloud hosted network management system and at least one private network including one or more compliant devices. In some implementations, the one or more communication buses 905 include circuitry that interconnects and controls communications between system components. The memory 904 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 904 optionally includes one or more storage devices remotely located from the one or more CPUs 901. The memory 904 comprises a non-transitory computer readable storage medium.

In various implementations, the environmental sensor 907 includes an image sensor. For example, in some implementations, the environmental sensor 907 includes a camera (e.g., a scene-facing camera, an outward-facing camera or a rear-facing camera). In some implementations, the environmental sensor 907 includes a depth sensor. For example, in some implementations, the environmental sensor 907 includes a depth camera.

In some implementations, the one or more I/O devices 908 include a display for displaying a CGR environment (e.g., the CGR environment 110 shown in FIGS. 1C-1F and 1H-1L, the CGR environment 210 shown in FIGS. 2A-2D and 2F-2G, the CGR environment 310 shown in FIGS. 3A-3H, or the CGR environment 410 shown in FIGS. 4B-4O). In some implementations, the display includes a video pass-through display which displays at least a portion of a physical environment surrounding the device 900 as an image captured by a scene camera. In various implementations, the display includes an optical see-through display which is at least partially transparent and passes light emitted by or reflected off the physical environment.

In some implementations, the memory 904 or the non-transitory computer readable storage medium of the memory 904 stores the following programs, modules and data structures, or a subset thereof including an optional operating system 906, a data obtainer 910, and a CGR experience generator 920. In various implementations, the device 900 performs the methods 500, 600, 700 and/or 800. In various implementations, the device 900 implements the electronic devices 100, 200, 300 and/or 400.

In some implementations, the data obtainer 910 obtains data. In some implementations, the data obtainer 910 obtains inputs (e.g., detects user inputs). In some implementations, the data obtainer 910 obtains environmental data from the environmental sensor 907. To that end, the data obtainer 910 includes instructions 910a, and heuristics and metadata 910b. In some implementations, the CGR experience generator 920 generates and presents the CGR environments 110, 210, 310 and/or 410. To that end, the CGR experience generator 920 includes instructions 920a, and heuristics and metadata 920b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a display, a non-transitory memory, and one or more processors coupled with the display and the non-transitory memory:
displaying a plurality of computer-generated reality (CGR) objects representing respective physical articles from a plurality of sources including a first source and a second source;
detecting a first input selecting a first CGR object of the plurality of CGR objects and a second CGR object of the plurality of CGR objects, wherein the first CGR object represents a first physical article from the first source and the second CGR object represents a second physical article from the second source;
adding an identifier of the first physical article to a first user selection queue that is associated with the first source;
adding an identifier of the second physical article to a second user selection queue that is associated with the second source; and
detecting a second input that concurrently confirms the first user selection queue and the second user selection queue.

2. The method of claim 1, wherein detecting the first input comprises:
detecting respective contacts with the first and second CGR objects.

3. The method of claim 1, wherein detecting the first input comprises:
detecting that a CGR representation of a person has touched the first and second CGR objects.

4. The method of claim 1, wherein detecting the first input comprises:
detecting a gaze input directed to the first and second CGR objects.

5. The method of claim 1, wherein detecting the first input comprises:
detecting a verbal input directed to the first and second CGR objects.

6. The method of claim 1, further comprising:
modifying a visual property of the first and second CGR objects in order to indicate the selection of the first and second CGR objects.

7. The method of claim 1, further comprising:
modifying a visual property of a remainder of the plurality of CGR objects in order to indicate that the remainder of the plurality of CGR objects have not been selected.

8. The method of claim 1, further comprising:
switching from a web page that includes two-dimensional (2D) representations of the physical articles to the CGR environment in response to an input corresponding to a request to display the plurality of CGR objects.

9. The method of claim 1, further comprising:
identifying, by a recommendation engine, at least a portion of the CGR objects that are displayed.

10. The method of claim 1, further comprising:
replacing one of the plurality of CGR objects with a replacement CGR object in response to detecting a replacement input while maintaining display of a remainder of the plurality of CGR objects.

11. The method of claim 1, wherein the first user selection queue includes a first virtual basket and the second user selection queue includes a second virtual basket.

12. The method of claim 1, wherein the first user selection queue includes a first list of favorite CGR objects and the second user selection queue includes a second list of favorite CGR objects.

13. A device comprising:
one or more processors;
a display;
a non-transitory memory; and
one or more programs stored in the non-transitory memory, which, when executed by the one or more processors, cause the device to:
display a plurality of computer-generated reality (CGR) objects representing respective physical articles from a plurality of sources including a first source and a second source;
detect a first selecting a first CGR object of the plurality of CGR objects and a second CGR object of the plurality of CGR objects, wherein the first CGR object represents a first physical article from the first source and the second CGR object represents a second physical article from the second source;
add an identifier of the first physical article to a first user selection queue that is associated with the first source;
add an identifier of the second physical article to a second user selection queue that is associated with the second source; and
detect a second input that concurrently confirms the first user selection queue and the second user selection queue.

14. The device of claim 13, wherein the one or more programs, when executed, cause the device to detect the first input by:
detecting respective contacts with the first and second CGR objects.

15. The device of claim 13, wherein the one or more programs, when executed, cause the device to detect the first input by:
detecting that a CGR representation of a person has touched the first and second CGR objects.

16. The device of claim 13, wherein the one or more programs, when executed, cause the device to detect the first input by:
detecting a gaze input directed to the first and second CGR objects.

17. The device of claim 13, wherein the one or more programs, when executed, further cause the device to:
modify a visual property of the first and second CGR objects in order to indicate the selection of the first and second CGR objects; and
modify a visual property of a remainder of the plurality of CGR objects in order to indicate that the remainder of the plurality of CGR objects have not been selected.

18. The device of claim 13, wherein the one or more programs, when executed, further cause the device to:
switch from a web page that includes two-dimensional (2D) representations of the physical articles to the CGR environment in response to an input corresponding to a request to display the plurality of CGR objects.

19. The device of claim 13, wherein the first user selection queue includes a first list of favorite CGR objects and the second user selection queue includes a second list of favorite CGR objects.

20. The method of claim 1, further comprising displaying a confirmation element to concurrently confirm the first user selection queue and the second user selection queue.

21. The method of claim 20, wherein detecting the second input includes detecting selection of the confirmation element.

22. A non-transitory memory storing one or more programs, which, when executed by one or more processors of a device with a display, cause the device to:
- display a plurality of computer-generated reality (CGR) objects representing respective physical articles from a plurality of sources including a first source and a second source;
- detect a first input selecting a first CGR object of the plurality of CGR objects and a second CGR object of the plurality of CGR objects, wherein the first CGR object represents a first physical article from the first source and the second CGR object represents a second physical article from the second source;
- add an identifier of the first physical article to a first user selection queue that is associated with the first source;
- add an identifier of the second physical article to a second user selection queue that is associated with the second source; and
- detect a second input that concurrently confirms the first user selection queue and the second user selection queue.

* * * * *